(12) United States Patent
Ikeda et al.

(10) Patent No.: US 7,801,415 B2
(45) Date of Patent: Sep. 21, 2010

(54) RECORDING MEDIUM, REPRODUCTION DEVICE, PROGRAM, REPRODUCTION METHOD AND RECORDING METHOD

(75) Inventors: Wataru Ikeda, Osaka (JP); Tomoyuki Okada, Nara (JP); Keiichi Tanaka, Hyogo (JP); Masahiro Oashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/612,503

(22) Filed: Nov. 4, 2009

(65) Prior Publication Data

US 2010/0046912 A1    Feb. 25, 2010

Related U.S. Application Data

(62) Division of application No. 10/588,578, filed as application No. PCT/JP2005/016640 on Sep. 9, 2005.

(30) Foreign Application Priority Data

Sep. 10, 2004    (JP)    ............................. 2004-263628

(51) Int. Cl.
H04N 5/91    (2006.01)
(52) U.S. Cl. ........................................ 386/95; 386/125
(58) Field of Classification Search .............. 386/46, 386/68, 70, 95, 112, 125, 126
See application file for complete search history.

(56) References Cited

U.S. PATENT DOCUMENTS

| | | | |
|---|---|---|---|
| 5,596,564 A | 1/1997 | Fukushima et al. | ............ 386/70 |
| 5,751,892 A | 5/1998 | Hirayama et al. | ............ 386/92 |
| 5,848,217 A | 12/1998 | Tsukagoshi et al. | |
| 6,088,507 A | 7/2000 | Yamauchi et al. | ............ 386/95 |
| 6,112,009 A | 8/2000 | Kikuchi et al. | |
| 6,134,383 A | 10/2000 | Kikuchi et al. | |
| 6,363,204 B1 | 3/2002 | Johnson et al. | |
| 6,456,777 B1 | 9/2002 | Masuno et al. | |

(Continued)

FOREIGN PATENT DOCUMENTS

EP    1271526 A2    1/2003

(Continued)

OTHER PUBLICATIONS

Notification of Reasons for Refusal, issued in the Japanese Patent Application No. JP 2008-116781 dated on Jul. 29, 2008.

*Primary Examiner*—Huy T Nguyen
(74) *Attorney, Agent, or Firm*—Panasonic Patent Center; Dhiren Odedra; Kerry Culpepper

(57) ABSTRACT

A BD-ROM contains PlayList information. The PlayList information defines a reproduction section for each of a plurality of AV Clips and contains MainPath information and SubPath information. The MainPath information specifies one of the AV Clips as the MainClip and defines a main reproduction section for the MainClip. The SubPath information specifies another one of the AV Clips as the SubClip and defines a sub-reproduction section to be synchronized with the main reproduction section for the SubClip. The BD-ROM contains those AV Clips specifies as SubClips while being correlated with EP_map. The EP_map correlates and indicates the entry time in the time axis of the SubClip with a plurality of entry positions in the SubClip.

4 Claims, 47 Drawing Sheets

U.S. PATENT DOCUMENTS

| | | |
|---|---|---|
| 6,678,006 B1 | 1/2004 | Velez et al. .......... 348/564 |
| 7,542,656 B2 | 6/2009 | Cho et al. |
| 2002/0090206 A1 | 7/2002 | Kikuchi et al. |
| 2002/0191963 A1 | 12/2002 | Kikuchi et al. |
| 2003/0002858 A1 | 1/2003 | Kikuchi et al. |
| 2005/0105888 A1 | 5/2005 | Hamada et al. |
| 2005/0196143 A1 | 9/2005 | Kato et al. |
| 2006/0098936 A1 | 5/2006 | Ikeda et al. |
| 2007/0025696 A1 | 2/2007 | Kim et al. |
| 2007/0230917 A1 | 10/2007 | Okada et al. |
| 2007/0258698 A1 | 11/2007 | Okada et al. |

FOREIGN PATENT DOCUMENTS

| | | |
|---|---|---|
| JP | 8-191423 | 7/1996 |
| JP | 9-51502 | 2/1997 |
| JP | 11-75159 | 3/1999 |
| JP | 2000-347638 | 12/2000 |
| JP | 2002-247526 | 8/2002 |
| JP | 2002-354395 | 12/2002 |
| JP | 2003-68057 | 3/2003 |
| JP | 2004-032607 | 1/2004 |
| JP | 2004-206863 | 7/2004 |
| JP | 2004-213832 | 7/2004 |
| JP | 2004-222269 | 8/2004 |
| WO | 2004-010713 | 1/2004 |
| WO | 2004/049710 | 6/2004 |
| WO | 2004/049710 | 6/2004 |
| WO | 2004-075547 | 9/2004 |
| WO | 2004/075547 | 9/2004 |

Movie (Video)

IDR Picture in MPEG4-AVC

Non-IDR I Picture

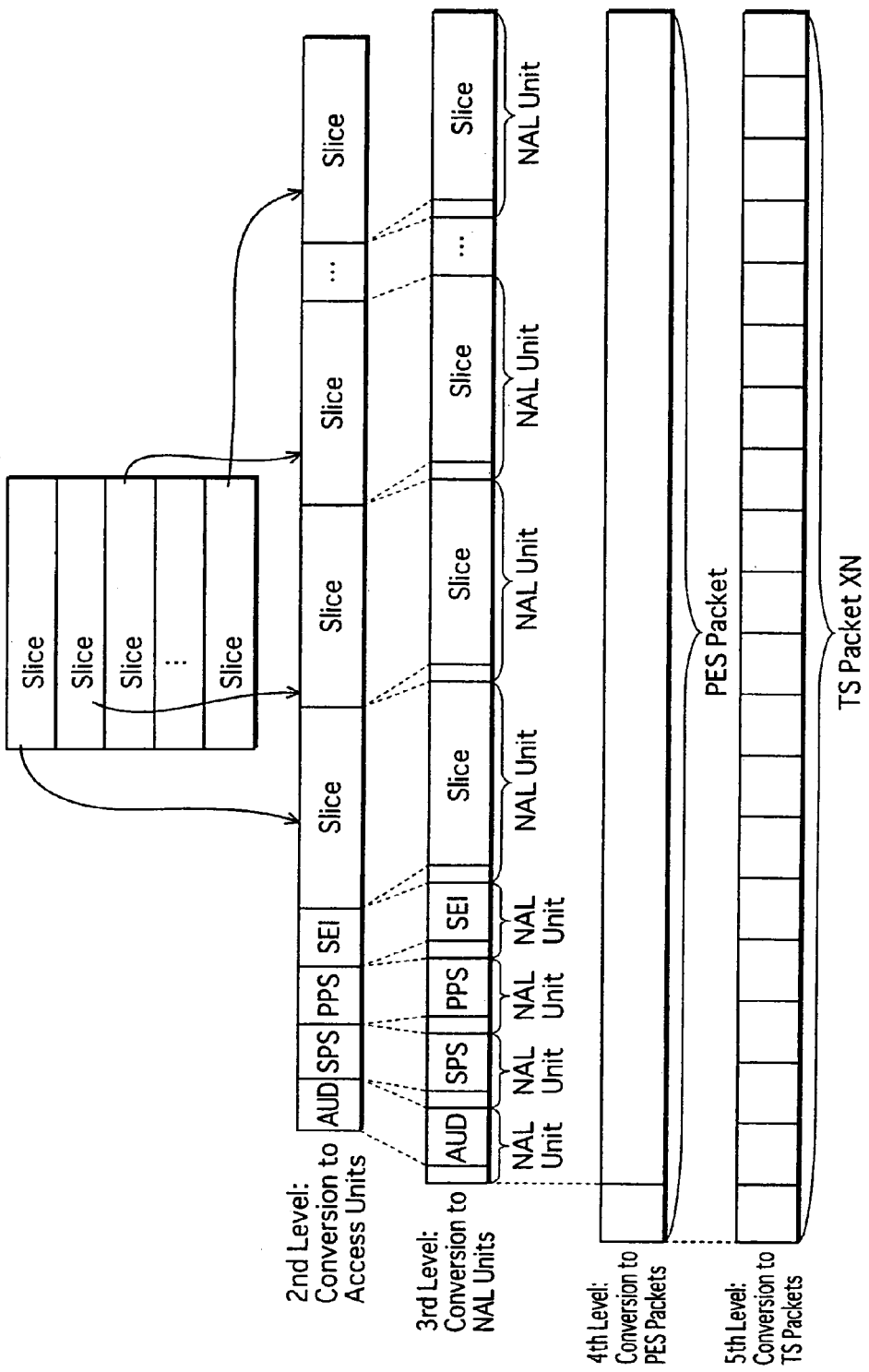

FIG. 10

| | EP_High(0)~(Nc-1) | | |
|---|---|---|---|
| ... | Reference Value to ref_to_EP_Low_id(A) = EP_Low(i) | Common MSBs of PTS_EP_High(A) = t1, t2, t3, t4 | Common MSBs of SPN_EP_High(A) = n1, n2, n3, n4 |
| ... | ref_to_EP_Low_id (A+1) | PTS_EP_High_(A+1) | SPN_EP_High_(A+1) |
| ... | ref_to_EP_Low_id (A+2) | PTS_EP_High_(A+2) | SPN_EP_High_(A+2) |
| ... | ... | ... | ... |

| | EP_Low(0)~(Nf-1) | |
|---|---|---|
| ... | ... | ... |
| is_angle_change_point (i)=1 | PTS_EP_Low LSBs of (i) = t1 | SPN_EP_Low LSBs of (i) = n1 |
| is_angle_change_point (i+1)=0 | PTS_EP_Low LSBs of (i+1) = t2 | SPN_EP_Low LSBs of (i+1) = n2 |
| is_angle_change_point (i+2)=1 | PTS_EP_Low LSBs of (i+2) = t3 | SPN_EP_Low LSBs of (i+2) = n3 |
| is_angle_change_point (i+3)=0 | PTS_EP_Low LSBs of (i+3) = t4 | SPN_EP_Low LSBs of (i+3) = n4 |
| ... | ... | ... |
| is_angle_change_point (j)=0 | PTS_EP_Low (j) | SPN_EP_Low (j) |
| is_angle_change_point (j+1)=0 | PTS_EP_Low (j+1) | SPN_EP_Low (j+1) |
| is_angle_change_point (j+2)=0 | PTS_EP_Low (j+2) | SPN_EP_Low (j+2) |
| ... | ... | ... |
| is_angle_change_point (k)=0 | PTS_EP_Low (k) | SPN_EP_Low (k) |
| is_angle_change_point (k+1)=0 | PTS_EP_Low (k+1) | SPN_EP_Low (k+1) |
| is_angle_change_point (k+2)=0 | PTS_EP_Low (k+2) | SPN_EP_Low (k+2) |
| ... | ... | ... |

FIG. 27

| SubPlayItem. SubPath_type | Clip_Info. Application_type | CPI.EP_Stream_type |
|---|---|---|
| 5:Primary audio presentation path for appending/replacing primary audio streams used by PlayItems | 7:TS for additional Content Without Video | 3:Primary audio |
| 6:Presentation Graphics presentation path for appending/replacing PG streams used by PlayItems | | 6:Presentation Graphics |
| 7:AV sync Interactive Graphics presentation path for appending/replacing IG streams used by PlayItems | | 7:Interactive Graphics |
| 8:Secondary audio presentation path for audio mixing | | 4:Secondary Audio |

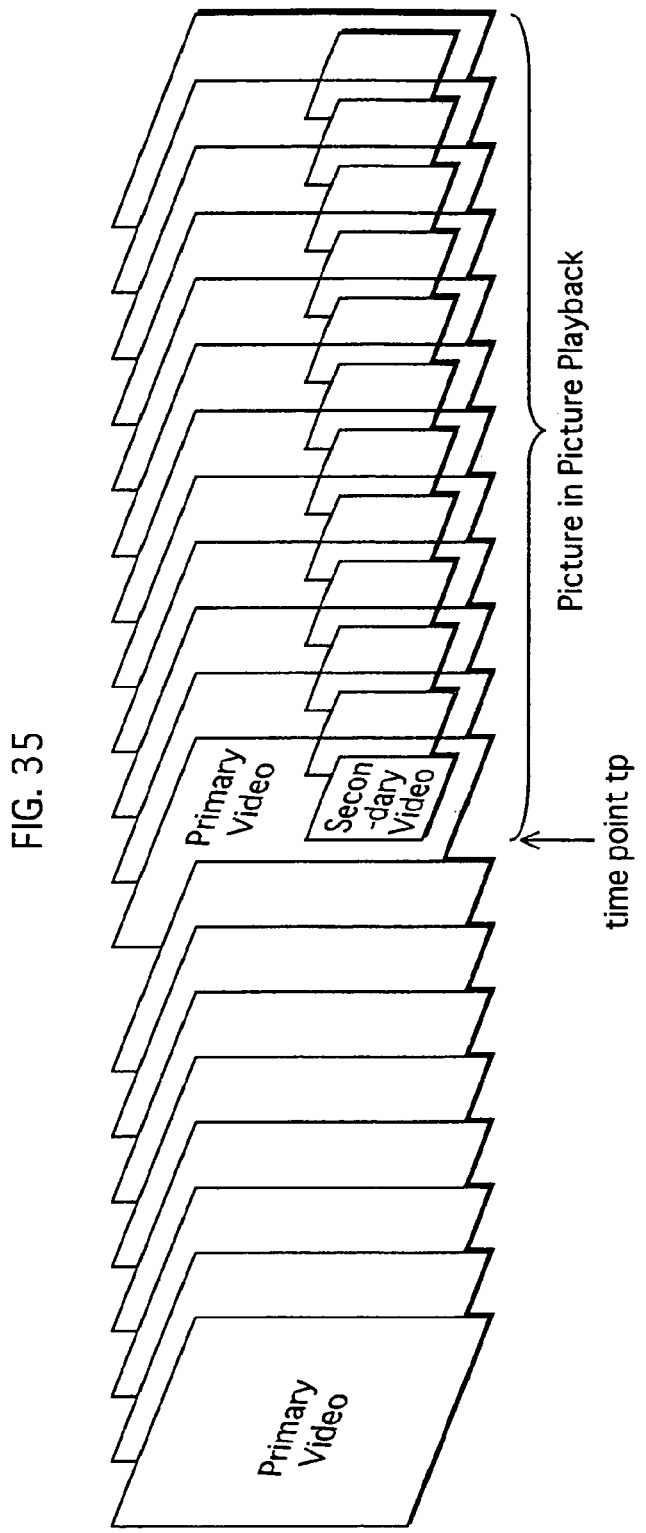

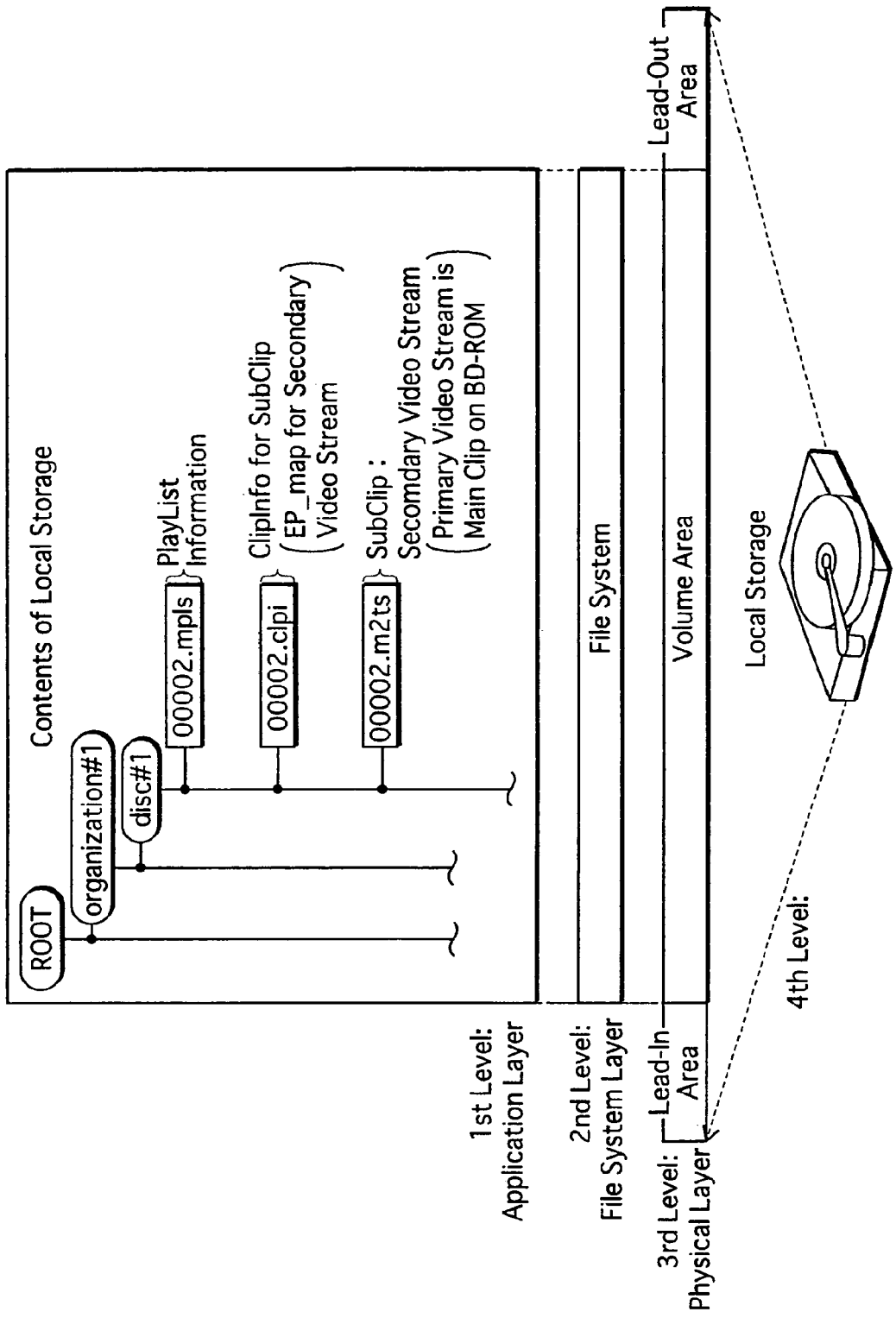

Selection by User (Lock Operation)

RECORDING MEDIUM, REPRODUCTION DEVICE, PROGRAM, REPRODUCTION METHOD AND RECORDING METHOD

TECHNICAL FIELD

The present invention relates to the field of synchronous application technology.

BACKGROUND ART

Synchronous application technology defines synchronous playback of a plurality of digital streams stored on different recording media, so that it appears to users to be playback of a single movie.

Synchronous applications are composed of different types of digital streams including main streams and substreams. A main stream is a digital stream containing high-quality video, whereas a substream is a digital stream without such high-quality video. Main streams are distributed to users via large-volume optical discs typified by BD-ROMs storing the main streams. On the other hand, substreams are distributed to users via, for example, the Internet.

Since digital streams constituting a single movie can be distributed to users via different media, more flexibility is offered in production of variations of the movie. Thus, wider variations can be provided to playback of a single movie.

Note that the following patent literature discloses prior art relating to synchronous application technology. Patent Literature 1:

DISCLOSURE OF THE INVENTION

Problems the Present Invention is Going to Solve

In order to ensure playback by consumer home appliances, a synchronous application needs to have a mechanism for allowing a consumer home appliance to execute trick play. The term "trick play" refers to such playback operations as fast-forwarding, rewinding, chapter-search, and time-search. Those playback operations are implemented using the "random access" function to a digital stream. With the random access function, an access is made to a point on the digital stream corresponding to any desired point on the timeline of the digital stream. In the case of a synchronous application, random access to the main stream is not sufficient to execute trick play. It is also necessary that the substream can be accessed at random.

Substreams may carry various kinds of playback data, such as audio, graphics, and standard-quality video. Generally, a main stream containing high-quality video is composed of GOPs (Group of Pictures), which are independently decodable units. However, a substream may or may not be composed of data in any units, such as GOPs. Even if a substream is composed of data in some units, which are independently decodable, the display rate, sampling frequency, and bit rate of such units may greatly vary from stream to stream.

Since substreams differ from one another in display rate, sampling frequency, bit rate, and independently decodable units, random access to some substream may not be made as fast as random access to the main stream. Thus, playback of a substream may not be started immediately upon request and may be notably delayed.

A synchronous application is designed for synchronous playback of a main stream and a substream. Thus, delay in playback start of the substream causes playback start of the main stream to be delayed as well. As a result, there is a considerable delay in response to a user request for playback.

The present invention aims to provide a recording medium and a playback device for avoiding a response delay occurring when random access to a substream is made in synchronism with random access to the main stream.

Means to Solve the Problems

In an attempt to achieve the above aim, the present invention provides a recording medium having playlist information recorded thereon. The playlist information defines a playback section of each of a plurality of digital streams, and includes main-path information and sub-path information. The main-path information designates one of the digital streams as a main stream, and defines a portion of the main stream as a primary playback section. The sub-path information designates another one of the digital streams as a substream, and defines a portion of the substream as a secondary playback section that is to be synchronously played back with the primary playback section. The recording medium further has recorded thereon the one of the plurality of digital streams designated as the substream, together with an entry map. The entry map indicates a plurality of entry points on the substream in one-to-one correspondence with a plurality of entry times on a timeline of the substream.

Effects of the Invention

Since an entry map is provided for a digital stream which is a substream, random access to any desired point on the substream is ensured at high speed using the entry map.

The PlayList information defines synchronization of the main stream and the substream on precondition that high-speed random access is possible for both the streams. This arrangement allows a playback device to execute skip playback and fast-speed playback of a synchronous application, which requires synchronous playback of the two streams, immediately upon a user operation.

This advantage will lead to the widespread use of applications made of main streams and substreams in combination.

Since high-speed random access to a substream not containing GOPs is ensured, playback of a movie composed of a main stream and such a substream can be started promptly from any point on the timeline. That is, a movie composed of a main stream and a substream can be processed in the same manner as a movie composed solely of a main stream. Consequently, a wider and richer variety is offer to playback of a single movie through a combination of a main stream with a substream.

Here, it should be noted that entry maps provided for substreams naturally differ from one another in time accuracy.

Since the time accuracy of each entry map differs depending on the data carried by a substream associated with the entry map, no information is available regarding the time interval between adjacent entry times and what kind of data points are designated as entry times. With this being a situation, it is unknown to what extent the stream analysis needs to be performed. Without information regarding the extent of required stream analysis, it cannot be ensured that random access to the substream is made as fast as random access to the main stream. In other words, there is an undesirable possibility that playback of the substream cannot be started timely and will be delayed notably.

To eliminate the above undesirable possibility, the entry map may be of a first type or a second type. The first type entry map indicates the plurality of entry times at a constant time interval on the timeline of the substream or the plurality of entry points at a constant data interval on the substream. The second type entry map indicates the entry points each located at a head of a complete data set. The entry map includes a flag indicating whether the entry map is of the first type or the second type.

According to the above structure, in the case where the flag indicates the first type, the entry points exist either at constant time intervals or at constant data intervals. Thus, with reference to the flag, the playback device is informed that stream analysis, if required, needs to cover at most the data worth the constant time interval or the constant data interval. That is, the playback device is informed that the requested access point is specified by analyzing, even in the worst-case conditions, data that is worth the constant time interval or the constant data interval.

In the case where the flag indicates the second type, the entry points are located at the heads of complete data sets. Thus, with reference to the flag, the playback device is informed that data read shall be started from any of the entry points, which are located at inconstant intervals. As a result, it is ensured that playback is duly started from any desired playback point.

Since the flag causes the playback device to judge whether stream analysis of data worth at most a predetermined time or data interval is required or no stream analysis is required at all. Thus, even if not only the Main Clip but also the SubClip needs to be accessed at random, the playback device is not subject to excessive burden. As a result of the reduced burden, response of the playback device to a user operation improves.

BRIEF DESCRIPTION OF THE DRAWINGS

FIG. 7 illustrates the processes through which an IDR picture and a Non-IDR I picture are converted into TS packets;

FIG. 10 shows pairs of EP_Low and EP_High values representing the PTS_EP_start and the SPN_EP_start of entry points #1-#7 illustrated in FIG. 9;

FIG. 27 shows a table of permissible combinations of the values of the SubPath_type, the application_type, and the EP_stream_type;

FIG. 35 illustrates one example of PiP playback;

FIG. 37 illustrates the contents stored on the local storage according to a second embodiment;

FIG. 47C illustrates PiP playback executed in the case where a playback section of the secondary video is located at some point subsequent to the end point of a playback section of the primary video.

DESCRIPTION OF REFERENCE NUMERALS

1 BD Drive
2 Arrival Time Clock Counter
3 Source De-Packetizer
4 PID Filter
5 Transport Buffer
6 Multiplexed Buffer.
7 Coded Picture Buffer
8 Video Decoder
10 Decoded Picture Buffer
11 Video Plane
12 Transport Buffer
13 Coded Data Buffer
14 Stream Graphics Processor
15 Object Buffer
16 Composition Buffer
17 Composition Controller
18 Presentation Graphics Plane
19 CLUT Unit
20 Transport Buffer
21 Coded Data Buffer
22 Stream Graphics Processor
23 Object Buffer
24 Composition Buffer
25 Composition Controller
26 Interactive Graphics Plane
27 CLUT Unit
28 Compositor
29 Compositor
30 Switch
31 Network Device
32 Switch
33 Arrival Time Clock Counter
34 Source De-Packetizer
35 PID Filter
36 Switch
37 Transport Buffer
38 Elementary Buffer
39 Audio Decoder
40 Transport Buffer
41 Buffer
42 Audio Decoder
43 Mixer
44 Scenario Memory
45 Controller
46 Main Exchanger
47 Sub-Exchanger
48 PL Playback Controller
49 PSR Set

BEST MODE FOR CARRYING OUT THE INVENTION

First Embodiment

Figure 1:
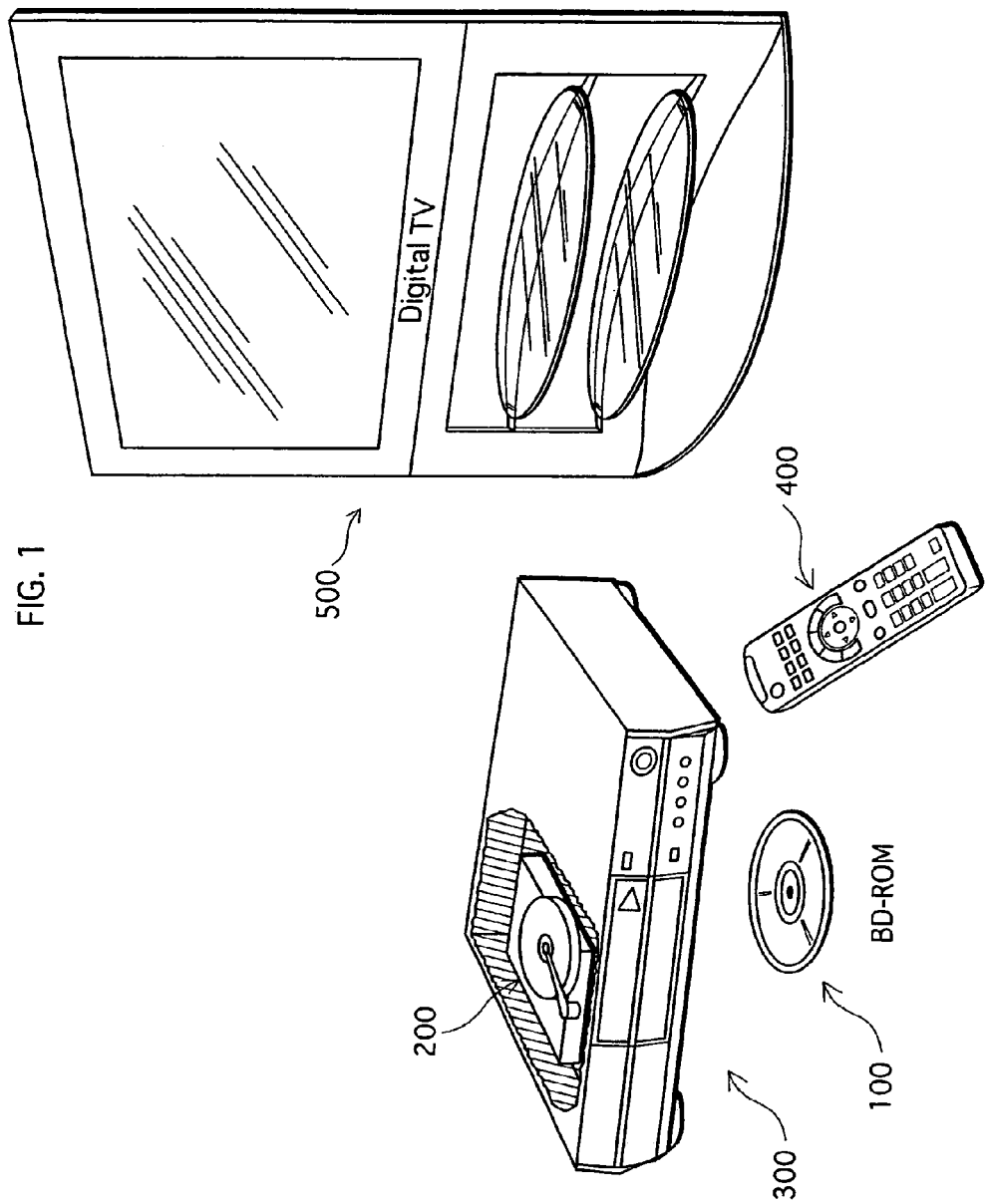
FIG. 1 illustrates a form of using a recording medium according to the present invention.

The following describes an embodiment of a recording medium according to the present invention. First of all, among various acts of practicing a recording medium of the present invention, an act of using is described. FIG. 1 illustrates a form of using the recording medium according to the present invention. In FIG. 1, a local storage 200 is the recording medium according to the present invention. The local storage 200 is a hard disk built into a playback device 300. The local storage 200 is used with a BD-ROM 100 to together supply a movie to a home theater system composed of the playback device 300, a remote controller 400, and a television set 500.

The local storage 200 is a built-in hard disk used to store contents supplied from movie distributors.

The playback device 300 is a network-capable digital home appliance and used to play back the BD-ROM 100. In addition, the playback device 300 can expand the functionality of the BD-ROM 100 through the combined use of the contents stored on the BD-ROM 100 with contents downloaded from a movie distributor's server via the network.

The remote controller 400 is used to receive user input specifying, for example, a chapter to be played back or time to start playback.

The television set 500 displays playback produced by the playback device 300.

The contents stored on the local storage 200 are used in combination with the contents stored on the BD-ROM 100. Here, the contents stored on the local storage 200 and not physically present on the BD-ROM 100 are processed as if they are stored on the BD-ROM. This technique is called "virtual file system".

The recording medium according to the present invention is designed for such a use in combination with the BD-ROM 100. This concludes the description of the act of using the recording medium of the present invention.

Now, the following sequentially describes the internal structures of the BD-ROM 100 and of the local storage 200.

<Overview of BD-ROM>

Figure 2:
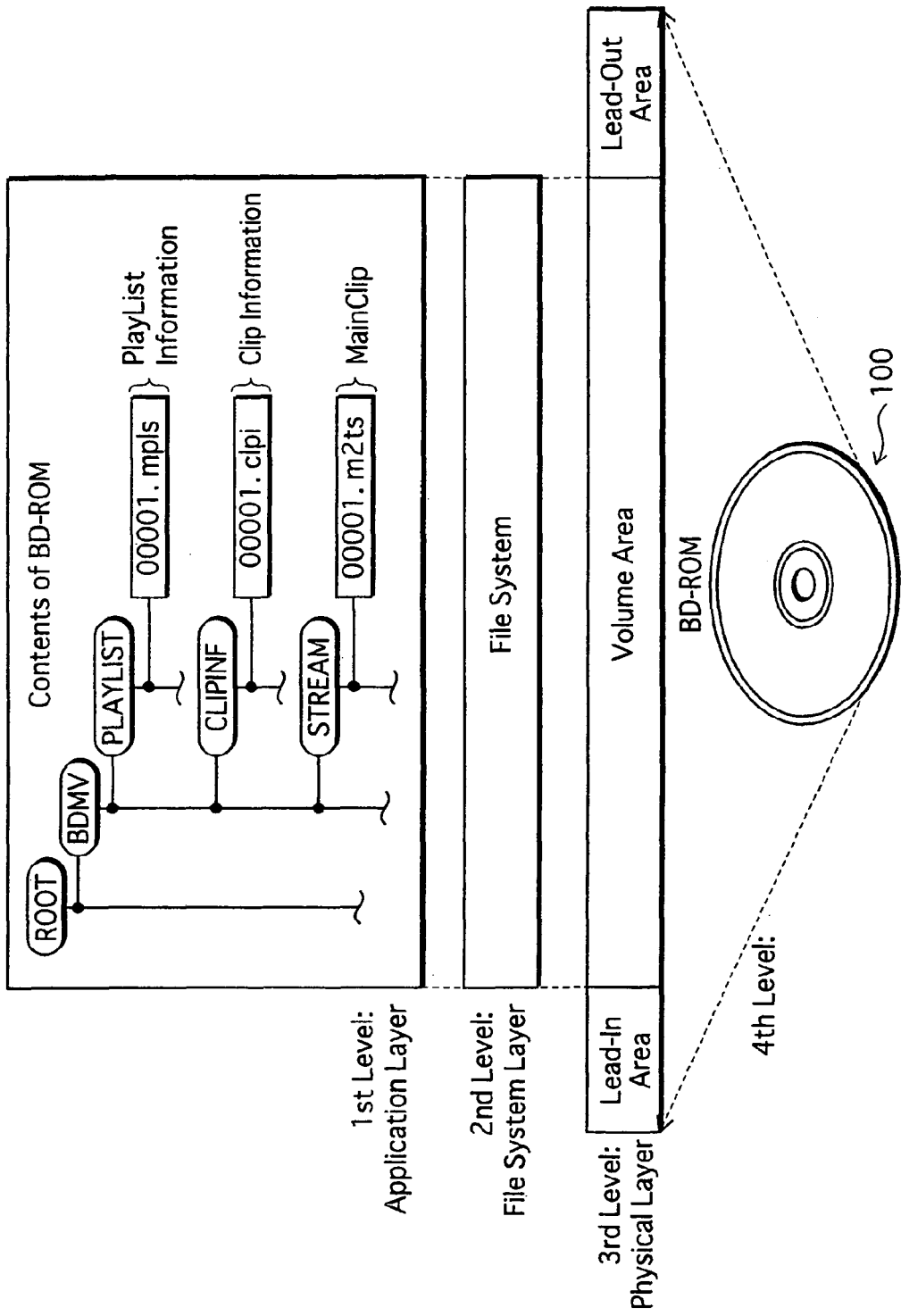
FIG. 2 is illustrates the internal structure of a BD-ROM.

FIG. 2 illustrates the internal structure of the BD-ROM. In the figure, the BD-ROM is illustrated on the fourth level, and the track of the BD-ROM is illustrated on the third level. In the figure, the track is laterally stretched out, although the track in practice spirals outwards from the center of the BD-ROM. The track is composed of a lead-in area, a volume area, and a lead-out area. The volume area has a layer model of a physical layer, a file system layer, and an application layer. The first level illustrates, in a directory structure, a format of the application layer (application format) of the BD-ROM. As illustrated on the first level, the BD-ROM has a ROOT directory, and the ROOT directory has a BDMV directory.

The BDMV directory has three subdirectories called a PLAYLIST directory, a CLIPINF directory, and a STREAM directory.

The STREAM directory stores files with the extension ".m2ts" (e.g. a file called 00001.m2ts) containing data constituting the main body of a digital stream.

The PLAYLIST subdirectory stores files with the extension ".mpls" (e.g. a file called 00001.mpls).

The CLIPINF directory stores files with the extension ".clpi" (e.g. a file called 00001.clpi).

The following describes an AV clip, Clip Information, and PlayList information, which are components of the BD-ROM.

<BD-ROM Structure: 1. AV Clip>

Figure 3:
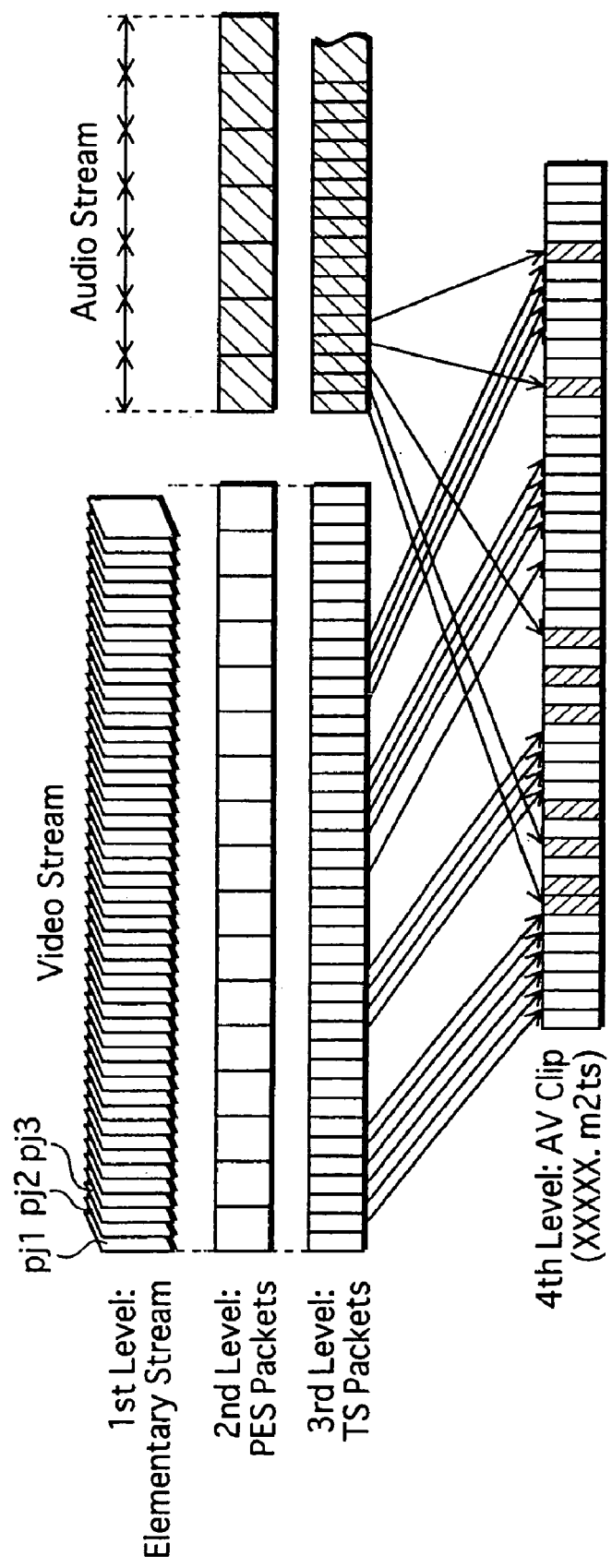
FIG. 3 schematically illustrates the structure of a file with the extension ".m2ts"

First of all, a description is given of files with the extension ".m2ts". FIG. 3 schematically illustrates the structure of a file with the extension ".m2ts". Each file with the extension ".m2ts" (namely, 00001.m2ts, 00002.m2ts, 00003.m2ts, . . . ) contains an AV clip. The AV clip (illustrated on the fourth level) is created as follows. A video stream containing a plurality of video frames (pictures pj1, pj2, pj3, . . . ) and an audio stream containing a plurality of audio frames (both illustrated on the first level) are separately converted to PES packets (illustrated on the second level) and further converted to TS packets (illustrated on the third level). These TS packets of the video and audio streams are multiplexed to form the AV clip. As in the example illustrated in FIG. 3, an AV clip containing video is specifically referred to as a "Main Clip" to differentiate it from other AV clips not containing video.

Figure 4:
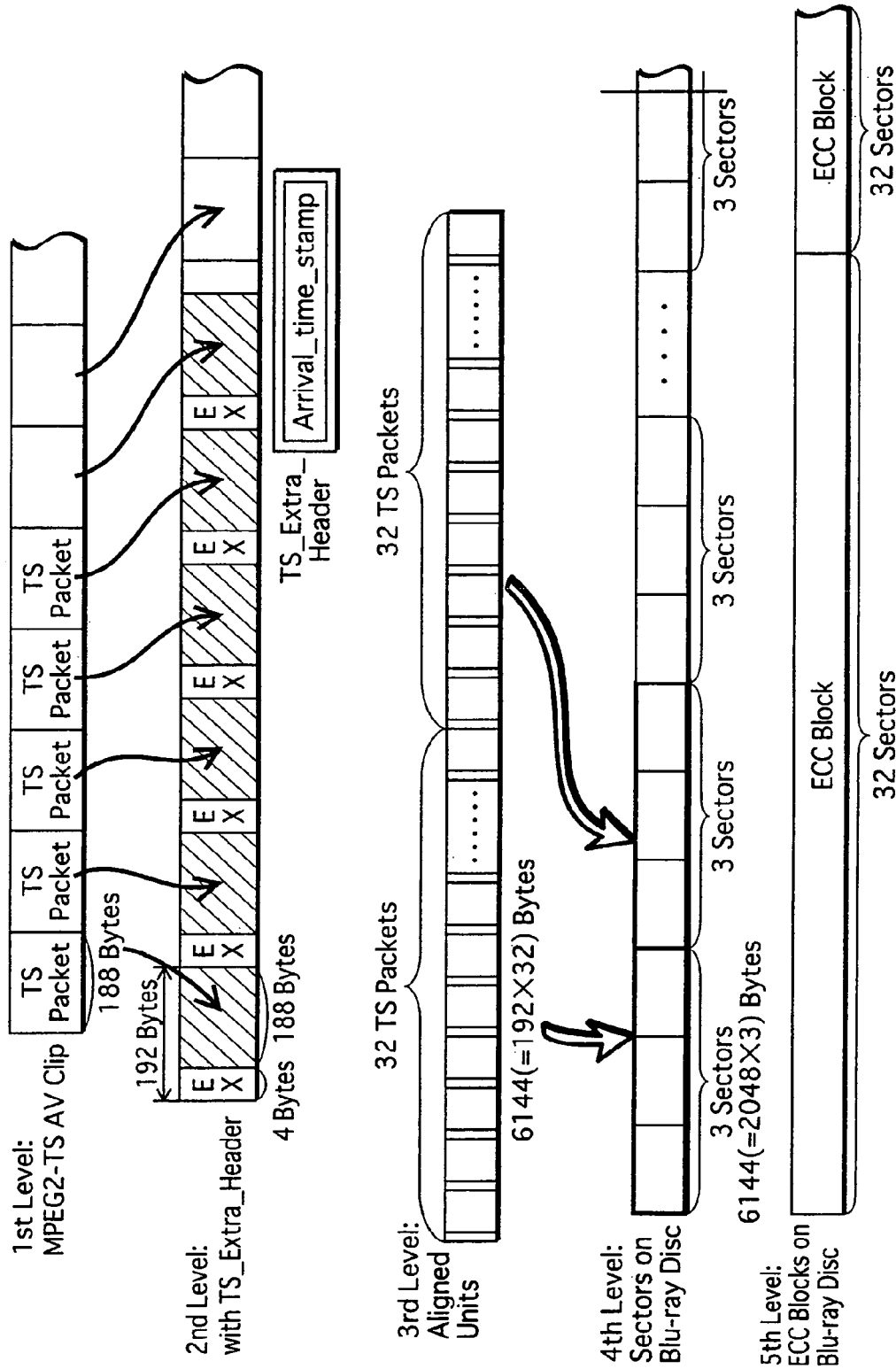
FIG. 4 illustrates the processes through which TS packets constituting a Main Clip are recorded onto the BD-ROM.

Next, a description is given of how a Main Clip, which is a digital stream of the MPEG2-TS format, is recorded on the BD-ROM. FIG. 4 illustrates the processes through which TS packets constituting the Main Clip are recorded onto the BD-ROM. In FIG. 4, the TS packets of the Main Clip are illustrated on the first level.

Each TS packet of the Main Clip is 188 bytes in length. As illustrated on the second level, "TS_extra_header" (denoted as "EX" in the figure) is attached to each TS packet, so that the packet length becomes 192 bytes.

The third and fourth levels illustrate the physical units of the BD-ROM in relation to the TS packets. As illustrated on the fourth level, the track on the BD-ROM is divided into a plurality of sectors. The TS packets with the TS_extra_header (hereinafter, simply "EX-TS packets") are divided into groups of 32 EX-TS packets, and each group is written into three sectors of the BD-ROM. Each group composed of 32 EX-TS packets amounts to 6,144 (=32×192) bytes, which is equal to the total size of three sectors (=2048×3) Each group of 32 EX-TS packets stored in three sectors of the BD-ROM is referred to as an "Aligned Unit". When data is recorded onto the BD-ROM, encryption of data is carried out in Aligned Units.

As illustrated on the fifth level, an error correction code is inserted every 32 sectors to constitute an ECC block. As long as accessing the BD-ROM in Aligned Units, a playback device is ensured to obtain a complete set of 32 EX-TS packets without missing any part. This completes the description of the processes of recording the Main Clip onto the BD-ROM.

<Description of AV Clip: 1. Video Stream>

The following describes the internal structure of a video stream.

Figure 5:
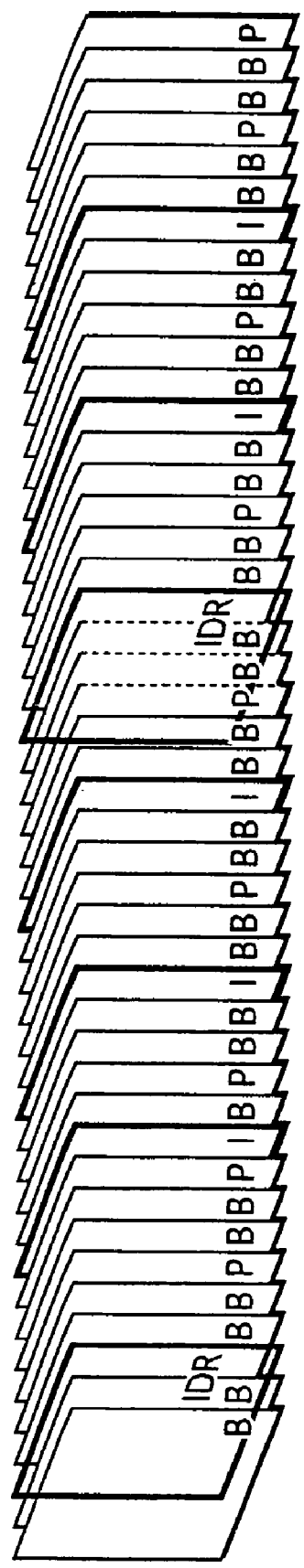
FIG. 5 illustrates the internal structure of a video stream used to present a movie.

FIG. 5 illustrates the internal structure of a video stream used to present a movie. The video stream illustrated in FIG. 5 is composed of a plurality of pictures aligned in the order of coding.

In the figure, the reference numerals "I", "P", and "B" denote an I picture, B picture, and P picture, respectively. There are two types of I pictures, one is an IDR picture and the other is a Non-IDR I picture. Non-IDR I pictures, P pictures, and B pictures are coded using correlation with other pictures. More specifically, a B picture is composed of Bidirectioanlly Predictive (B) slices. A P picture is composed of Predictive (P) slices. There are two types of B pictures, one is a reference B picture, and the other is a nonreference B picture.

In FIG. 5, a Non-IDR I picture is denoted as "I", and an IDR picture is denoted as "IDR". The same denotations are used throughout the following descriptions. This concludes the description of the video stream used to present a movie.

Figure 6A:
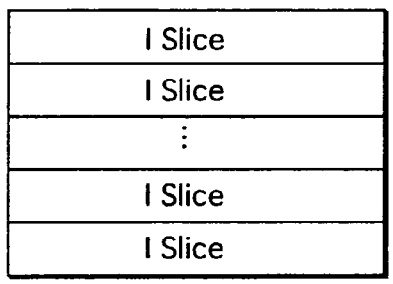
FIG. 6A illustrates the internal structure of an IDR picture.
Figure 6B:
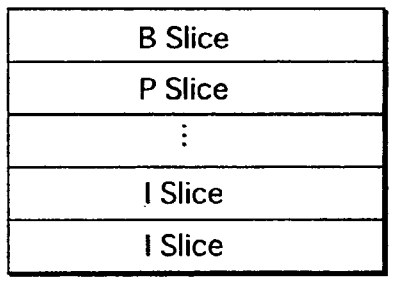
FIG. 6B illustrates the internal structure of a Non-IDR I picture.
Figure 6C:
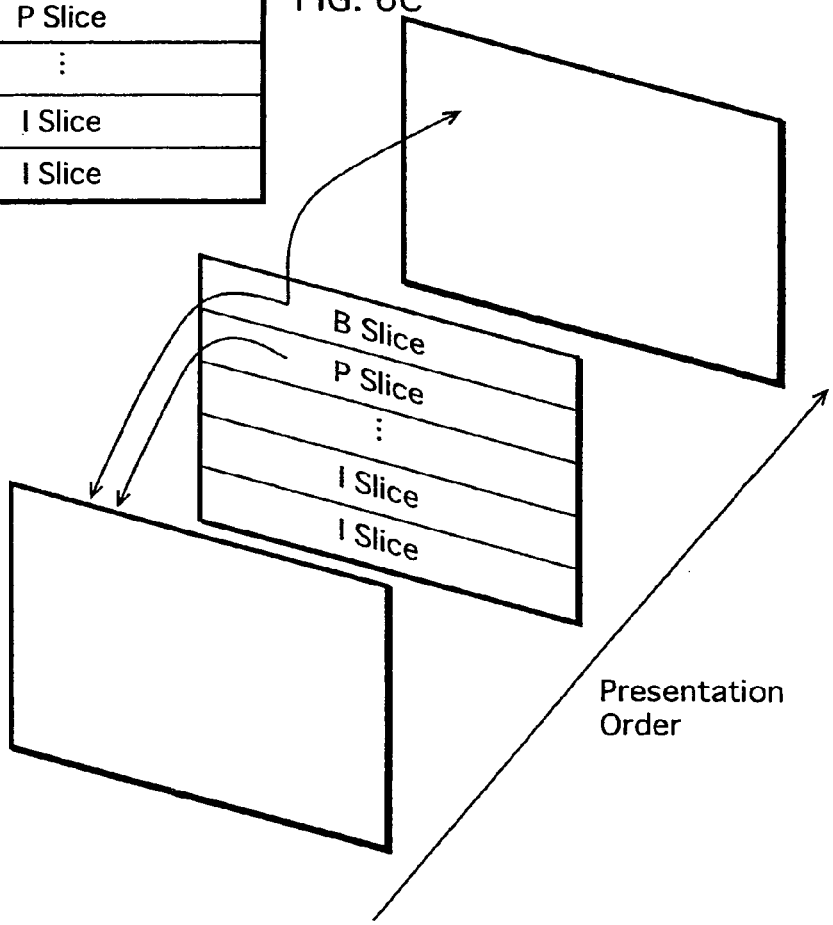
FIG. 6C illustrates the dependency relationship between the Non-IDR I picture and other pictures.

Next, the following describes the internal structures of an IDR picture and a Non-IDR I picture. FIG. 6A illustrates the internal structure of an IDR picture. As illustrated in the figure, the IDR picture is composed of a plurality of Intra-type slices. FIG. 6B illustrates the internal structure of a Non-IDR I picture. Different from the IDR picture composed solely of Intra-type slices, the Non-IDR I picture is composed of slices of Intra-type, P-type, and B-type. FIG. 6C illustrates the dependency relationship between the Non-IDR I picture and other pictures. A Non-IDR I picture may be composed of B and P slices and thus may have a dependency relationship with other pictures.

<Description of AV Clip: 2. Recording to BD-ROM>

Next, the following describes how IDR pictures and Non-IDR I pictures are converted into TS packets and recorded onto the BD-ROM. FIG. 7 illustrates the processes through which an IDR or Non-IDR I picture is converted into TS packets. In the figure, the first level illustrates an IDR or Non-IDR I picture. The second level illustrates an Access Unit stipulated according to MPEG4-AVC. A plurality of slices constituting the IDR or Non-IDR I picture is sequentially aligned. Then, AUD (Access Unit Delimiter), SPS (Sequence Parameter Set), PPS (Picture Parameter Set), SEI (Supplemental Enhanced Information) are attached to the slice sequence. In this way, the picture slices are converted into an Access Unit.

AUD, SPS, PPS, SEI, Access Unit mentioned above are information all stipulated according to MPEG4-AVC and described in various documents, such as "ITU-T Recommendation H.264". For the details, such documents should be referenced. The point in this description is that AUD, SPS, PPS, and SEI need to be supplied to a playback device for allowing random access to the video stream.

The third level represents NAL units. AUD, SPS, PPS, SEI, and each slice illustrated on the second level are each attached with a header so as to be converted into separate NAL units. NAL units are units supported by the Network Abstraction Layer (NAL) stipulated according to MPEG-4AVC and described in various documents, such as "ITU-T Recommendation H.264". For the details, such documents should be referenced. The point in this description is that AUD, SPS, PPS, SED, and each slice are converted into separate NAL units and manipulated independently in the Network Abstraction Layer.

As described above, a plurality of NAL units obtained by converting the single picture are further converted into PES packets illustrated on the fourth level. The PES packets are then converted into TS packets. Finally, the resulting TS packets are recorded onto the BD-ROM.

In order to play back one GOP, the decoder needs to be supplied with a NAL unit containing AUD, among NAL units constituting the first IDR or Non-IDR I picture in the GOP. That is, the NAL unit containing AUD is used as an index for decoding the IDR picture or Non-IDR I picture. In this embodiment, each NAL unit containing AUD is regarded as a point. For playback of the video stream, the playback device recognizes each of such a point as an entry point for playback of a Non-IDR I picture and an IDR picture. Consequently, for implementation of random access to the Main Clip, it is extremely important for the playback device to recognize the locations of AUDs of IDR pictures and Non-IDR I pictures. This concludes the description of the structure of the MPEG-4AVC video stream used for presenting a movie.

<BD-ROM Structure: 2. Clip Information>

Figure 8:
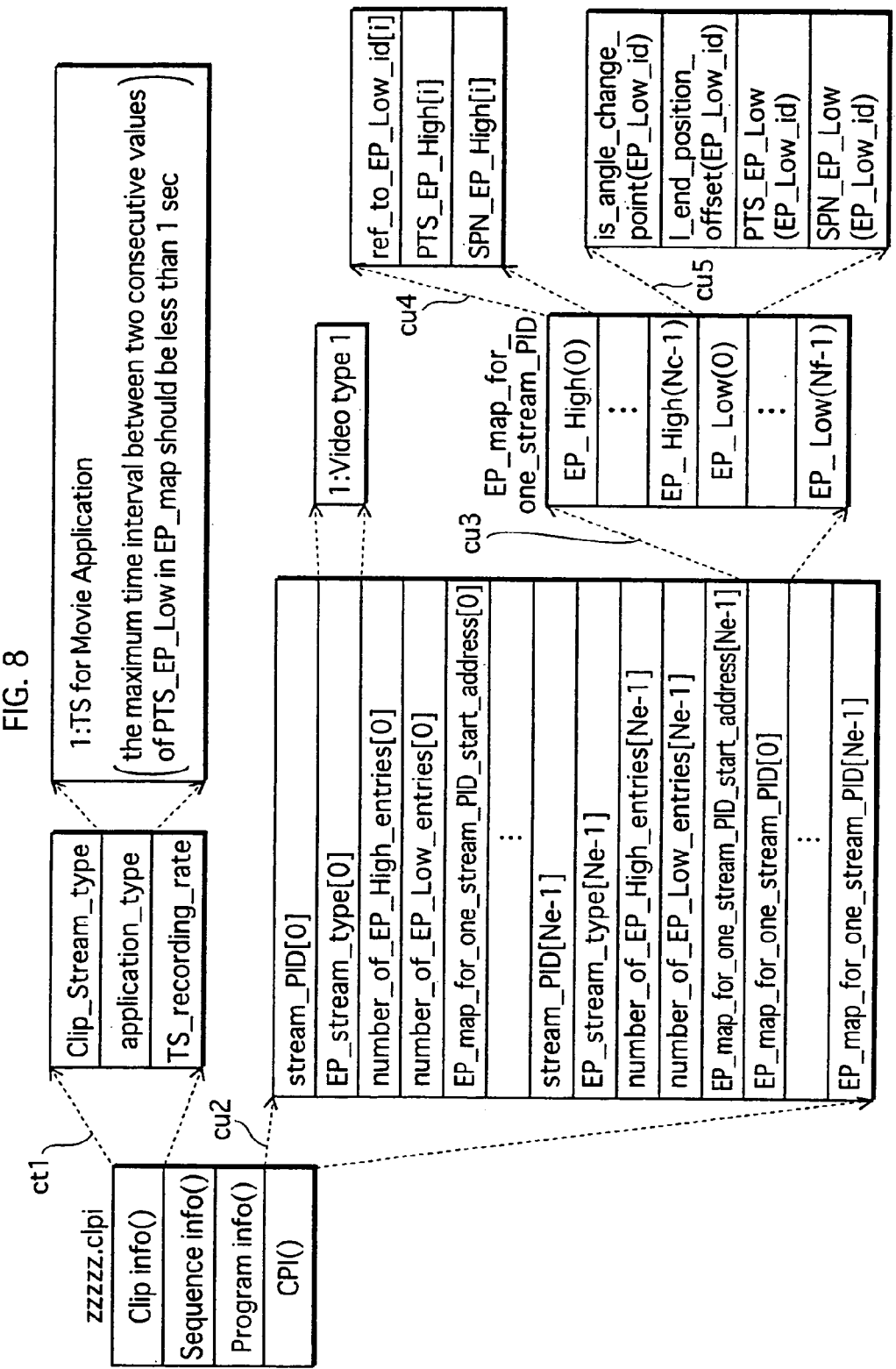
FIG. 8 illustrates the internal structure of Clip information.

Next, the following describes files with the extension ".clpi". Each file with the extension ".clpi" (e.g. 00001.clpi, 00002.clpi, 00003.clpi, . . . ) contains Clip information. Each piece of Clip information is management information of an individual Main Clip. FIG. 8 illustrates the internal structure of a piece of Clip information. As illustrated in the left block of the figure, the Clip information is composed of the following fields:

(i) "ClipInfo( )" storing the attributes of the AV clip file;

(ii) "Sequence Info( )" storing information related to the ATC sequence and STC Sequence;

(iii) "Program Info( )" storing information related to the program sequence; and (iv) "Characteristics Point Info (i.e., CPI( ))".

<Description of Clip Information: 1. ClipInfo>

First, a description of ClipInfo will be given. In the figure, leader lines ct1 indicates that the structure of ClipInfo( ) is illustrated in greater detail. As indicated by the leader lines ct1, the ClipInfo( ) is composed of the following fields: "clip_stream_type" indicating the type of the digital stream; "application_type" indicating the type of an application that the Main Clip constitutes; and "TS_recording rate" indicating the data rate of the Main Clip. The application_type is set to the value "1" to indicate that the associated Main Clip constitutes a Movie application. This concludes the description of Clip-Info( ).

Next, the following describes ClipInfo.

The ClipInfo includes as many "EP_map_for_one_stream [0]—[Ne−1]" fields as the value held by "Ne", and also includes the following attributes of each "EP_map_for_one_stream". The attributes of each "EP_map_for_one_stream" include: "stream_PID[0]—[Ne−1]" of an associated elementary stream; "EP_stream_type[0]—[Ne−1]" indicating the type of the EP_map_for_one_stream; "number_of_EP_High entries[0]—[Ne−1]" indicating the number of EP_High entries in the EP_map_for_one_stream; "number_of_EP_Low_entries[0]—[Ne−1]" indicating the number of EP_Low entries in the EP_map_for_one_stream; and "EP_map_for_one_stream_PID_start_address[0]—[Ne−1]" indicating the current address of the EP_map_for_one_stream.

<Clip Information: 2. EP_map>

Figure 9:
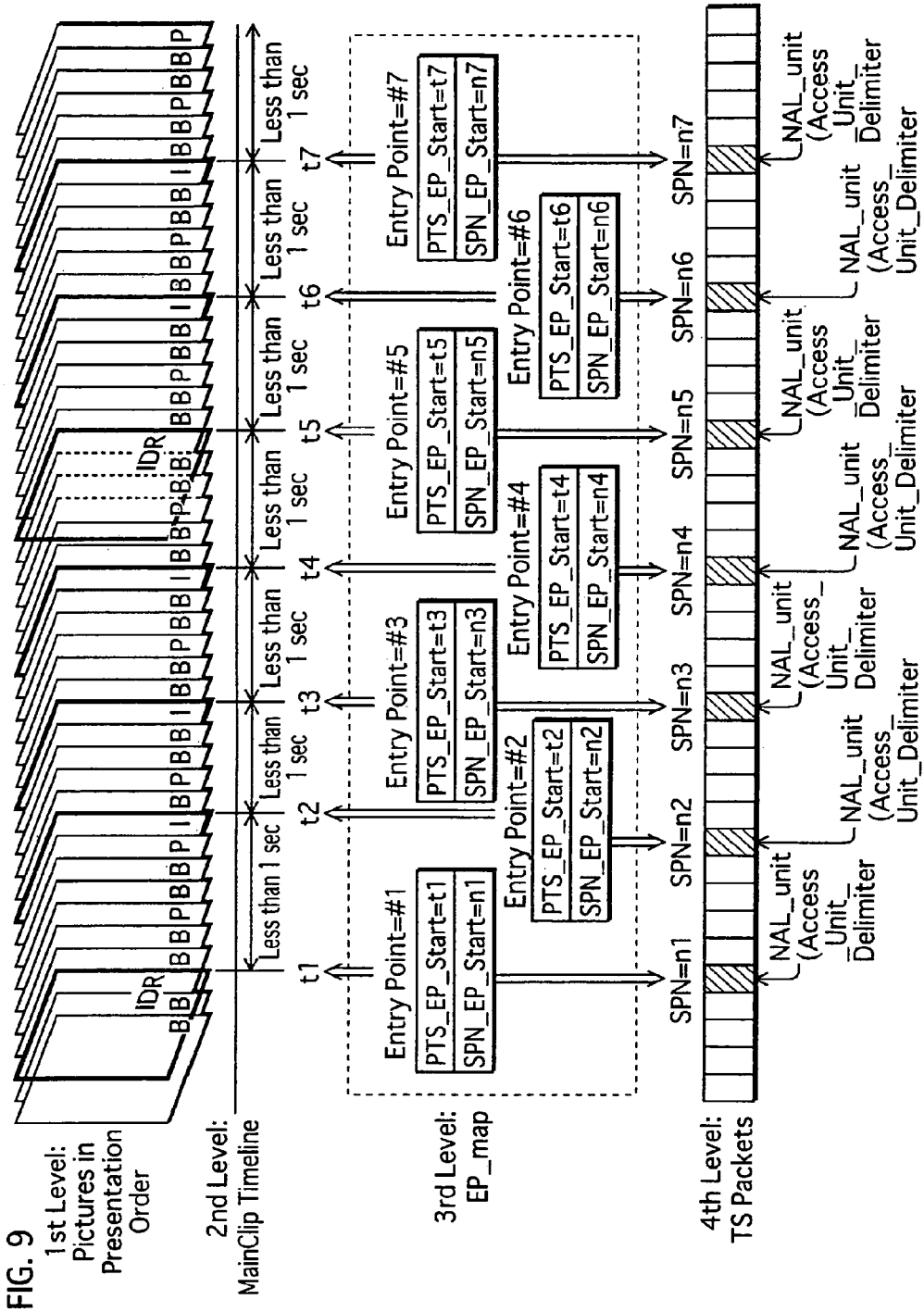
FIG. 9 illustrates the setting of an EP_map for a video stream carrying a movie (application_type=1)

Hereinafter, the EP_map is described using a specific example. FIG. 9 illustrates the setting of an EP_map for a video stream carrying a movie (application_type=1). The first level illustrates a plurality of pictures aligned in the presentation order. The second level illustrates the timeline of the pictures. The fourth level illustrates TS packets on the BD-ROM. The third level illustrates the EP_map setting.

In this example, Access Units (Non-IDR I pictures and IDR pictures) are located at points t1-t7 on the timeline illustrated on the second level. Provided that the time intervals between the points t1-t7 are about 1 sec, the EP_map of the movie video stream is set so as to indicate each of the points t1-t7 with a corresponding entry time (PTS_EP_start) and a corresponding entry point (SPN_EP_start).

FIG. 10 shows, in tabular form, pairs of EP_Low and EP_High values representing the PTS_EP_start and the SPN_EP_start of entry points #1-#7 illustrated in FIG. 9. In FIG. 10, the left table shows the values of EP_Low and the right table shows the values of EP_High.

In FIG. 10, of the EP_Low(0)-(Nf−1) shown in the left table, each PTS_EP_Low value of EP_Low(i)-(i+3) indicate the least significant bits of the points t1-t4. Also, each SPN_E-P_Low value of the EP_Low(i)-(i+3) indicate the least significant bits of the points n1-n4.

The right table in FIG. 10 shows the values of EP_High (0)-(Nc−1) set in the EP_map. Provided that the points t1-t4 have the same set of most significant bits and the points n1-n4 have the same set of most significant bits, the values of PTS_EP_High and SPN_EP_High are set to the respective sets of most significant bits. In addition, the ref_to_EP_Low_id field corresponding to the EP_High is set, so that the first EP_Low field (EP_Low(i)) out of the EP_Low fields indicating the points t1-t4 and n1-n4. With this setting, the EP_High indicates the common most significant bits of the PTS_EP_start and the common most significant bits of the SPN_EP_start. This concludes the description of the Main Clip and Clip information stored on the BD-ROM. Note that the 00001.mpls file is a file storing the PlayList information, but no description thereof is given here. It is because an identical file is stored on the local storage 200 and a description of the PlayList information stored on the local storage 200 will be given later.

Since the BD-ROM is a large-capacity recording medium, it is understood that the BD-ROM is used to supply video to the home theater system illustrated in FIG. 1. This concludes the description of the BD-ROM.

<Local Storage 200>

Figure 11:
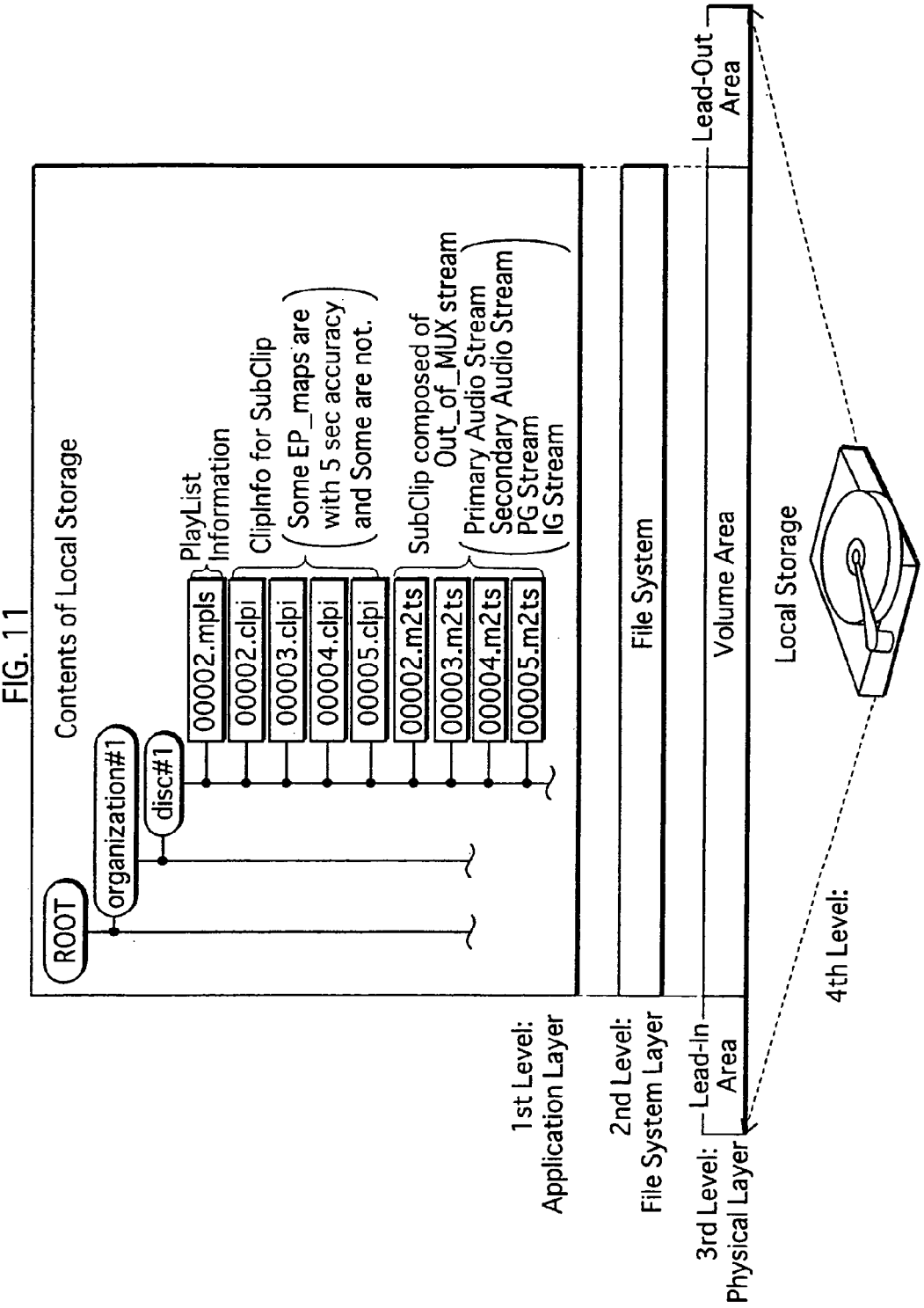
FIG. 11 illustrates the internal structure of a local storage.

Next, the following describes the local storage 200, which is a recording medium according to the present invention. FIG. 11 illustrates the internal structure of the local storage 200. As illustrated in the figure, the recording medium according to the present invention can be manufactured by making improvements to the application layer.

In the figure, the local storage 200 is illustrated on the fourth level, and the track of the local storage 200 is illustrated on the third level. In the figure, the track is laterally stretched out, although the track in practice spirals outwards from the center of the local storage 200. The track consists of a lead-in area, a volume area, and a lead-out area. The volume area in the figure has a layered structure made up of a physical layer, a file system layer, and an application layer. The first level of the figure illustrates the application format of the local storage 200 using a directory structure.

In the directory structure illustrated in the figure, the local storage 200 has a ROOT directory. The ROOT directory has a subdirectory called "organization #1", and the "organization #1" has a subdirectory called "disc #1". The "organization #1" directory is assigned to a specific movie provider, whereas the "disc #1" directory is assigned to a specific BD-ROM supplied from that provider.

Since a specific directory is assigned to a specific provider and subdirectories are provided within the directory in one-to-one correspondence with BD-ROMs supplied from that provider, download data relating to each BD-ROM is stored separately in the respective subdirectories. Similarly to the contents stored on the BD-ROM, the subdirectories contain PlayList information (00002.mpls), Clip information (00002.clpi, 00003.clpi, 00004.clpi, and 00005.clpi), and AV clips (00002.m2ts, 00003.m2ts, 00004.m2ts, and 00002.m2ts).

Next, the following describes PlayList information, Clip information, and AV clips, all of which are component of the local storage 200.

<Structure of Local Storage 200: 1. AV Clip>.

The AV clips (00002.m2ts, 00003.m2ts, 00004.m2ts, and 00005.m2ts) stored on the local storage 200 constitutes Sub-Clips each of which is an AV clip composed of one ore more Out-of-MUX streams. An Out-of-MUX stream refers to an elementary stream to be presented during playback of an AV clip containing a video stream but not multiplexed with the video stream. In addition, a process of reading and decoding an Out-of-MUX stream to playback the Out-of-MUX stream during video stream playback is referred to as "Out-of-MUX stream frame work".

The types of Out-of-MUX streams include "primary audio stream", "secondary audio stream", "presentation graphics (PG) stream", and "interactive graphics (IG) stream".

According to the embodiment 1, among four AV clips illustrated in FIG. 11, the 00002.m2ts file contains a primary audio stream, the 00003.m2ts file contains a secondary audio stream, the 00004.m2ts file contains a PG stream, and the 00005.m2ts file contains an IG stream. Yet, the stored contents are just one example and it is applicable that the four Out-of-MUX streams are multiplexed into one SubClip. Hereinafter, the details of Out-of-MUX streams will be described.

<Description of Out-of-MUX Stream: 1. Primary Stream & Secondary Stream>

The "primary audio stream" carries main audio data, whereas the "secondary audio stream" caries auxiliary audio data. At the time of SubClip playback, audio playback of the secondary audio stream is mixed with audio playback of the primary audio stream before output. Examples of audio data carried by the secondary audio stream include "commentary". In the case where the primary audio stream provides speech and BGM of a movie, which is a main feature, and the secondary stream provides director's commentary, the sound of speech and BGM of the movie is mixed with the audio of the commentary before output.

The secondary audio stream is stored only on the local storage 200 and supplied for playback, but not stored on the BD-ROM. On the other hand, the primary audio stream may be stored on the BD-ROM or on the local storage 200. In addition, the primary audio stream may be coded using a different scheme from that used for coding the secondary audio stream.

Figure 12:
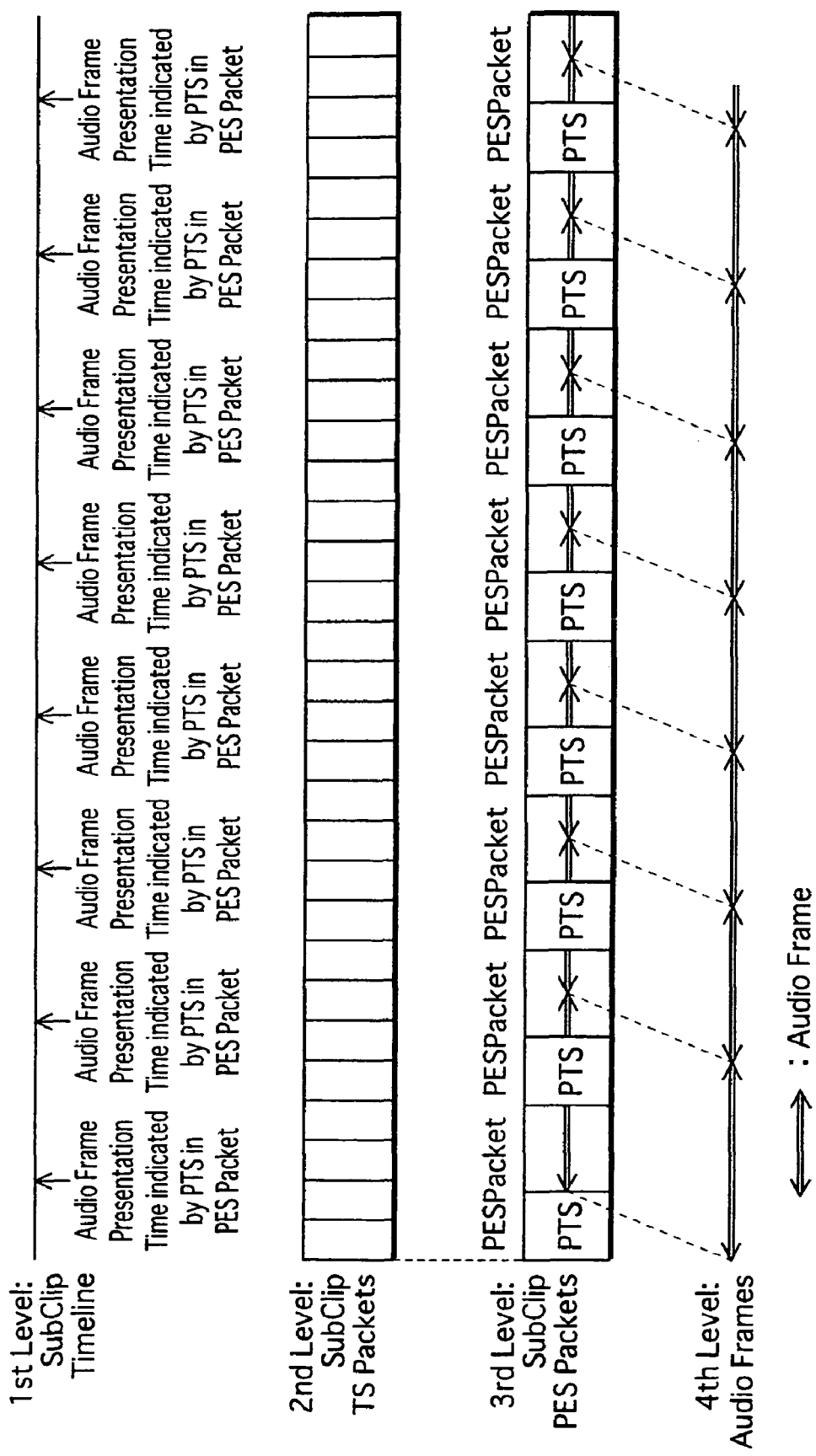
FIG. 12 illustrates the internal structures of a primary audio stream and a secondary audio stream.

FIG. 12 illustrates the internal structure of either of the primary and secondary audio streams. In the figure, the first level illustrates the timeline referenced during SubClip playback (SubClip timeline). The second level illustrates TS packets constituting the SubClip. The third level illustrates PES packets constituting the SubClip. The fourth level illustrates audio frames constituting the primary or secondary audio stream. As illustrated in the figure, the SubClip is manufactured by converting frames of the primary or secondary audio stream into PES packets (illustrated on the third level), and further converting the PES packets into TS packets (illustrated on the second level).

The header of a PES packet contains PTS indicating the presentation start time of the audio frame contained in the PES packet. That is, with reference to the PTS, the playback timing of the audio frame contained in the PES packet is specified on the SubClip timeline. Thus, the header of each PES packet is subjected to the stream analysis.

<Description of Out-of-MUX Stream: 2. PG Stream>

Figure 13:
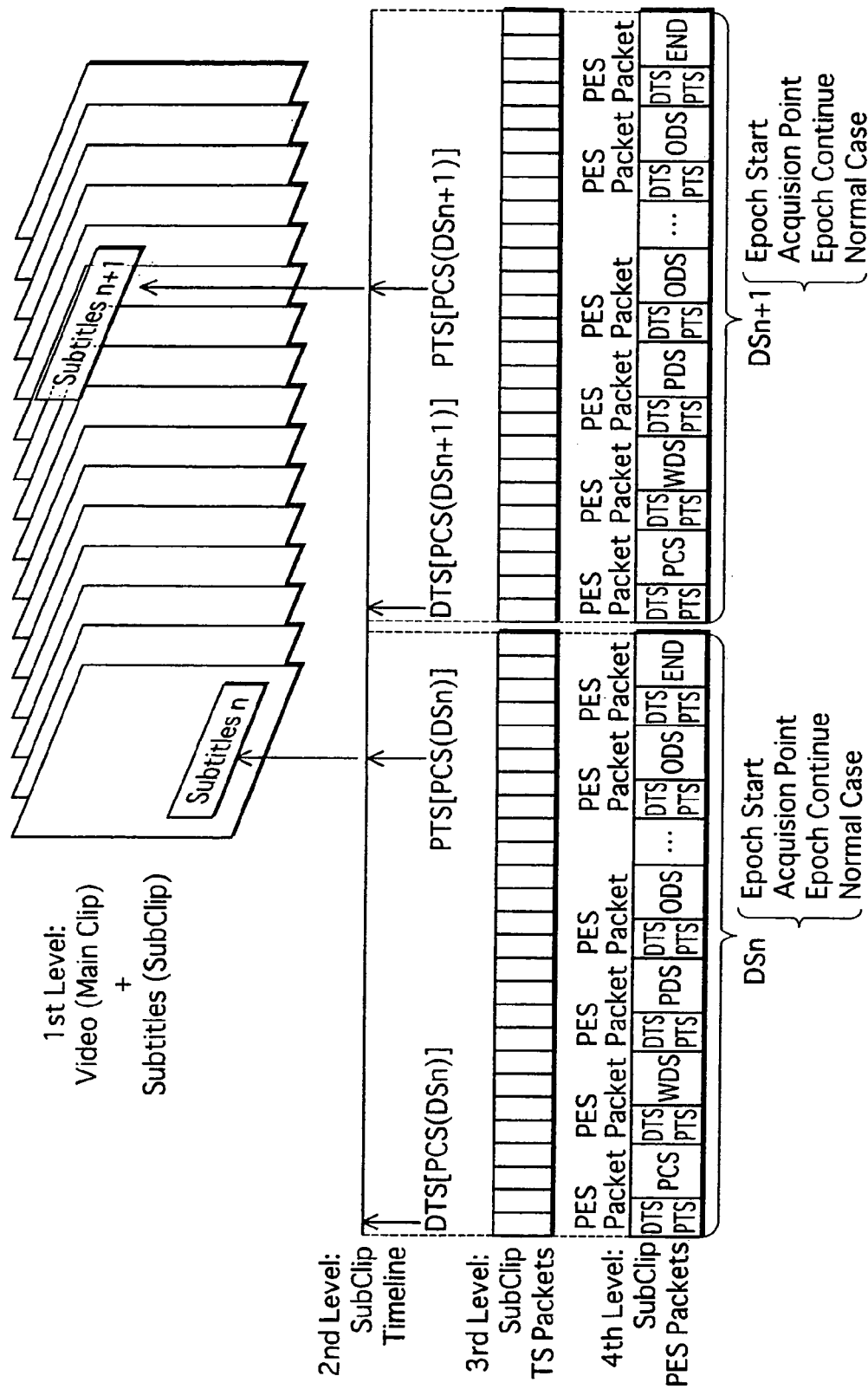
FIG. 13 illustrates the internal structure of a PG stream.

A PG stream is an elementary stream for synchronously presenting subtitles with video playback. FIG. 13 illustrates the internal structure of a PG stream. In the figure, the fourth level illustrates PES packets constituting the SubClip, and the third level illustrates TS packets constituting the SubClip. The second level illustrates the SubClip timeline. The first level illustrates composite pictures obtained by decoding and overlaying the PG stream contained in the SubClip on the video stream contained in the Main Clip.

The following describes the structure of the PES packets constituting the SubClip, illustrated on the fourth level.

Each PES packet of the SubClip is generated by attaching a PES packet header to a sequence of functional segments, namely PCS (Presentation Control Segment), PDS (Pallet Definition Segment), WDS (Window Definition Segment), ODS (Object Definition Segment), and END (END of Display Set Segment).

The ODS defines graphics data for presentation of text subtitles.

The WDS defines a rendering area for the display of graphics data on a screen.

The PDS defines output colors for rendering the graphics data.

The PCS defines page control for presentation of text subtitles. The page control includes Cut-In/Out, Fade-In/Out, Color Change, Scroll, Wipe-In/Out. Under the page control defined by PCS, it is possible to realize a display effect of gradually erasing a set of text subtitles and presenting a next set of text subtitles.

The END defines the end of the sequence of functional segments defining presentation of text subtitles.

The PES packet header includes timestamps, such as PTS and DTS. The timestamps indicate the start timing of decoding the functional segments and the presentation timing of the graphics defined by the functional segments. The sequence of functional segments starting with the PCS and end with END is referred to as a "Display Set (DS)". The third level illustrates TS packets obtained by converting the PES packets. The second level illustrates the timeline referenced for playback of the SubClip (SubClip timeline). The DTS included in the PCS indicates on the SubClip timeline the timing for decoding the PCS. The PTS included in the PCS indicate on the SubClip timeline the presentation timing of graphics defined by the DS, which starts with the PCS. At the timing indicated by the PTS, the composite pictures illustrated on the first level are displayed.

The types of DSs include "Epoch Start", "Acquisition Point", "Normal Case", and "Epoch Continue".

An "Epoch Start" DS indicates the start of a new Epoch. An Epoch is a time period of continuous memory management on the timeline of the AV clip playback, and also refers to a group of data allocated to that time period. Thus, an Epoch Start DS contains all functional segments necessary for the next screen composition. An Epoch Start DS is provided at a point that will be accessed during skip playback, such as the start of a chapter in the movie.

An "Acquisition Point" DS is not the start of an Epoch but contains all functional segments necessary for the next screen composition. Therefore, graphics can be reliably displayed if playback is started from an Acquisition Point DS. That is to say, an Acquisition Point DS enables a display composition to be made from a midpoint in the Epoch. An Acquisition Point DS is provided at a point to which a skip operation may be made.

A "Normal Case" DS contains only a difference from the immediately preceding DS. For example, if the subtitles presented by a DSv are identical to the subtitles presented by the immediately preceding DSu but different in screen layout, the DSv contains a PCS and an END only and serves as a Normal Case DS. This arrangement eliminates the need to provide overlapping ODSs in DSs, so that the amount of data stored on the BD-ROM is reduced. Since a Normal Case DS only contains the difference, no display composition can be presented with the Normal Case DS alone.

An "Epoch Continue" DS indicates the Epoch of the AV clip continues from another AV clip if playback of the two AV clips shall be continuous. This concludes the description of the functional segments constituting the PG stream.

<Description of Out-of-MUX Stream: 3. IG Stream>

The IG stream is an elementary stream for synchronous presentation of text subtitles with video playback.

Figure 14:
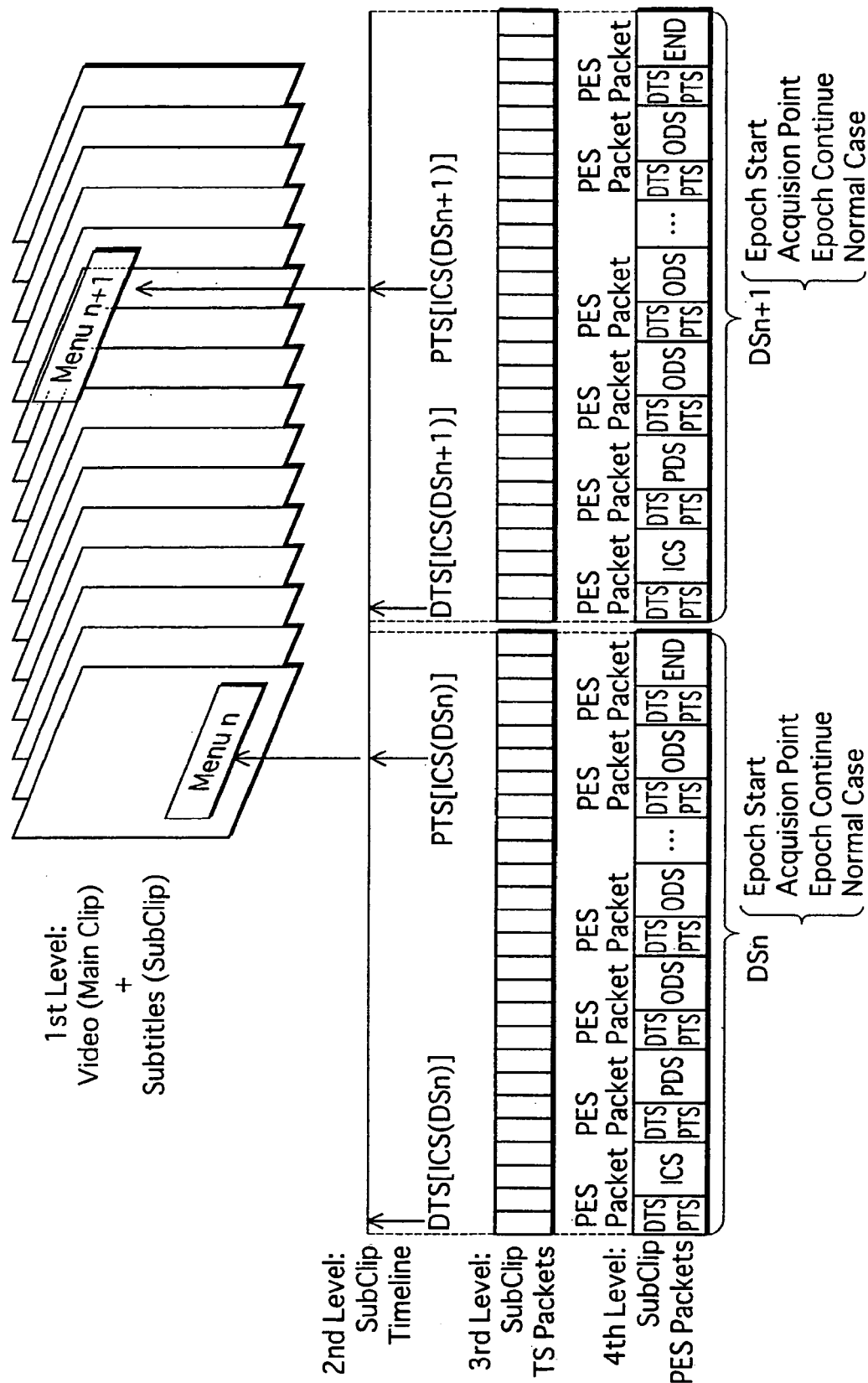
FIG. 14 illustrates the internal structure of an IG stream.

FIG. 14 illustrates the internal structure of an IG stream. The fourth level illustrates PES packets constituting a Sub- Clip. The third level illustrates TS packets constituting the SubClip. The second level indicates the SubClip timeline. The first level illustrates composite pictures obtained by decoding and overlaying the IG stream, which is an Out-of-MUX stream, and the video stream, which is the Main Clip.

Now, the following describes the PES packets illustrated on the fourth level.

The PES packets of the SubClip is generated by attaching a PES packet header to a sequence of functional segments, namely ICS (Interactive Composition Segment), PDS (Pallet Definition Segment), ODS (Object Definition Segment), and END (END of Display Set Segment).

The ODS defines graphics data used for rendering a button.

The PDS defines output colors used for rendering graphics data.

The ICS defines interactive control for changing the button state in response to a user operation.

The END defines the end of the sequence of functional segments defining presentation of a menu.

The header of a PES packet includes timestamps, such as PTS and DTS. The timestamps indicate the start timing of decoding the functional segments and the presentation timing of the graphics defined by the functional segments. The sequence of functional segments starting with the PCS and end with END is referred to as a "Display Set". Similarly to DSs contained in the PG stream, the types of DSs include "Epoch Start", "Acquisition Point", "Normal Case", and "Epoch Continue".

In FIG. 14, the third level illustrates TS packets obtained by converting the PES packets. The second level illustrates the timeline referenced during SubClip playback (SubClip timeline). The DTS included in the ICS indicates on the SubClip timeline the timing for decoding the ICS. The PTS included in the ICS indicate on the SubClip timeline the presentation timing of graphics defined by the DS, which starts with the ICS. At the timing indicated by the PTS, the composite pictures illustrated on the first level are displayed.

A sequence of functional segments including ICS, PDS, ODS, and END is referred to as a "Display Set", which is a group of functional segments for realizing display of one menu.

This concludes the description of SubClip.

<Structure of Local Storage 200: 2. Clip Information>

Figure 15:
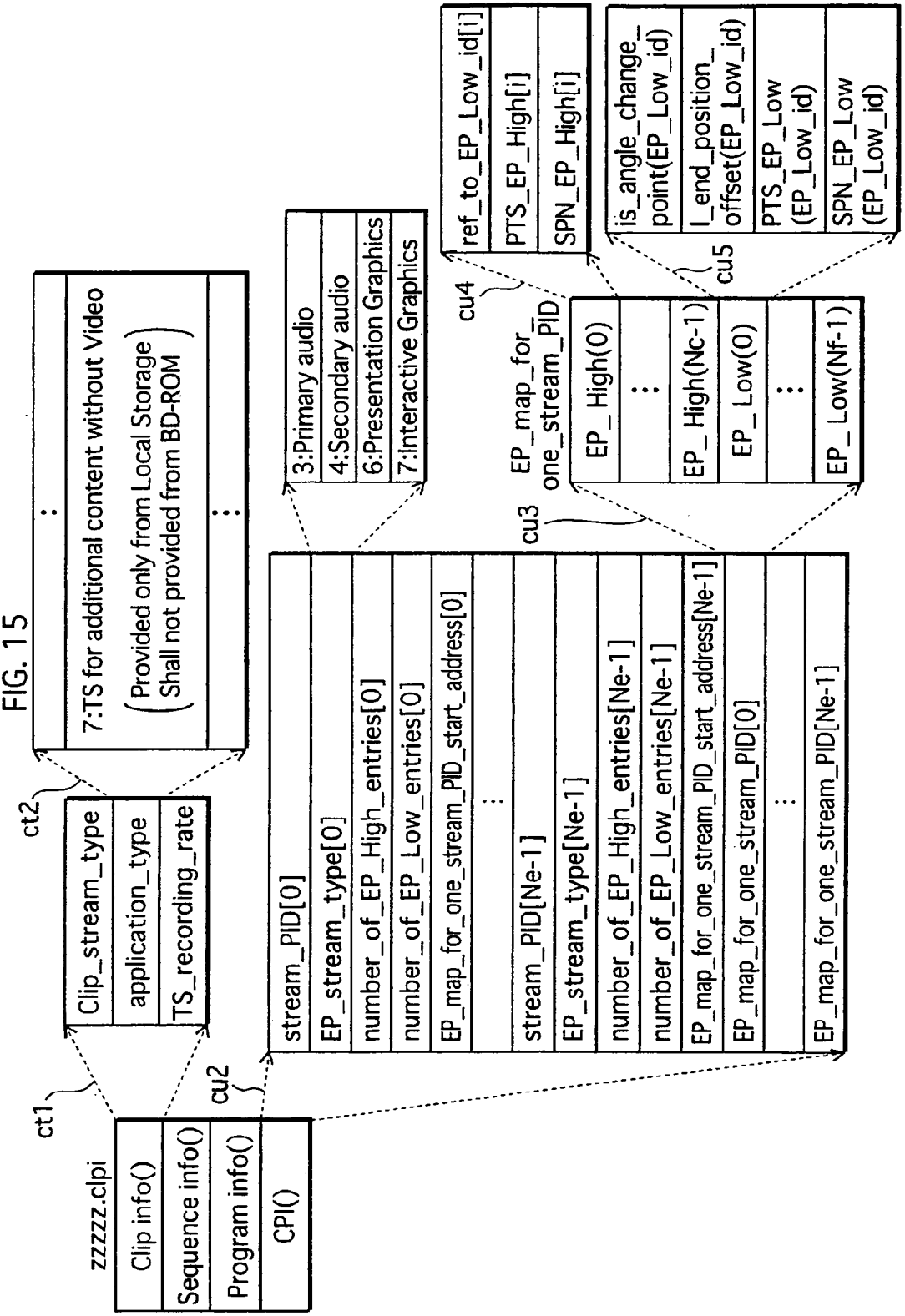
FIG. 15 illustrates the data structure of Clip information stored on the local storage.

The following describes Clip information stored on the local storage 200. FIG. 15 illustrates the data structure of Clip information stored on the local storage 200. The Clip information stored on the local storage 200 is identical in data structure to the Clip information stored on the BD-ROM 200. Yet, the application_type, EP_map, and EP_stream_type fields are set to the values specific to the SubClip.

<Description of Clip Information in SubClip: 1. Application_type>

The following describes the application_type field illustrated in FIG. 15. If the SubClip is one of primary audio stream, secondary audio stream, PG stream, and IG stream mentioned above, the application_type is set to the value "7".

The application_type=7 indicates that the SubClip multiplexed with the Clip information is "additional contents without video". Since no video is contained, the SubClip is designed to be stored to the local storage 200 via the network and to be supplied to a playback device from the local storage 200 rather than from the BD-ROM. This concludes the description of the setting of the application_type field in the SubClip.

<Clip Information in SubClip: 1. Out-of-MUX_EP_map>

Next, the EP_map provided for the SubClip is described. The EP_map fields on the local storage 200 are presented one for each Out-of-MUX stream multiplexed in the SubClip. Each EP_map indicates a plurality of entry points of the associated Out-of-MUX stream, along with a plurality of entry times corresponding to the entry points.

The types of Out-of-MUX streams include "primary audio stream", "secondary audio stream", "PG stream", and "IG stream". Each type of Out-of-MUX stream differs in point on the stream at which the stream becomes available for playback. More specifically, the primary and secondary audio streams are each composed of a plurality of audio frames and playback can basically be started from the head of any audio frame.

In the case of PG and IG streams, on the other hand, it is required that a Display Set composed of a complete set of functional segments be supplied to a decoder. A DS composed of a complete set of functional segments refers to a DS other than "Normal Case". That is, "Epoch Start", "Acquisition Point", and "Epoch Continue" DSs are each composed of a complete set of functional segments, and the first PCS and the first ICS in such DSs serve as entry points.

As described above, each type of Out-of-MUX stream differs in point on the stream at which decoding of the stream can be started. Thus, each EP_map has a different structure depending on the type of Out-of-MUX stream associated with the EP_map. An EP_map associated with an Out-of-MUX stream is referred to as an "Out-of-MUX_EP_map".

<Details of Out-of-MUX_EP_map: 2. Out-of-MUX_EP_map for Audio>

Next, the following describes the structure of EP_map associated with a primary or secondary audio stream. The EP_map associated with a primary or secondary audio stream differs from the EP_map associated with video in time intervals between adjacent entry points. More specifically, in the EP_map for video, entry points are set at relatively short time intervals not greater than one second. On the other hand, entry points in the EP_map for audio are set at longer time intervals of five seconds.

Figure 16:
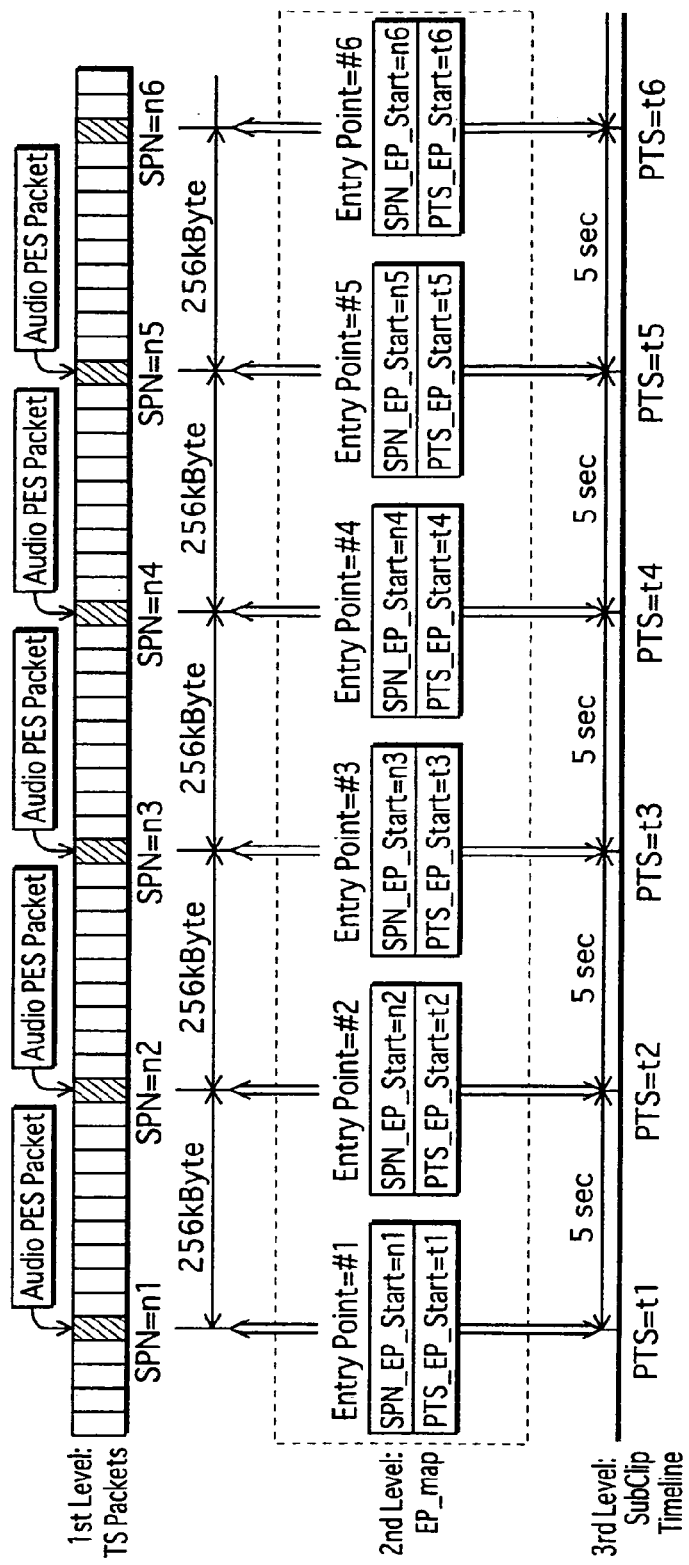
FIG. 16 illustrates an EP_map for a primary or secondary audio stream.

FIG. 16 illustrates the EP_map for a primary or secondary audio stream. The structure of the EP_map illustrated in the figure is such that entry points are set so as to correspond to entry times set at constant time intervals of five seconds. In the figure, the third level illustrates the SubClip timeline, and t1-t6 on the SubClip timeline denote entry times. The entry times t1, t2, t3, t4, t5, and t6 are set at constant time intervals of five seconds. The second level illustrates the EP_map. Each PTS_EP_start field illustrated on the second level indicates an entry time.

The first level illustrates TS packets constituting the primary or secondary audio stream. Among the TS packets, SPN=n1, n2, n3, n4, n5, and n6 are set to indicate entry points, and the SPN_EP_start fields illustrated on the second level are set to indicate n1-n6. Since the SPN_EP_start of each entry point is set to correspond PTS_EP_start, the entry times at five seconds intervals correspond to entry points.

In the EP_map of the primary or secondary audio stream, the interval between each two adjacent entry points may be the data interval of 256K bytes. This interval of 256K bytes is calculated by multiplying the transfer rate of the secondary audio stream by the time interval of five seconds. Since the time interval set in the EP_map is five seconds, the stream analysis needs to cover at most five seconds of data. This concludes the description of the EP_map set for the primary or secondary audio stream.

<Details of Out-of-MUX_EP_map: 3. EP_map for PG Stream>

Next, an EP_map set for a PG stream will be described.

Figure 17:
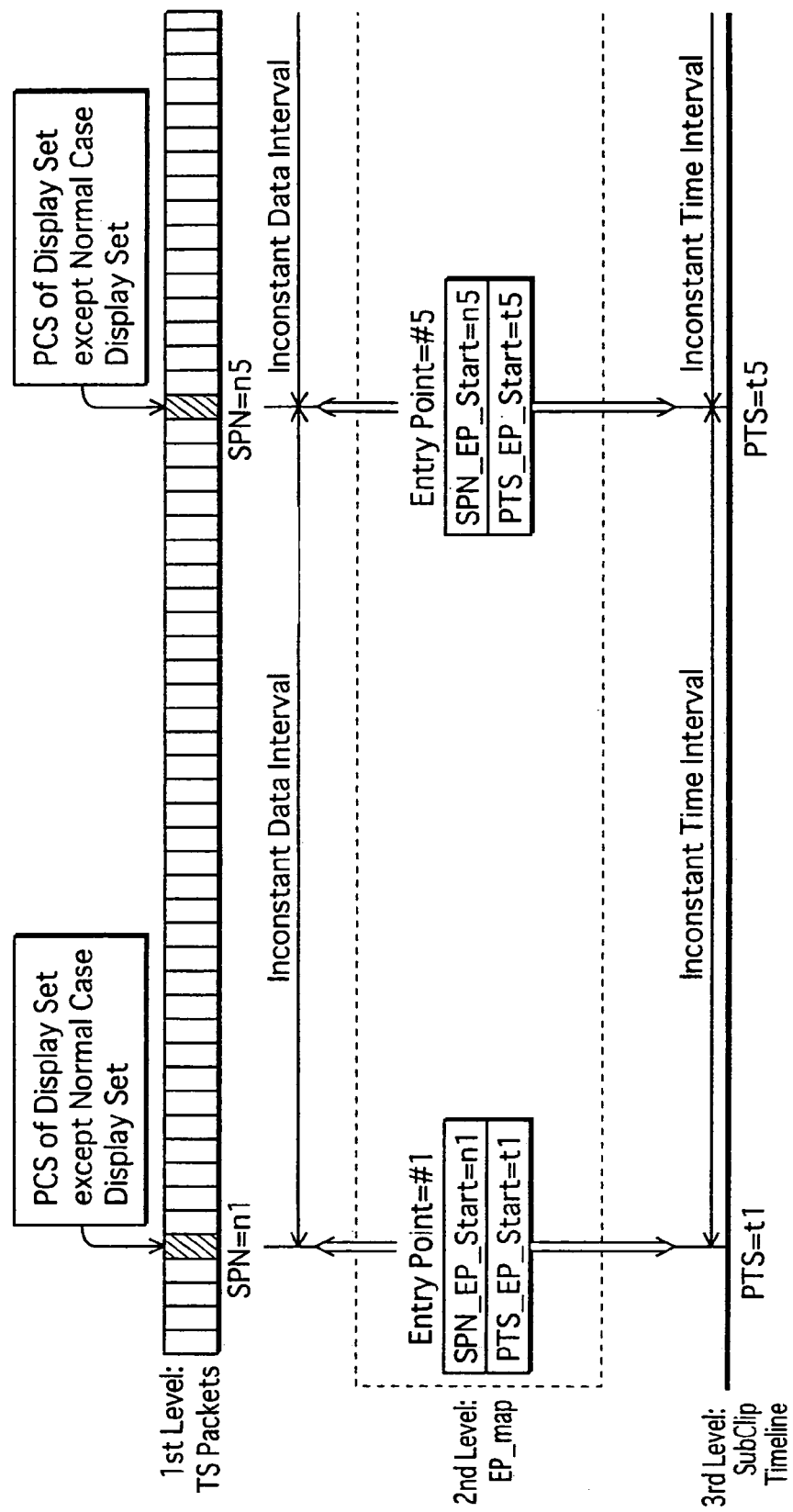
FIG. 17 illustrates an EP_map set on the PG stream timeline.

FIG. 17 illustrates the EP_map set on the PG stream timeline. In the figure, the first level illustrates TS packets constituting the PG stream. The second level illustrates the EP_map. The third level illustrates the SubClip timeline. On the first level, the first PCS in each DS which is not a Normal Case DS is present at points specified by SPN=n1 and n5. These points n1 and n5 are determined as entry points. On the other hand, the PTSs of the PCSs specify the temporal points t1 and t5 on the SubClip timeline illustrated on the third level. Thus, the EP_map shows SPN=n1 and n5, together with the corresponding PTS=t1 and t5, respectively.

As above, the head of each complete set of functional segments coincides with an entry time shown by the PTS of PCS. Consequently, with reference to the EP_map, presentation of graphics can be started from some mid point of the stream without conducting stream analysis.

<Details of Out-of-MUX_EP_map: 4. EP_map for IG Stream>

Figure 18:
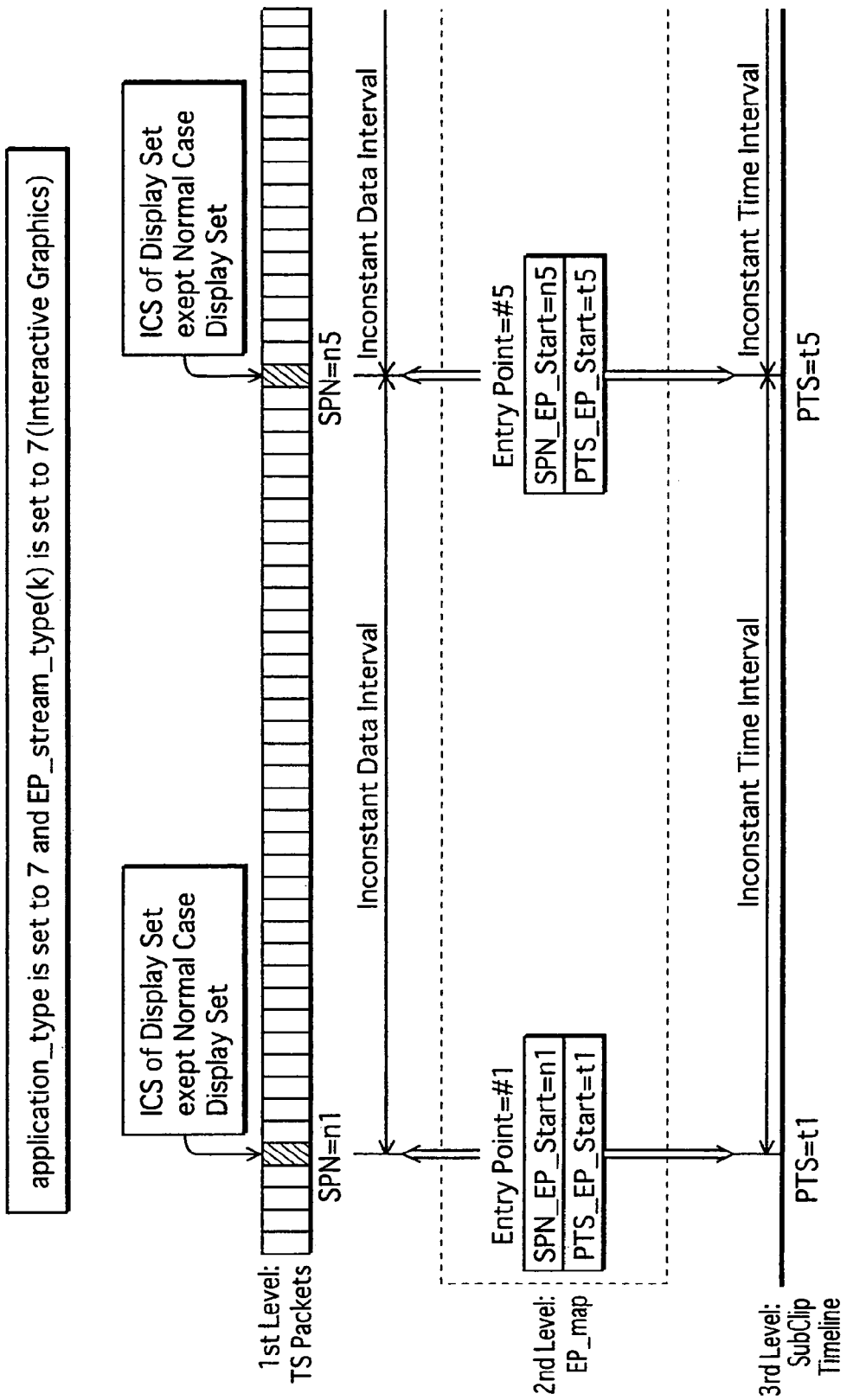
FIG. 18 illustrates an EP_map set on the IG stream timeline.

FIG. 18 illustrates the EP_map set on the IG stream timeline. In the figure, the first level illustrates TS packets constituting the IG stream. The second level illustrates the EP_map. The third level illustrates the SubClip timeline. On the first level, the first ICS in each DS which is not a Normal Case DS is present at points specified by SPN=n1 and n5. These points n1 and n5 are determined as entry points. On the other hand, the PTSs of the ICSs specify the temporal points t1 and t5 on the SubClip timeline illustrated on the third level, the EP_map show the SPN=n1 and n5, together with the corresponding PTS=t1 and t5, respectively.

As above, the head of each complete set of functional segments coincides with an entry time shown by the PTS of ICS. Consequently, with reference to the EP_map, presentation of menu display can be started from some mid point of the stream without conducting stream analysis.

The above description clarifies that the structure of EP_map differs depending on the type of Out-of-MUX stream associated with the EP_map. This concludes the description of the EP_map included in the Clip information stored on the local storage 200. The following describes the EP_stream_type field included in the Clip information stored on the local storage 200.

<Description of Clip Information in SubClip: 3. EP_stream_type>

The EP_stream_type is provided for each Out-of-MUX stream multiplexed in the SubClip and indicates one of the EP_map structures illustrated in FIGS. 16-18. That is, when i-th Out-of-MUX stream multiplexed in one SubClip is denoted as Out-of-MUX stream[i], the EP_stream_type[i] indicates the type of EP_map_for_one_stream associated with the Out-of-MUX stream[i] and set to one of the values of "3", "4", "6", and "7". When set to the value of "3" or "4", the EP_stream_type indicates the EP_map structure specific to a primary or secondary audio stream. That is, the EP_map of that type shows entry times set at constant time intervals or entry points set at constant data intervals, as illustrated in FIG. 16. When set to the value of "6", the EP_stream type indicates the EP_map structure specific to a PG stream. That is, the EP_map of that type shows, as entry points, the head of each DS other than Normal Case. DS (as illustrated in FIG. 17). When set to the value of "7", the EP_stream type indicates the EP_map structure specific to the IG stream. That is, the EP_map of that type shows, as entry points, the head of each DS other than Normal Case DS (as illustrated in FIG. 18).

Since the EP_stream_type clearly indicates the structure of the associated EP_map, it is known whether stream analysis is required from an entry point shown by the EP_map or data is to be read starting from an entry point shown by the EP_map and supplied to the decoder.

<Description of Clip Information in SubClip: 4. Significance of EP_stream_type>

The following describes the technical significance of the provision of the EP_stream_type field in the Out-of-MUX_EP_map field.

In the case where an entry time is specified as an access point, playback can be started immediately. However, in the case where a requested access point does not coincide with an entry time, stream analysis needs to be carried out. If no information is provided as to the time intervals between adjacent entry times or the types of data designated as entry points, the playback device cannot estimate the maximum degrees of stream analysis that would be sufficient. Not knowing the maximum degree of stream analysis that would be required, it is possible that a response of the playback device to a user operation will be notably delayed.

In view of the above undesirable possibility, the Out-of-MUX_EP_map includes the EP_stream_type that indicates the time intervals between entry times and the data types of entry points. When set to the value of "3" or "4", the EP_stream_type indicates that the entry points are at constant time intervals of 5 sec. With reference to such EP_stream_type, the playback device will recognize that stream analysis, if required, covering 5 seconds of data would be sufficient. In other words, the playback device will be informed that any desired point can be accessed at random by analyzing at most five seconds data of the Out-of-MUX stream.

When set to either "6" or "7", the EP_stream_type indicates that the entry points are located at the heads of DSs each composed of a complete set of functional segments. When starting playback, the playback device reads functional segments starting from any of the entry points located at in constant intervals. Consequently, it is ensured that subtitles or a menu is presented starting from any intended playback point without stream analysis.

Since the EP_stream_type causes the playback device to judge whether up to five seconds of stream data needs to be analyzed or no stream analysis is required at all. Thus, even if not only the Main Clip but also the SubClip needs to be accessed at random, the playback device is not subject to excessive burden. As a result of the reduced burden, response of the playback device to a user operation improves.

This concludes the description of the Clip information stored on the local storage 200.

<Structure of Local Storage 200: 3. PlayList Information>

Figure 19:
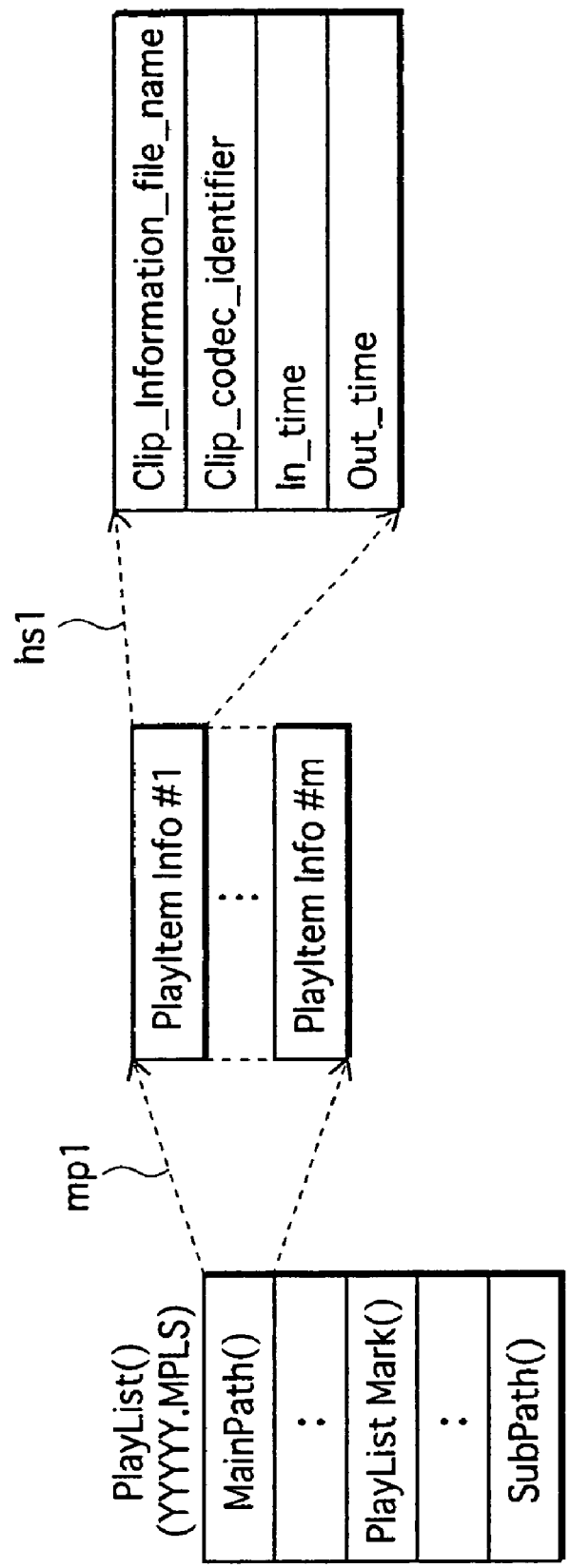
FIG. 19 illustrates the data structure of PlayList information.

Next, a description is given of PlayList information stored on the local storage 200. Each file with the extension "mpls" (00001.mpls) stores PlayList (PL) information. PlayList information defines, as a PlayList (PL), two playback paths called "Main Path" and "SubPath" bundled together. FIG. 19 illustrates the data structure of PlayList information. As illustrated in the figure, the PlayList information is composed of: MainPath information (MainPath( )) defining a Main Path; PlayListMark information (PlayListMark( )) defining chapters; and SubPath information (SubPath( )) defining a SubPath.

A Main Path is a playback path defined on the main AV clip, whereas the SubPath is a playback path defined on the SubClip.

<PlayList Information: 1. MainPath Information>

First, the Main Path is described. The main path is a playback path defined on a video or audio stream carrying a main feature.

As indicated by arrows mp1, the Main Path includes a plurality of pieces of PlayItem information ( . . . PlayItem( )) . . . ). Each piece of PlayItem information defines one or more logical units each specify a playback section constituting the Main Path. As leader lines hs1 indicate, the structure of a piece of PlayItem information is illustrated in detail. As illustrated, the PlayItem information is composed of the following fields: "Clip_information_file_name" indicating the name of a file containing the playback section information of the AV clip to which the In-point and Out-point of the playback section belong; "Clip_codec_identifier" indicating the coding type of the AV clip; and "In_time" which is timing information indicating the start point of the playback section; and "Out_time" which is timing information indicating the end point of the playback section.

Figure 20:
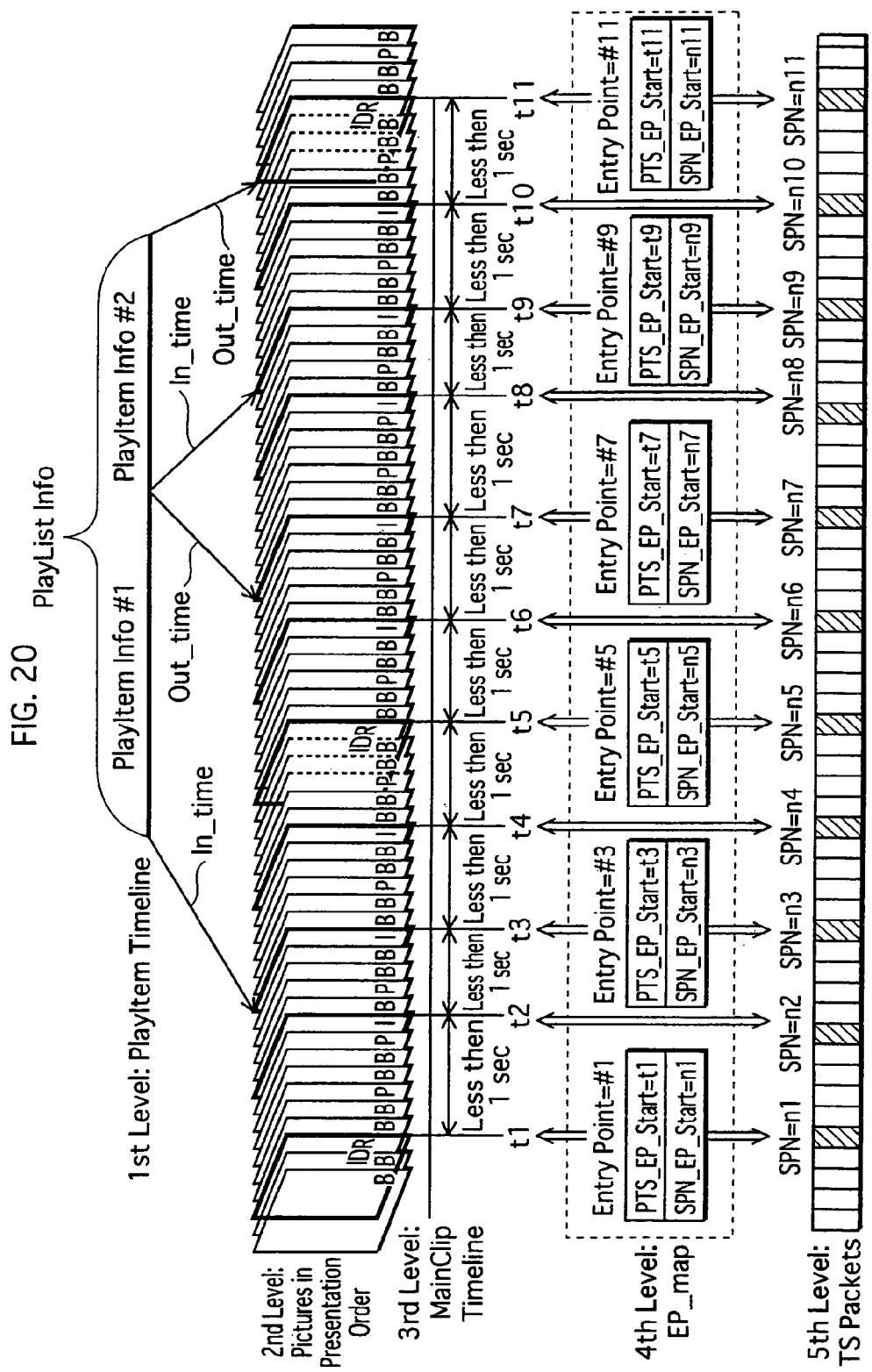
FIG. 20 illustrates the relationship between the Main Clip and the PlayList information.

FIG. 20 illustrates the relationship between the Main Clip and the PlayList information. The first level illustrates the timeline of the PlayList information. The second to fifth levels illustrate the video stream referenced to by the EP_map (identical to FIG. 5).

The PlayList information includes two pieces of PlayItem information, which are PlayItem Info #1 and PlayItem Info #2. The pairs of In_time and Out_time in the respective pieces of PlayItem Info #1 and #2 define two playback sections. When aligning the two playback sections, a timeline that is different from the AV clip timeline is defined. This timeline is the PlayItem timeline illustrated on the first level. As described herein, by defining PlayItem information, a different timeline from the AV clip timeline is defined.

<Description of PlayList Information: 2. PlayListMark>

This concludes the description of PlayItem information according to the embodiment 1. Now, PlayListMark information will be described.

Figure 21:
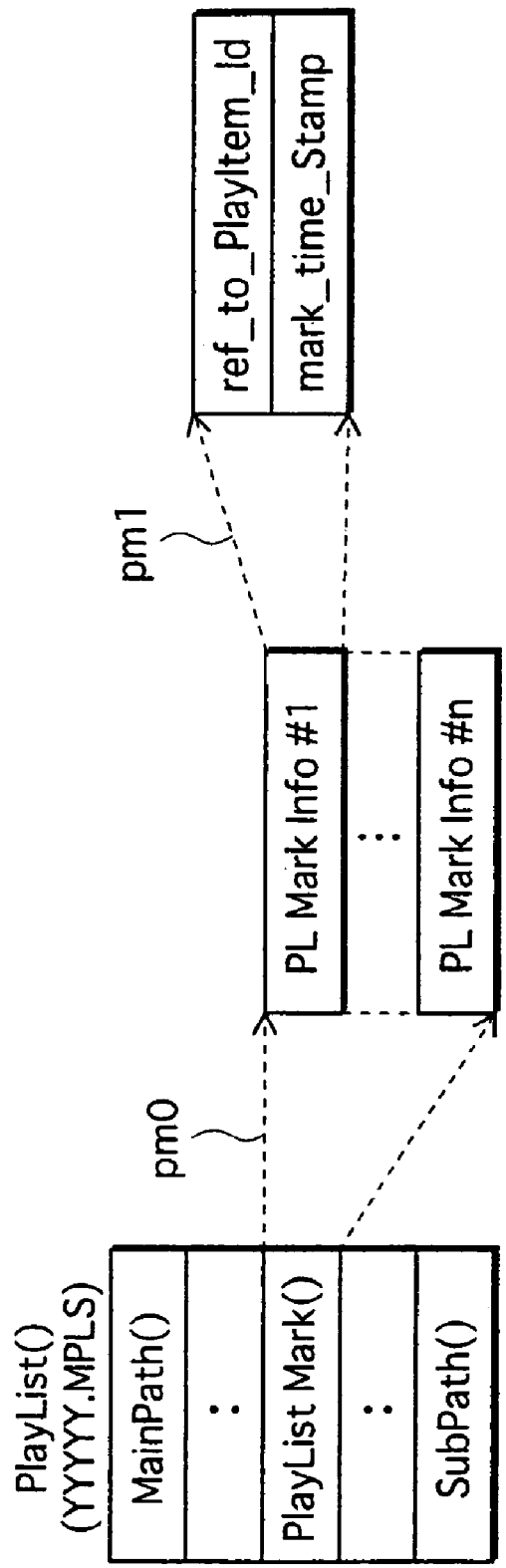
FIG. 21 illustrates the internal structure of PlayListMark information in PlayList information.

FIG. 21 illustrates the internal structure of PlayListMark information included in the PlayList information. As indicated by leader lines pm0, the PlayListMark information is composed of a plurality of pieces of PLMark information (PLMark #1 to PLMark #n). Each piece of PLMark information (PLMark( )) specifies an arbitrary portion on the PL timeline as a chapter point. As indicated by leader lines pm1, the PLMark information is composed of the following fields: "ref_to_PlayItem_id" indicating a PlayItem in which a chapter is to be designated; and "mark_time_stamp" specifying the position of a chapter in the PlayItem using time notation.

Figure 22:
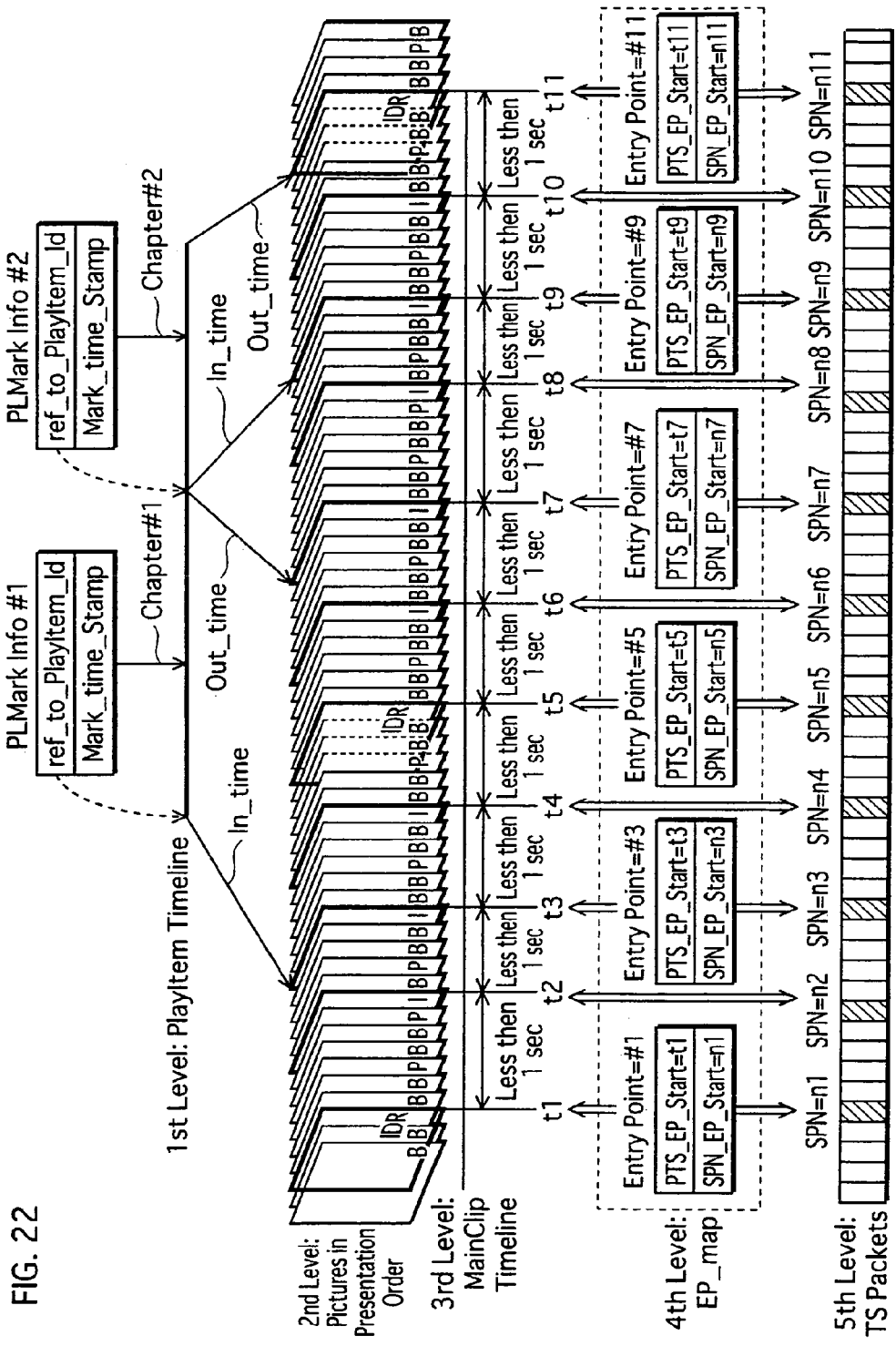
FIG. 22 illustrates chapter positions specified by the PLMark information included in the PlayList information.

FIG. 22 illustrates chapter positions specified by the PLMark information included in the PlayList information. The second to fifth levels illustrate the EP_map and the AV clip identical to those illustrated in FIG. 20.

The first level in the figure illustrates the PlayListMark information and the PL timeline. On the PL timeline, two pieces of PLMark information #1 and #2 are present. Arrows kt1 and kt2 in the figure represent the designation by the ref_to_PlayItem_id. As shown by the arrows, the ref_to_PlayItem_id in the respective pieces of PLMark information designate the respective pieces of PlayItem information. In addition, each Mark time stamp indicates a portion on the PlayItem timeline to be designated as Chapter #1 and Chapter #2. As described herein, PLMark information defines chapter points on the PlayItem timeline.

<Description of PlayList Information: 3. SubPath Information>

As described above, the Main Path is a playback path defined within the Main Clip containing main feature video. On the other hand, the SubPath is a playback path defined within a SubClip to be played back in synchronism with the Main Path.

Figure 23:
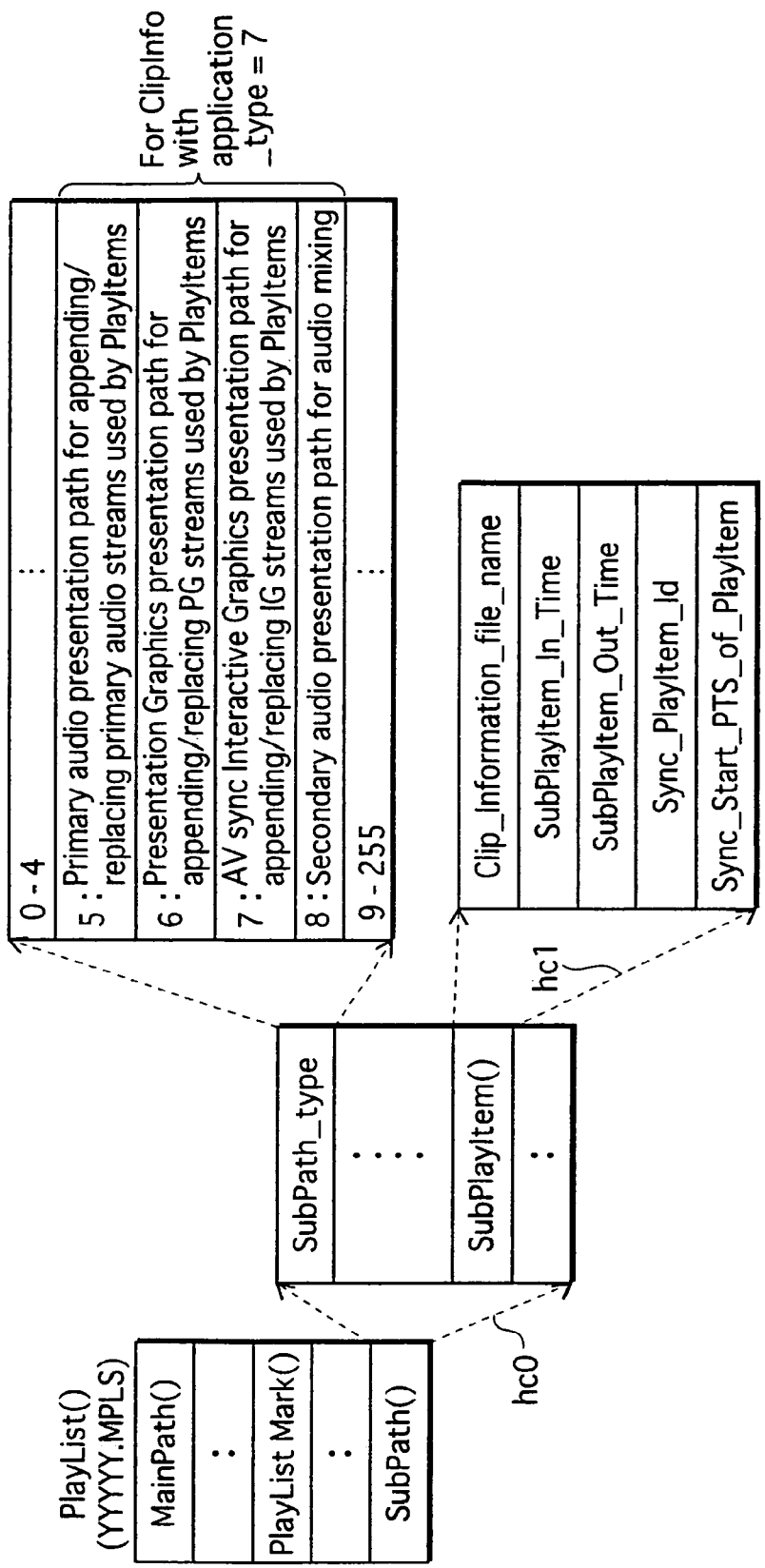
FIG. 23 illustrates the internal structure of SubPath information in detail.

FIG. 23 illustrates the internal structure of SubPath information in detail. As arrows hc0 in the figure indicate, each SubPath information includes the following fields: "Sub-Path_ type" indicating the type of the SubClip; and at least one piece of SubPlayItem information ( . . . SubPlayItem( ) . . . ).

In the figure, leader lines hc1 indicate that the structure of SubPlayItem information is illustrated in detail. As indicated by arrows hc1, the SubPlayItem information is composed of the following fields: "Clip_information_file_name", "SubPlayItem_In_Time", "SubPlayItem_Out_Time", "sync_PlayItem_id", and "sync_start_PTS_of_PlayItem".

The Clip_information_file_name specifies the name of file containing Clip information, so that the SubClip associated with the SubPlayItem is uniquely identified.

The SubPlayItem_In_time indicates on the SubClip timeline the start point of the SubPlayItem.

The SubPlayItem_Out_time indicates on the SubClip timeline the end point of the SubPlayItem.

The sync_PlayItem_id uniquely specifies one of the PlayItems constituting the Main Path, to be synchronized with the SubPlayItem. The SubPlayItem_In_time is present on the playback timeline of the PlayItem specified by the sync_PlayItem_id.

The sync_start_PTS_of_PlayItem specifies a point corresponding, on the playback timeline of the PlayItem specified by the sync_PlayItem_id, to the start point of the SubPlayItem specified by the SubPlayItem_In_time.

<SubPath Information: 1. SubPath_type>

This concludes the description of SubPath information. Next, the SubPath_type is described. The SubPath_type is set to a value from 0 to 255 to indicate the type of the SubPath specified by the SubPath information.

The value of the SubPath_type is set in relation to the contents of the Clip information specified by the Clip_information_file_name included in the SubPlayItem information, and more specifically to the application_type included in the ClipInfo. For example, the SubPath_type is set to a value from 0 to 255, and when the application_type of the ClipInfo is set to "7", the only possible values of the SubPath_type are from 5 to 8.

With the SubPath_type set to "5", the SubPath information specifies a SubPath that is a playback path on the primary audio. The playback path on the primary audio is defined for appending or replacing the primary audio playback defined by the PlayItem information.

With the SubPath_type set to "6", the SubPath information specifies a playback path on Presentation Graphics. The playback path on the PG stream according to the SubPath information is defined for appending or replacing the PG stream defined by the PlayItem information.

With the SubPath_type set to "7", the SubPath information specifies a playback path on Interactive Graphics. The playback path on the IG stream is defined for appending or replacing the PG stream defined by the PlayItem information.

With the SubPath_type set to "8", the SubPath information specifies a playback path on secondary audio. The playback path on the secondary audio stream is defined for audio mixing with the Primary audio defined by the PlayItem information.

This concludes the description of the SubPath_type.

<Details of SubPath Information: 2. Relationship Among Three>

The three used herein refers to the SubClip, the PlayList information, and the Main Clip. The SubClip and the PlayList information are both stored on the local storage 200, whereas the Main Clip is stored on the BD-ROM.

Figure 24:
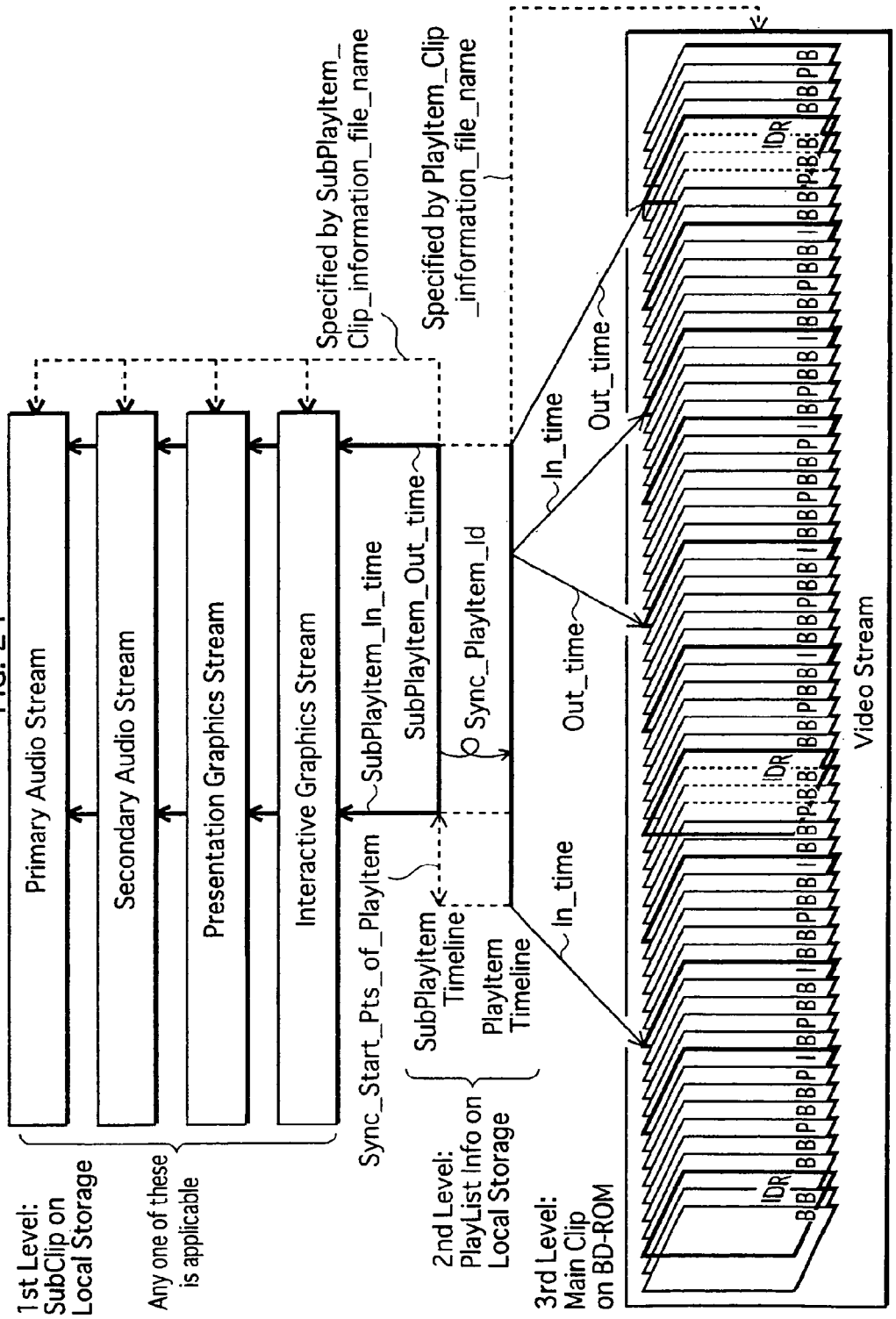
FIG. 24 illustrates the relationship among the Main Clip stored on the BD-ROM and the SubClip and the PlayList information both stored on the local storage.

FIG. 24 illustrates the relationship among the Main Clip stored on the BD-ROM and the SubClip and the PlayList information both stored on the local storage 200. In the figure, the first level illustrates the SubClips stored on the local storage 200. As illustrated, the SubClips stored on the local storage 200 include the primary audio stream, secondary audio stream, PG stream, and IG stream. One of the SubStreams specified as the SubPath is supplied for synchronous playback with the Main Stream.

The second level illustrates the two timelines defined by the PlayList information. The lower one is the PlayItem timeline defined by the PlayItem information and the upper one is the SubPlayItem timeline defined by the SubPlayItem.

As illustrated in the figure, the SubPlayItem_Clip_information_file_name specifies one of the four SubClips illustrated on the first level and a portion of the specified SubClip is designated as a playback section.

The SubPlayItem_In_time and the SubPlayItem_Out_time define the start and end points of the playback section of the SubClip.

The sync_PlayItem_id represented by an arrow in the figure specifies a PlayItem to be synchronized with the SubClip. The sync_start_PTS_of_PlayItem indicates the difference between the origin points of the PlayItem timeline and the SubPlayItem timeline.

Figure 25:
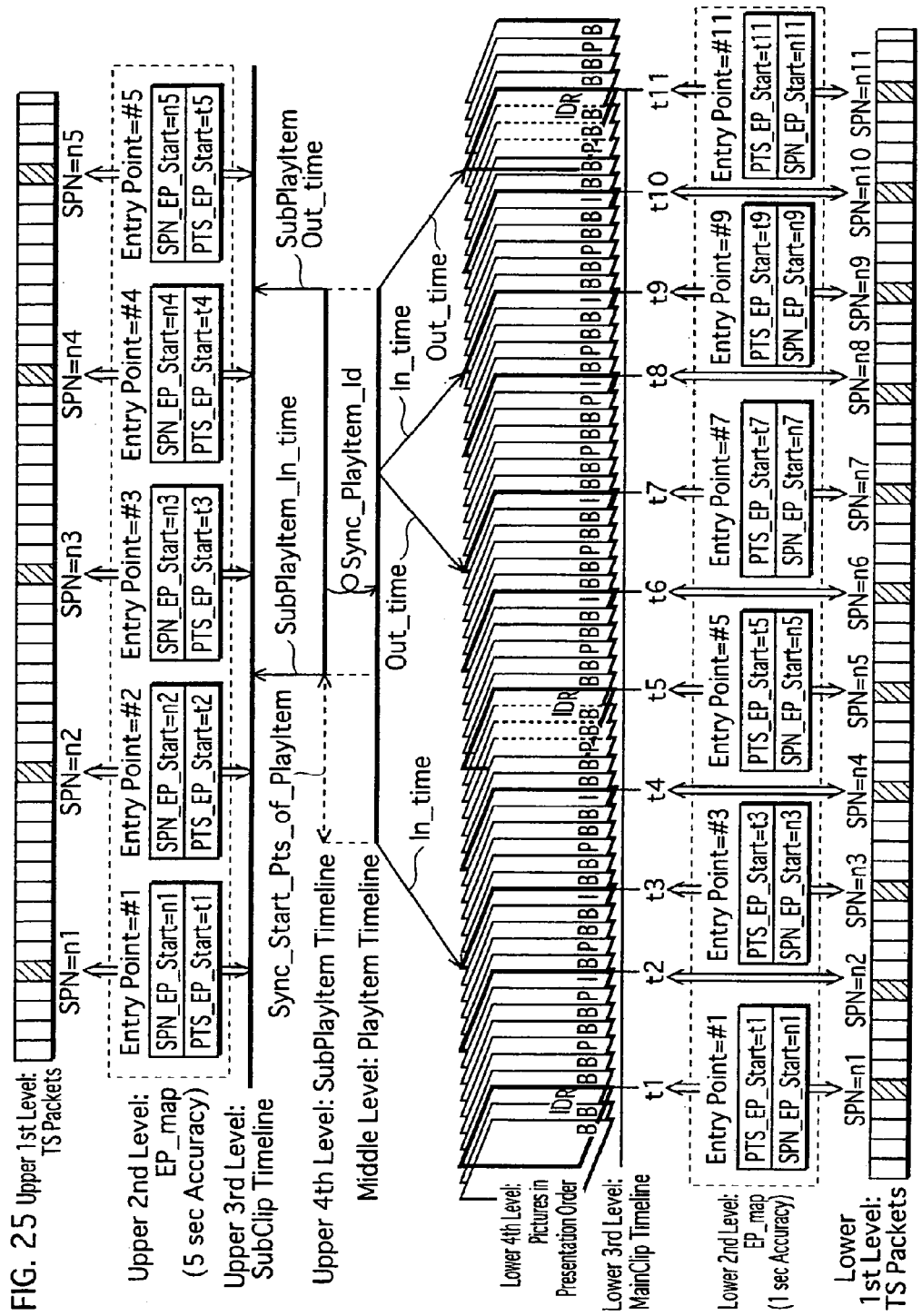
FIG. 25 illustrates the EP_map for the Main Clip, a PlayItem timeline, the EP_map for the SubClip, which is either a primary or secondary audio stream, and a SubPlayItem timeline.

FIG. 25 illustrates the EP_map for the Main Clip, the PlayItem timeline, the EP_map for the SubClip, which is either a primary or secondary audio stream, and the SubPlayItem timeline.

In the figure, the middle level and the fourth to first levels from the bottom illustrate what is illustrated in FIG. 20. More specifically, the PlayItem timeline, the sequence of pictures, the MainClip timeline, the EP_map, and the sequence of TS packets are illustrated in the stated order.

The first to third levels from the top illustrate what is illustrated in FIG. 16. More specifically, the TS packets, the EP_map, the SubClip timeline are illustrated in the stated order. The fourth level from the top illustrates the SubPlayItem timeline illustrated in FIG. 24. For the Main Clip, the entry times are set at time intervals of 1 second. For the SubClip, the entry times are set at time intervals of five seconds.

Figure 26:
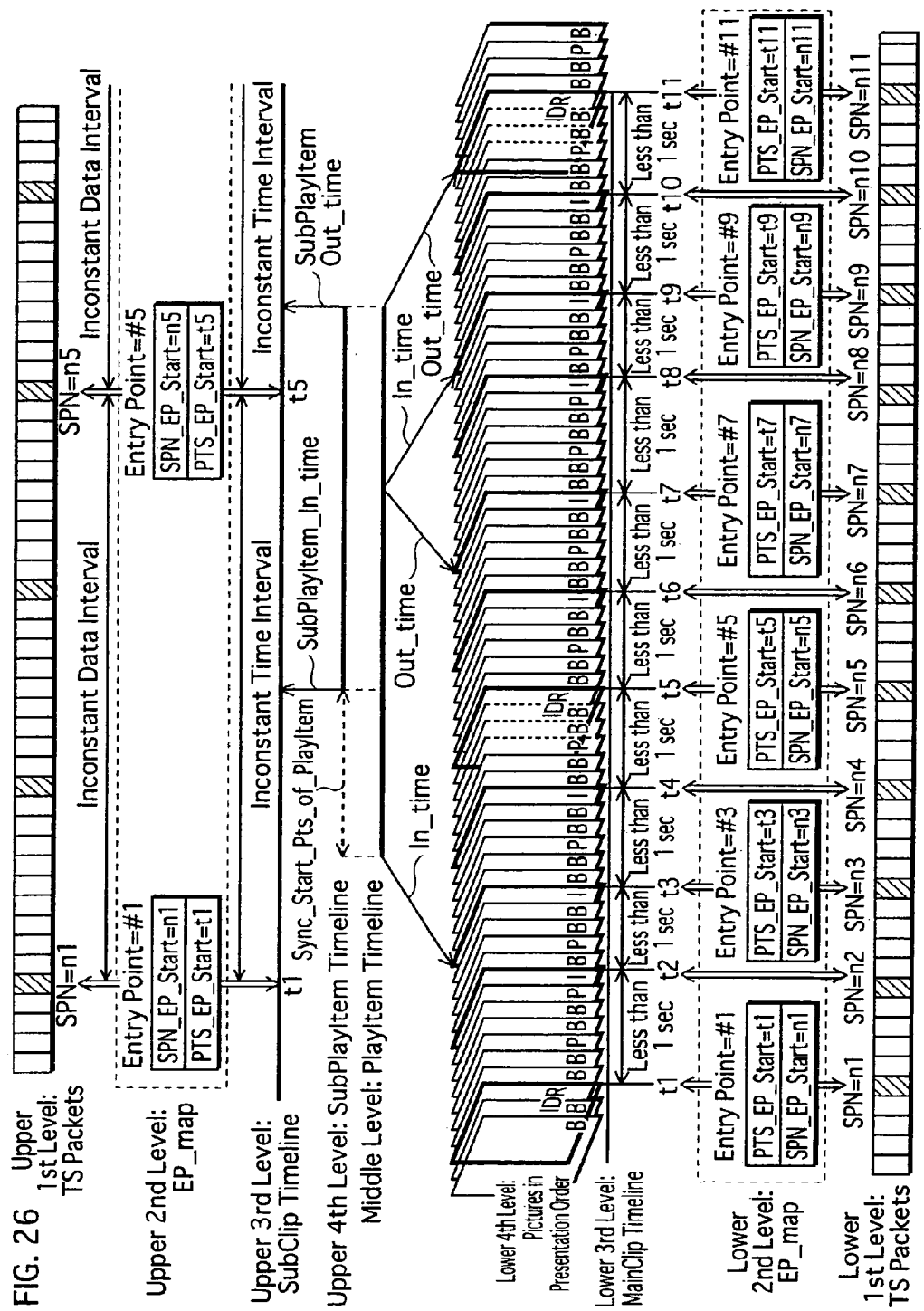
FIG. 26 illustrates the EP_map for the Main Clip, the PlayItem timeline, the EP_map for the SubClip, which is either a PG or IG stream.

FIG. 26 illustrates the EP_map for the Main Clip, the PlayItem timeline, the EP_map for the SubClip, which is either a PG or IG stream.

In the figure, the fourth to first levels from the bottom illustrate what is illustrated in FIG. 20. More specifically, the PlayItem timeline, the sequence of pictures, the MainClip timeline, the EP_map, and the sequence of TS packets are illustrated in the stated order.

The first and third levels from the top illustrate what is illustrated in FIG. 16. More specifically, the sequence of TS packets, the EP_map, and the SubClip timeline are illustrated in the stated order. The fourth level from the top illustrates the SubPlayItem timeline illustrated in FIG. 24. For the Main Clip, the entry points are set at the time intervals of one second. For the SubClip, the positions of DSs other than a Normal Case DS are set as entry points.

<Details of SubPath Information: 3. Interrelationship>

FIG. 27 shows a table of permissible combinations of the values of the SubPath_type, the application_type, and the EP_stream_type.

As shown in the table, when the SubPath_type is set to "5" and the application_type is set to "7", the EP_stream_type is set to "3". Since the EP_stream_type is set to "3", the playback device will recognize that the EP_map of this EP_stream_type is provided for primary audio playback and thus the entry points are set at time intervals of five seconds or data intervals of 256K bytes.

In the case where the SubPath_type is set to "6" and the application_type is set to "7", the EP_stream_type is set to "6". Since the EP_stream_type is set to "6", the playback device will recognize that the EP_map of this EP_stream_type is provided for playback of Presentation Graphics and thus the entry points are set at the heads of Display Sets each composed of a complete set of functional segments.

In the case where the SubPath_type is set to "7" and the application_type is set to "7", the EP_stream_type is set to "7". Since the EP_stream_type is set to "7", the playback device will recognize that the EP_map of this EP_stream_type is provided for playback of Interactive Graphics and thus the entry points are set at the heads of Display Sets each composed of a complete set of functional segments.

In the case where the SubPath_type is set to "8" and the application_type is set to "7", the EP_stream_type is set to "4". Since the EP_stream_type is set to "4", the playback device will recognize that the EP_map of this EP_stream_type is provided for secondary audio playback and thus the entry points are set at time intervals of five seconds or data intervals of 256K bytes.

This concludes the description of PlayList information, which is a component of the local storage 200. This concludes the overall description of the local storage 200.

<Virtual File System>

Figure 28:
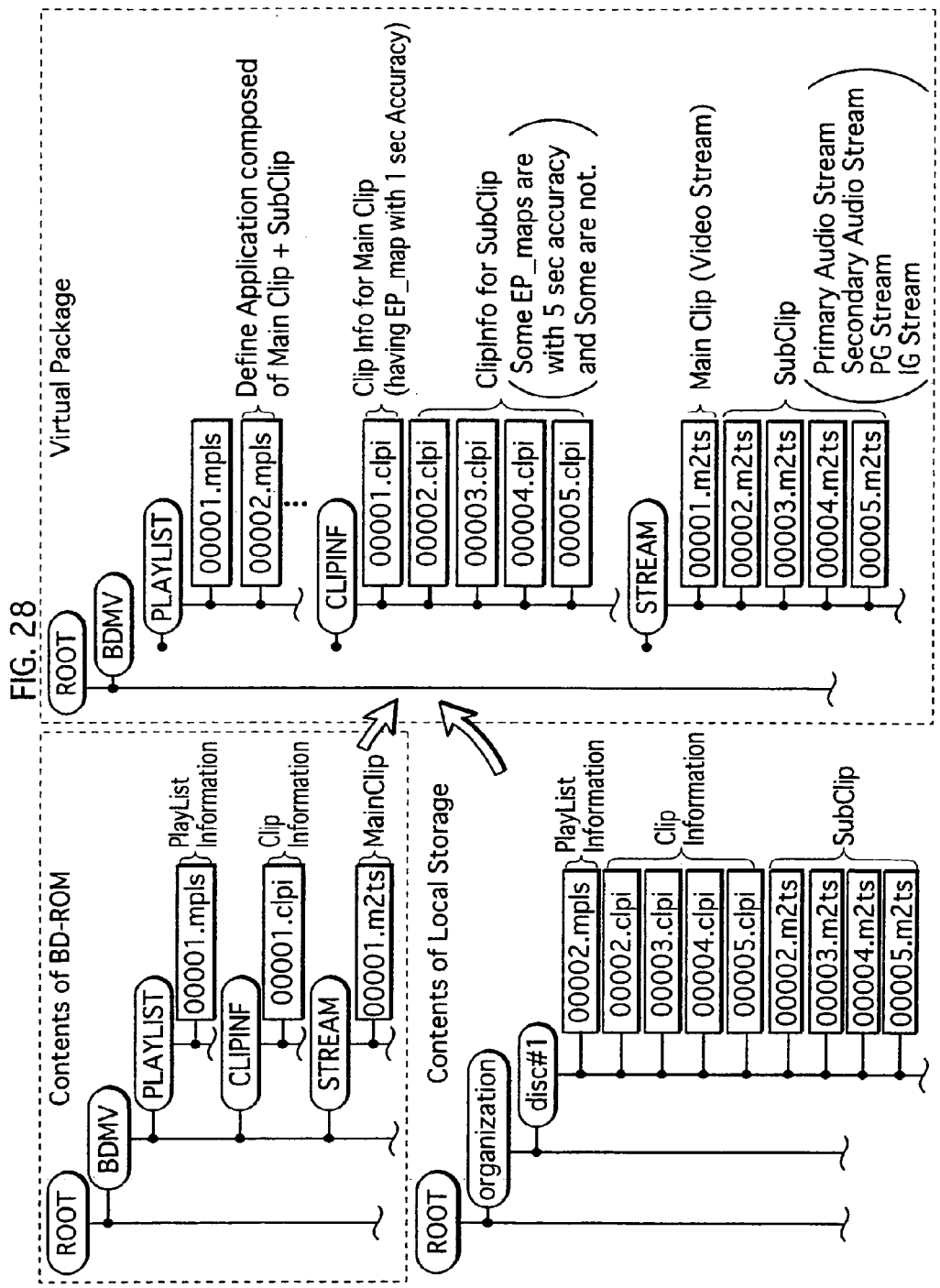
FIG. 28 illustrates the virtual file system created by a playback device 300.

Now, a virtual file system will be described. FIG. 28 illustrates the virtual file system created by a playback device 300. The top left block of the figure illustrates the contents stored on the BD-ROM. The bottom left block illustrates the contents stored on the local storage 200. The right block illustrates the structure of the virtual file system.

The playback device creates the virtual file system through the combined use of the AV clip, the clip information, the PlayList information stored on the BD-ROM, with the AV clip, the Clip information, the PlayList information stored on the local storage 200.

More specifically, the virtual file system is created by:

i) adding the PlayList (00002.MPLS) on the local storage into the MPLS directory on the BD-ROM;

ii) adding the ClipInfo #2, #3, #4, and #5 (00002.CLPI, 00003.CLPI, 00004.CLPI, and 00005.CLPI) on the local storage into the CLPI directory on the BD-ROM; and iii) adding the AV clip #2, #3, #4, and #5 (00002.M2TS, 00003.M2TS, 00004.M2TS, and 00005.M2TS) on the local storage to the STREAM directory on the BD-ROM.

As a result of the above processing, the virtual file system as illustrated in the right block of FIG. 28 is created.

This concludes the overall description of the recording medium according to the present invention. Next, a description is given of the playback device according to the present invention.

<Internal Structure of Playback Device>

Figure 29:
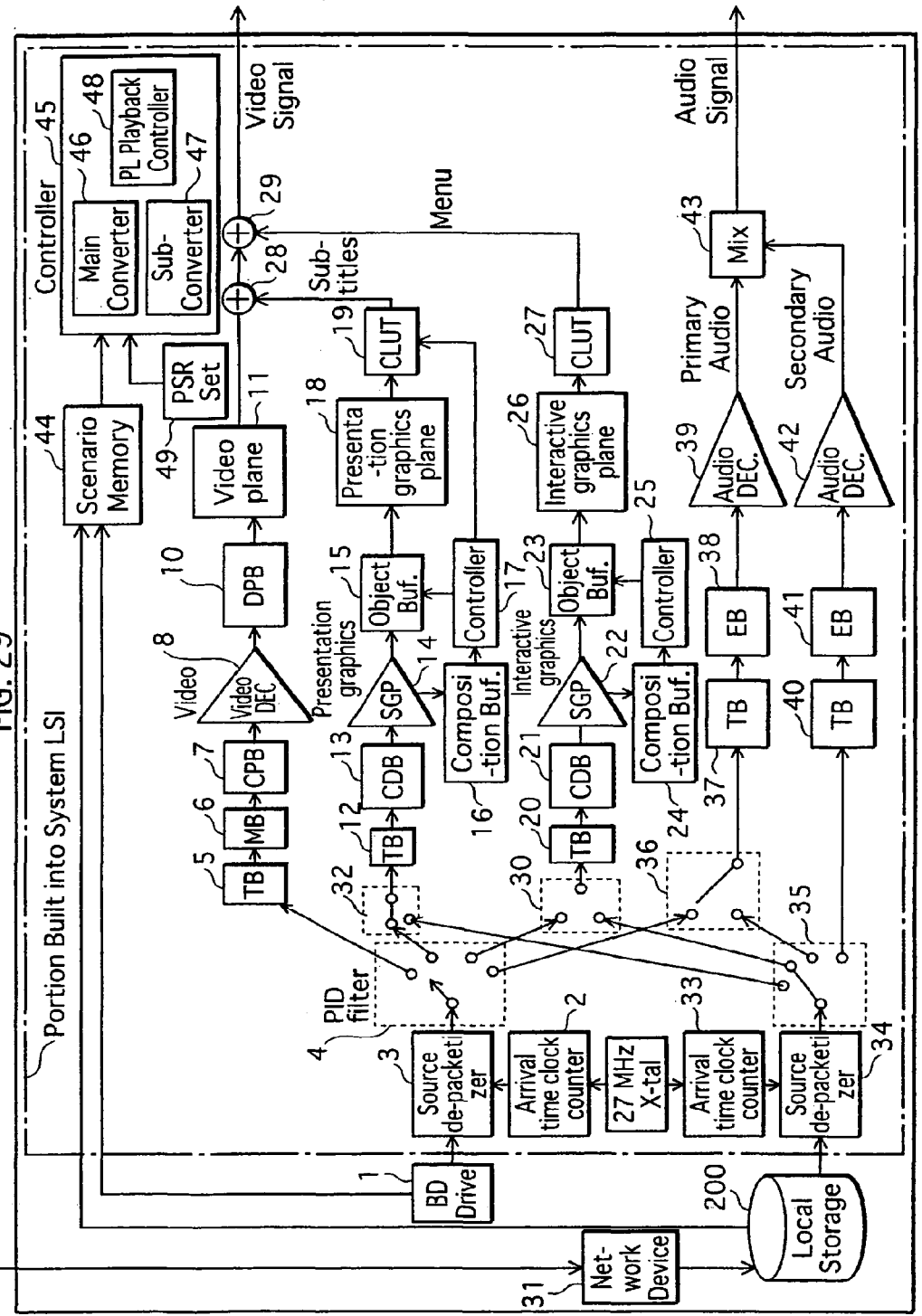
FIG. 29 illustrates the internal structure of the playback device according to the present invention.

FIG. 29 illustrates the internal structure of the playback device. Based on the internal structure illustrated in the figure, playback devices consistent with the present invention are industrially manufactured. The playback device of the present invention is roughly composed of two parts, one of which is a system LSI and the other is a drive device. By mounting those parts into a device cabinet and onto a substrate, the playback device can be manufactured industrially. The system LSI is an integrated circuit containing various processing units for implementing the functions of the playback device. The playback device manufactured in the above manner is composed of a BD drive 1, an arrival time clock counter 2, a source de-packetizer 3, a PID filter 4, a transport buffer 5, a multiplexed buffer 6, a coded picture buffer 7, a video decoder 8, a decoded picture buffer 10, a video plane 11, a transport buffer 12, a coded data buffer 13, a stream graphics processor 14, an object buffer 15, a composition buffer 16, a composition controller 17, a presentation graphics plane 18, a CLUT unit 19, a transport buffer 20, a coded data buffer 21, a stream graphics processor 22, an object buffer 23, a composition buffer 24, a composition controller 25, an interactive graphics plane 26, a CLUT unit 27, a compositor 28, a compositor 29, a switch 30, a network device 31, a switch 32, an arrival time clock counter 33, a source de-packetizer 34, a PID filter 35, a switch 36, a transport buffer 37, an elementary buffer 38, an audio decoder 39, a transport buffer 40, a buffer 41, an audio decoder 42, a mixer 43, a scenario memory 44, a controller 45, a main converter 46, a sub-converter 47, a PL playback controller 48, and a PSR set 49. Note that the internal structure illustrated in the figure is a decoder model based on the MPEG T-STD model and cabala of downconverting.

The BD drive 1 loads/ejects the BD-ROM and accesses the BD-ROM to sequentially reads Aligned Units each composed of 32 ES-TS packets.

The arrival time clock counter 2 generates an arrival time clock using a 27 MHz crystal oscillator (27 MHz X-tal). The arrival timeclock is a clock signal defining the timeline on which the ATS assigned to each TS packet is based.

Once an Aligned Unit composed of 32 EX-TS packets is read from the BD-ROM, the source de-packetizer 3 removes the TP_extra_header from each of the 32 ES-TS packets and outputs the TS packets without the headers to the PID filter 4. The output by the source de-packetizer 3 to the PID filter 4 is performed at the timing when the time measured by the arrival time clock counter 2 reaches the ATS shown by the TP_extra_header. Since the output to the PID filter 4 is carried out in accordance with the ATS, the TS packets are sequentially output to the PID filter 4 in accordance with the time measured by the arrival time clock counter 2, regardless of the speed at which data is read from the BD-ROM, such as 1x-speed or 2x-speed.

The PID filter 4 judges, with reference to the PID attached to the TS packets, the type of stream to which the TS packets belong is a video stream, a PG stream, an IG stream, or a primary audio stream. According to the judgment, the PID filter 4 outputs the TS packets to one of the transport buffer 5, the transport buffer 12, the transport buffer 20, and transport buffer 37.

The transport buffer (TB) 5 is a buffer for temporarily storing TS packets output from the PID filter 4, if the TS packets belong to a video stream.

The multiplexed buffer (MB) 6 is a buffer for temporarily storing PES packets output from the transport buffer 5, in order to later output the video stream to the coded picture buffer 7.

The coded picture buffer (CPB) 7 is a buffer for storing coded pictures (I pictures, B pictures, and P pictures).

The video decoder 8 decodes individual frames contained in the video elementary stream at every predetermined decoding time (DTS) to obtain a plurality of frames and renders the resulting picture data on the decoded picture buffer 10.

The decoded picture buffer 10 is a buffer on which decoded picture data is rendered.

The video plane 11 is used for presenting uncompressed picture data. A plane is a memory area of the playback device for storing a frame of pixel value data. The video plane 11 stores picture data at the resolution of 1920×1080, and the picture data is composed of pixel values each expressed by 16-bit YUV values.

The transport buffer (TB) 12 is a buffer for temporarily storing TS output from the PID filter 4, if the TS packets belong to a PG stream.

The coded data buffer (CDB) 13 temporarily stores PES packets constituting a PG stream.

The stream graphics processor (SPG) 14 decodes an ODS to obtain uncompressed graphics data expressed by index colors, and renders the obtained graphics data as a graphics object on the object buffer 15. Decoding by the stream graphics processor 14 is instantaneous, and the stream graphics processor 14 temporarily stores the resulting graphics object. Although the decoding by the stream graphics processor 14 is instantaneous, transfer of the graphics object to the object buffer 15 takes some time. In the player model conforming to the BD-ROM specification, the transfer rate to the object buffer 15 is 128 Mbps. The end time of transfer to the object buffer 15 is shown by the PTS in the END segment. Thus, until the time shown by the PTS is reached, the processing on the subsequent DS is delayed. The rendering of the graphics object obtained by decoding each ODS is started at the time shown by the DTS associated with that ODS and end by the time shown by the PTS associated with that ODS.

The object buffer 15 holds the graphics object obtained by decoding an ODS by the stream graphics processor 14. The object buffer 15 needs to be twice or four times as large as the graphics plane 18 for the following reason. For implementing scrolling, it is necessary to store a graphics object that is two or four times as large as the graphics plane 18.

The composition buffer 16 is memory for storing PCS and PDS. In the case where there are two DSs to be processed and where the active period of their PCS overlap, the composition buffer 16 stores the plurality of PCS to be processed.

The composition controller 17 judges, each time the current playback point reaches a new DS, whether the Composition_state of the PCS contained in the new DS indicates Epoch Start, Acquisition Point, or Normal Case. If the Epoch Start is indicated, the composition controller 17 transfers the PCS on the coded data buffer 13 to the composition buffer 16.

The presentation graphic plane 18 is a memory area as large as one full screen and stores uncompressed graphics data worth one screen. The presentation graphic plane 18 stores uncompressed graphics data at the resolution of 1920×1080 and the uncompressed graphics data is composed of pixel values each expressed using an 8-bit index colors. By converting the index colors with reference to a CLUT (Color Lookup Table), the uncompressed graphics data stored on the presentation graphics plane 18 is supplied for display.

The CLUT unit 19 converts the index colors of the uncompressed graphics data stored on the presentation graphic plane 18 to Y, CR, and Cb values.

The transport buffer (TB) 20 is a buffer for temporarily storing TS packets belonging to an IG stream.

The coded data buffer (CDB) 21 is a buffer for temporarily storing PES packets constituting an IG stream.

The stream graphics processor (SPG) 22 decodes an ODS and transfers uncompressed graphics data obtained by the decoding to the object buffer 23.

The object buffer 23 stores a plurality of uncompressed graphics objects decoded by the stream graphics processor 22. The rectangle area of the object buffer 23 to be occupied by each graphics object is identified with reference to the object_id included in the associated ODS. Consequently, when a graphics object enters the object buffer 23 and the object_id of the graphics object is the same as that of the graphics object currently on the object buffer 23, the area occupied by the current graphics object is overwritten with the new graphics object.

The composition buffer 24 is a buffer for storing Interactive_composition transported by one or more ICSs. The Interactive_composition stored on the composition buffer 24 is supplied to the composition controller 25 for decoding.

The composition controller 25 judges, each time the current playback point reaches a new DS, whether the composition_state of the ICS contained in the new DS indicates Epoch Start, Acquisition Point, or Normal Case. If the Epoch Start is indicated, the composition controller 25 transfers the new interactive_composition on the coded data buffer 21 to the composition buffer 24.

Each time the ICS contained in an acquisition point DS is supplied to the coded data buffer 21, the composition controller 25 compares the page information of the newly supplied ICS with the page information of the interactive_composition already stored in the composition buffer 24. If the page information with a greater value page_version_number is present on the coded data buffer 21, the page information is transferred to the composition buffer 24. As a result, the intended page information on the composition buffer 24 is updated. The composition controller 25 further judges whether the thus updated page information is currently being displayed. If the updated page is being displayed, the page is rendered again to reflect the update.

The interactive graphics plane 26 is used for presenting uncompressed graphics data obtained by decoding graphics object by the stream graphics processor (SGP) 22. The graphics data is rendered on the interactive graphics plane 26 at the resolution of 1920×1080, and the graphics data is composed of pixel values each expressed using 8-bit index colors. By converting the index colors with reference to the CLUT (Color Lookup Table), the uncompressed graphics data stored on the interactive graphics plane 26 is supplied for presentation.

The CLUT unit 27 converts the index colors of the uncompressed graphics data stored on the interactive graphics plane 26 to Y, CR, and Cb values.

The compositor 28 overlays the uncompressed frame data rendered on the video plane 11 with the uncompressed graphics object rendered on the presentation graphic plane 18. As a result of the overlaying, the composite image in which text subtitles are overlaid on video is obtained.

The compositor 29 overlays the uncompressed graphics object rendered on the interactive graphics plane 26 with the composite image (uncompressed picture data overlaid with the uncompressed graphics object rendered on the presentation graphic plane 18) output from the compositor 28.

The switch 30 selectively supplies the TS packets read from the BD-ROM or the TS packets read from the local storage to the transport buffer 20.

The network device 31 is used to implement communications functionality of the playback device. More specifically, the network device 31 establishes TCP connection, FTF connection, and so on with a web site at an URL. The contents downloaded from the web site via the connection established by the network device 31 are stored to the local storage 200.

The switch 32 selectively supplies the TS packets read from the BD-ROM or the TS packets read from the local storage to the transport buffer 12.

The source de-packetizer 34 removes the TP_extra_header from each TS packet constituting the AV clip read from the local storage 200 and outputs the TS packets without headers to the PID filter 35. The output of the TS packets to the PID filter 35 is carried out at the timing when the time measured by the arrival time clock counter 33 reaches the ATS shown by the TP_extra_header.

The PID filter 35 switches to output the TS packets read from the local storage 200 toward either of the PG stream decoder, IG stream decoder, the audio decoder 39, and the audio decoder 42.

The switch 36 supplies toward the audio decoder 39 the TS packets read from the BD-ROM or from the local storage 200. The TS packets constitute the primary audio stream. By the presence of the switch 36, the primary audio stream can be supplied to the audio decoder 39 from either of the BD-ROM and the local storage 200.

The transport buffer (TB) 37 stores TS packets carrying the primary audio stream.

The elementary buffer (EB) 38 stores the PES packets carrying the primary audio stream.

The audio decoder 39 decodes the PES packets carrying the primary audio stream output from the elementary buffer 41 and outputs uncompressed audio data.

The transport buffer (TB) 40 stores TS packets carrying the secondary audio stream.

The elementary buffer (EB) 41 stores PES packets carrying the secondary audio stream.

The audio decoder 42 decodes the PES packets carrying the secondary audio stream output from the elementary buffer 38 and outputs uncompressed audio data.

The mixer 43 mixes the uncompressed audio data obtained by decoding the primary audio stream, with the uncompressed audio data obtained by decoding the secondary audio stream. The mixer 43 then outputs the composite audio resulting from the mixing.

The scenario memory 44 stores current PlayList information and current Clip information. The current PlayList information used herein refers to the currently processed PlayList information from among a plurality of pieces of PlayList information stored on the BD-ROM. The current Clip information used herein refers to the currently processed Clip information from among a plurality of pieces of Clip information stored on the BD-ROM.

The controller 45 is composed of an instruction ROM and CPU and executes software stored on the instruction ROM to carry out overall control of the playback device. The control executed on the playback device dynamically changes in response to a user event generated upon receipt of a user operation and in accordance with the values held in each PSR of the PSR set 49. The controller 45 is composed of functional elements of the main converter 46, the sub-converter 47, and the PL playback controller 48.

The main converter 46 converts playback points on the PlayItem timeline to corresponding addresses on the Main Clip. The playback points for starting normal playback and trick play are defined on the PlayItem timeline. With reference to the EP_map included in the Clip information associated with the MainClip, the main converter 46 converts the playback points to the corresponding addresses on the Main Clip.

The sub-converter 47 first converts the playback points on the PlayItem timeline to corresponding playback points on the SubPlayItem timeline, and further converts the resulting playback points to corresponding addresses on the SubClip. The conversion of the playback points by the sub-converter 47 is carried out with reference to the sync_PlayItem_id and the sync_start_PTS_of_PlayItem included in the SubPlayItem information.

The playback points on the SubPlayItem timeline are converted to corresponding addresses on the SubClip through the following two processes:

(i) determining the entry point that is near the random access point form among a plurality of entry points shown by the EP_map; and (ii) performing the stream analysis starting from the thus determined entry point.

Note that the process (i) is carried out using the EP_map for the SubClip. The process (ii) (i.e., stream analysis) is necessary for allowing random access in the case where the SubClip is the primary or secondary audio stream. In the case where the SubClip is the PG or IG stream, however, the stream analysis may be omitted and random access to the SubClip is still ensured. Whether it is possible to omit the process of stream analysis is determined with reference to the EP_stream_type. The stream analysis may be omitted because the Clip information contains EP_map that ensures the stream to be suitably accessed at random.

The PL playback controller 48 carries out overall control of the playback device for PL playback. The PL playback used herein refers to synchronous playback of the Main Clip stored on the BD-ROM and the SubClip stored on the local storage, in accordance with the PlayItem information and SubPlayItem information contained in the PlayList information. The Main Clip and SubClip are associated with their own EP_map, so that high-speed random access to the respective AV clips is ensured. During PL playback, the "normal playback" and the "trick play" are implemented through high-speed random access to the respective clips.

The normal playback during PL playback used herein refers to playback of specific portions of the Main Clip and SubClip on the PlayItem timeline and the SubPlayItem timeline, respectively. The portions of the respective clips are specified by the PlayItem information defining the MainPath information and SubPlayItem information defining the SubPath information.

The trick play during PL used herein refers to fast-forward playback, rewind playback, chapter-search playback, and time-search playback of specific portions of the MainClip and SubClip. The portions of the respective clips are specified by the PlayItem information defining the MainPath information and the PlayItem information defining the SubPath information.

The PSR set 49 is a set of non-volatile registers provided within the playback device. The set of registers include 64 player status registers (PSR(1)-PSR(64)) and 4,096 general-purpose registers (GPRs). The 64 player status registers (PSRs) represent the current status of the playback device, including the current playback point. The current playback point is represented by the values of PSR(5)-PSR(8). Specifically, PSR(5) is set to a value from 1-999 to indicate the chapter number to which the current playback point belongs. When set to "0xFFFF", PSR(5) indicates that the chapter numbers are invalid in the playback device.

PSR(6) is set to a value from 0-999 and indicates the PL number to which the current playback point belongs (current PL Number).

PSR(7) is set to a value from 0-255 and indicates the PlayItem number to which the current playback point belongs (current PI Number).

PSR(8) is set to a value from 0-0xFFFFFFFF and indicates the current playback point (current PTM) in 45 kHz accuracy.

This concludes the description of the internal structure of the playback device.

<Software Implementation: 1. PL Playback Controller 48>

Hereinafter, a description is given of software implementation of the PL playback controller 48. The PL playback controller 48 can be implemented as computer software by creating a program for causing a computer to execute the processing steps illustrated in FIG. 30. Both the normal playback and trick play during PL Playback are executed through a jump playback in which playback is started at an arbitrary point on the PlayItem timeline. Thus, the PL playback is executed by instructing the playback device to execute jump playback.

Figure 30:
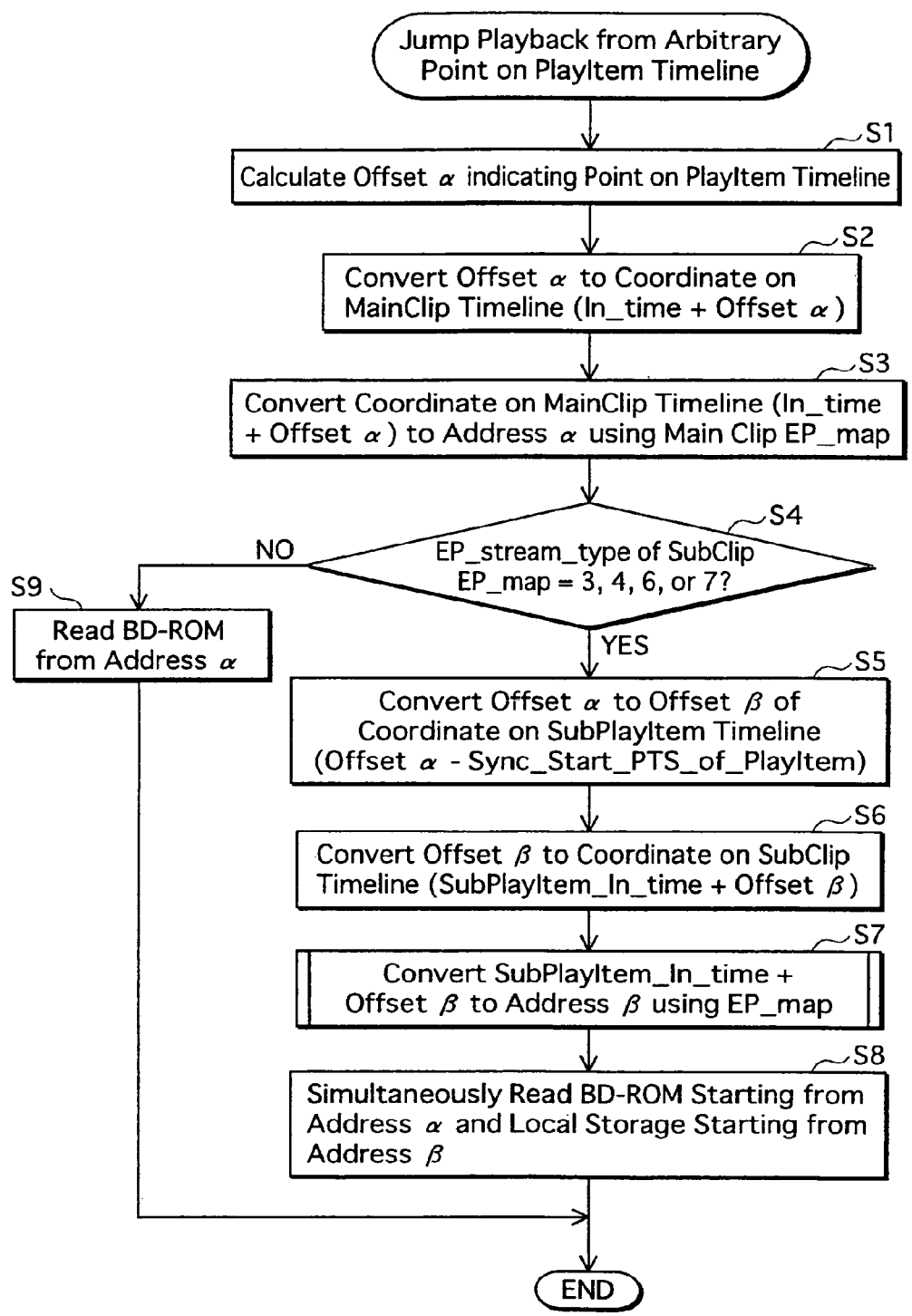
FIG. 30 is a flowchart illustrating the processing steps for executing jump playback.

FIG. 30 is a flowchart illustrating the processing steps executed by the playback device for jump playback in which playback is started from an arbitrary point on the PlayItem timeline. First, the playback device calculates an offset a that indicates a coordinate of a point on the PlayItem timeline (Step S1). Next, the offset α is converted to a coordinate of a point on the MainClip timeline (In_time+offset α) (Step S2). Then, the coordinate on the MainClip timeline (In_time+offset α) is converted to a corresponding address a using the EP_map associated with the Main Clip (Step S3).

In a step S4, the playback device judges whether the EP_stream_type in the EP_map associated with the SubClip is set to any of the values 3, 4, 6, and 7. If the EP_stream_type is not set to any of the above values, the playback device reads the BD-ROM starting from the address α (step S9). On the other hand, if the EP_stream_type is set to any of 3, 4, 6, and 7, the playback device converts the offset α to an offset β (=offset α−sync_start_PTS_of_PlayItem) indicating a coordinate of a corresponding point on the SubPlayItem timeline (step S5), and then converts the offset β to a coordinate of a corresponding point on the SubClip timeline (SubPlayItem_In_time+offset β) (Step S6). Then, with reference to the EP_map, the playback device converts the thus obtained coordinate (SubPlayItem_In_time+offset β) to a corresponding address β (step S7). Then, the playback device simultaneously reads the BD-ROM starting from the address α and the local storage 200 starting from the address β (step S8).

If the EP_stream_type is set to a value other than 3, 4, 6, and 7 (step S4: No), it means that the EP_stream_type is invalid. When the EP_stream_type is invalid, the playback device is provided with no information as to the intervals between entry points or the intervals between entry times in the Out-of-MAX stream. With this being the situation, it is possible that it takes long to determine an access point on the SubClip and thus takes long to make random access to the SubClip. In such a case, synchronous playback of the Main Clip and SubClip may result in significant delay in the Main Clip playback. In order to avoid such undesirable possibility, the playback device prohibits random access to the SubClip, and only reads the Main Clip starting from the address α (step S9). Since random access is made only to the Main Clip, there will be no significant processing delay due to random access.

Figure 31:
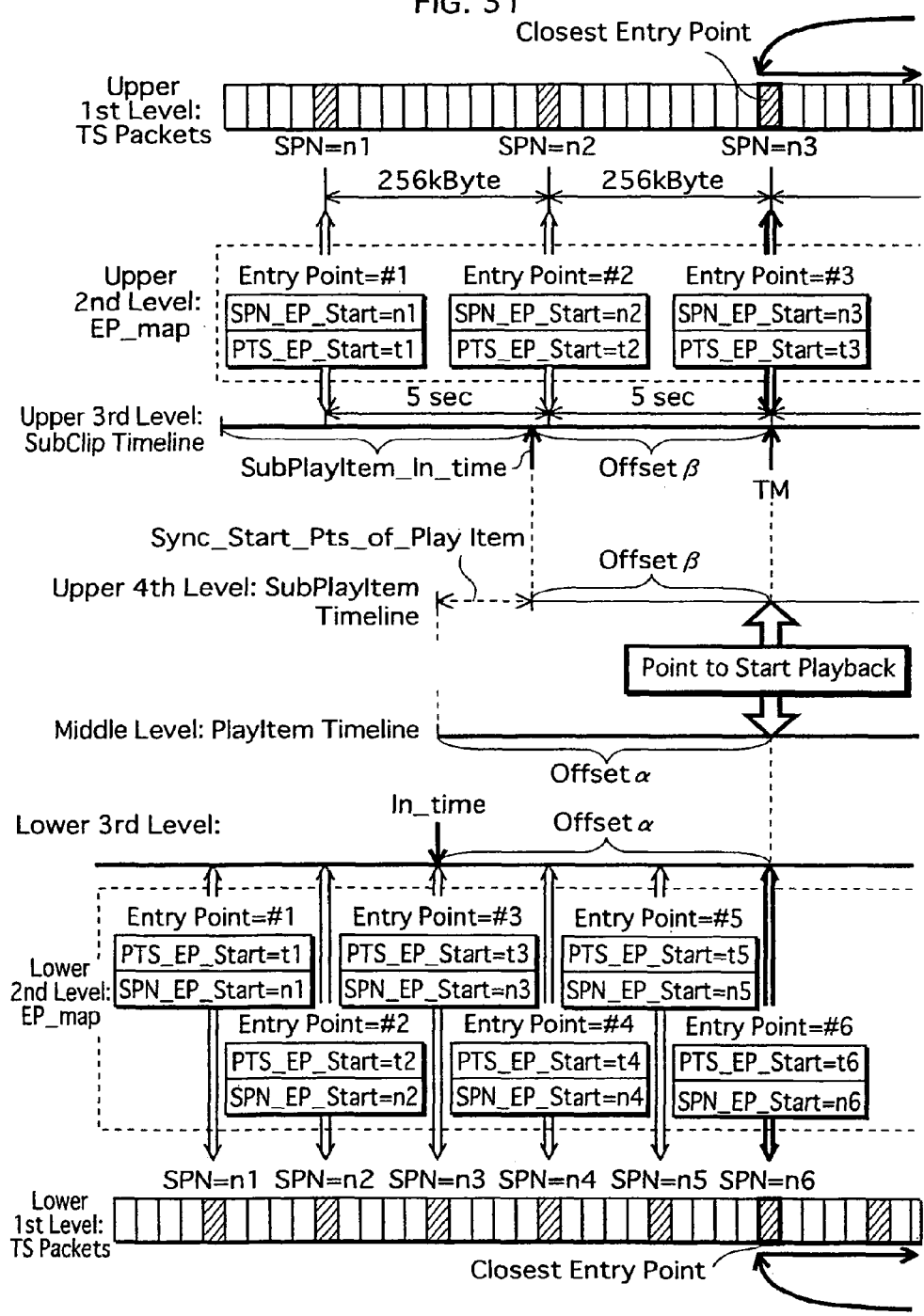
FIG. 31 schematically illustrate how a random access point is determined using the EP_map illustrated in FIG. 25.

FIG. 31 schematically illustrate how a random access point is determined using the EP_map illustrated in FIG. 25. The following describes, with reference to FIG. 31, the processing steps performed to specify the random access point illustrated in FIG. 31. Note that FIG. 31 illustrates the case where the requested jump point happens to coincide with an entry point of both the Main Clip and SubClip. Suppose that the requested jump point is at the offset α on the PlayItem timeline, the origin point of the PlayList timeline is located at the point on the MainClip timeline specified by In_time. Thus, the jump point on the Main Clip is calculated by "In_time+ offset α". Thus the calculated result is converted to a corresponding SPN, and the SPN is further converted to a corresponding sector number.

On the other hand, the point on the SubPlayItem timeline corresponding to the offset α on the PlayItem timeline is specified by sync_start_PTS_of_PlayItem+offset β. It is because the origin point of the SubPlayItem timeline is apart from the origin point of the PlayItem timeline by the distance indicated by sync_start_PTS_of_PlayItem. Once the offset β is calculated in the above manner, the coordinate of the jump point on the SubClip timeline is calculated. Since the origin point of the SubPlayItem timeline is located at the point on the SubPlayItem timeline specified by In_time, the jump point is calculated by "SubPlayItem_In_time+offset β". Then, the jump point is converted into a corresponding SPN using the EP_map of the SubClip, and the SPN is converted to a corresponding address.

<Software Implementation: 2. Main Converter 46 & Sub-Converter 47>

Hereinafter, a description is given of software implementation of the main converter 46 and sub-converter 47. The main converter 46 and sub-converter 47 can be implemented as computer software by creating a program for causing a computer to execute the processing steps illustrated in FIG. 32.

Figure 32:
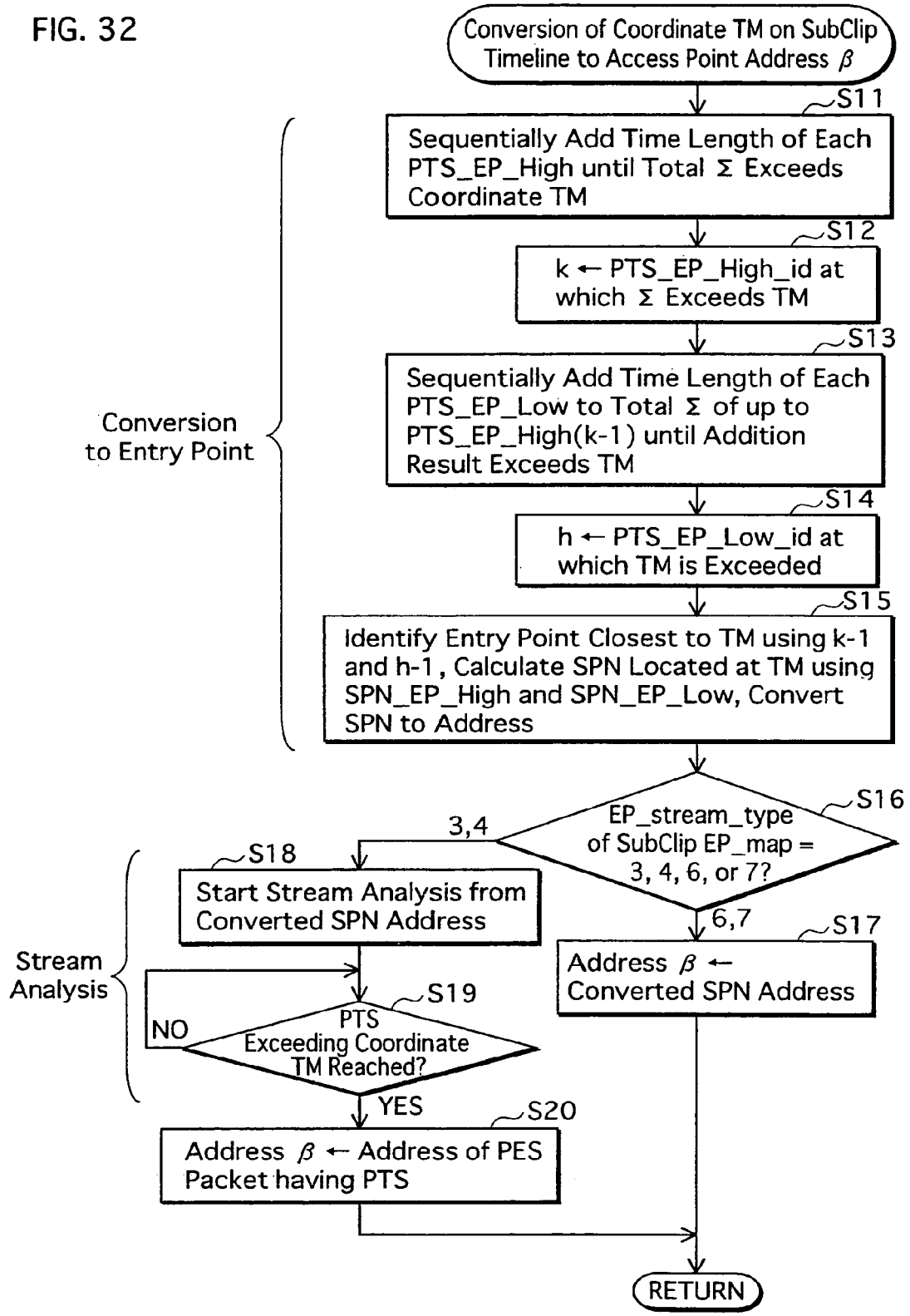
FIG. 32 is a flowchart illustrating the processing steps for converting a coordinate TM on the Main Clip and the SubClip to a corresponding address.

FIG. 32 is a flowchart illustrating the processing steps executed by the playback device for converting a coordinate TM on the Main Clip and the SubClip to corresponding addresses.

The playback device keeps adding the time length specified by each PTS_EP_High included in the EP_High until the total Σ of the time lengths first exceeds the In_time, to see how many PTS_High fields are added (Step S11). The time length indicated by each PTS_EP_High is a time unit whose most significant bits are indicated by the PTS_EP_High. The playback device then identifies the EP_High_id of the k-th EP_High that results in the total Σ exceeding the In_time and stores the value of k (step S12).

Next, the playback device keeps adding, to the total Σ of up to the PTS_EP_High(k−1), the time length indicated by each PTS_EP_Low included in EP_Low until the total first exceeds In_time, to see how many PTS_Low fields can be added (step S13). The playback device then determines the EP_Low_id of the h-th EP_Low that results in the total exceeding the In_time and stores the value of h (step S12).

Using the pair of values "k−1" and "h−1" obtained as above, the playback device specifies the entry point that is near the In_time. Using the SPN_EP_High and SPN_EP_Low of the thus specified entry point, the playback device calculates the SPN that coincides with the coordinate TM and then converts the SPN to a corresponding sector address (step S15).

Conversion of SPN into a corresponding sector address is performed through the following processes. SPNs are serial numbers uniquely assigned to individual TS packets. Thus, for a playback device to read the TS packet corresponding to a specific SPN, it is necessary to convert the SPN to a relative sector number. Here, as illustrated in FIG. 4, every 32 TS packets are converted into one Aligned Unit and recorded into three sectors. Thus, the result obtained by dividing the SPN by 32 is the number assigned to the Aligned Unit containing an I-picture. Then, the result obtained by multiplying the thus obtained Aligned Unit number by 3 is the sector address of the Aligned Unit that is near the SPN. The sector address calculated in the above manner is a relative sector number serially assigned to each sector from the head of one AV clip. Thus, by setting the file pointer to the relative sector number, the sector corresponding to the entry point is specified.

In a step S16, it is determined whether the EP_stream_type of the EP_map for the SubClip is set to any of the values 3, 4, 6, and 7. In the case where the EP_stream_type is set to 6 (PG stream) or 7 (IG stream), it means that the entry point near the coordinate TM coincides with the head (PCS or ICS) of a DS other than Normal Case DS. Since such a DS contains all the functional segments necessary for presenting a composite image, the address obtained by the conversion in the step S15 is designated as the address β, which is the access point (step S17).

Once the address β is determined, the playback device starts playback from the address β to duly present text subtitles or menus.

In the case where the EP_stream_type is set to 3 (primary audio stream) or 4 (secondary audio stream), the playback device performs stream analysis starting from the address obtained by the conversion in the step S15 (step S18). In the stream analysis, the PES packet header is extracted and the audio frame size and PTS are read from the header. The point at which the next audio frame is recorded is identified based on the size. The above process is repeated until the thus determined point reaches the PES packet with the PTS set to a value greater than the coordinate TM (step S19).

Once the PES packet with the PTS set to a value greater than the coordinate TM is identified, the address of the PES packet is determined as the address β, which is the access point (step S20). The playback device then starts playback from the address β to duly present audio.

Hereinafter, the processing steps illustrated in the flowchart are more specifically described with reference to FIGS. 33 and 34.

Figure 33:
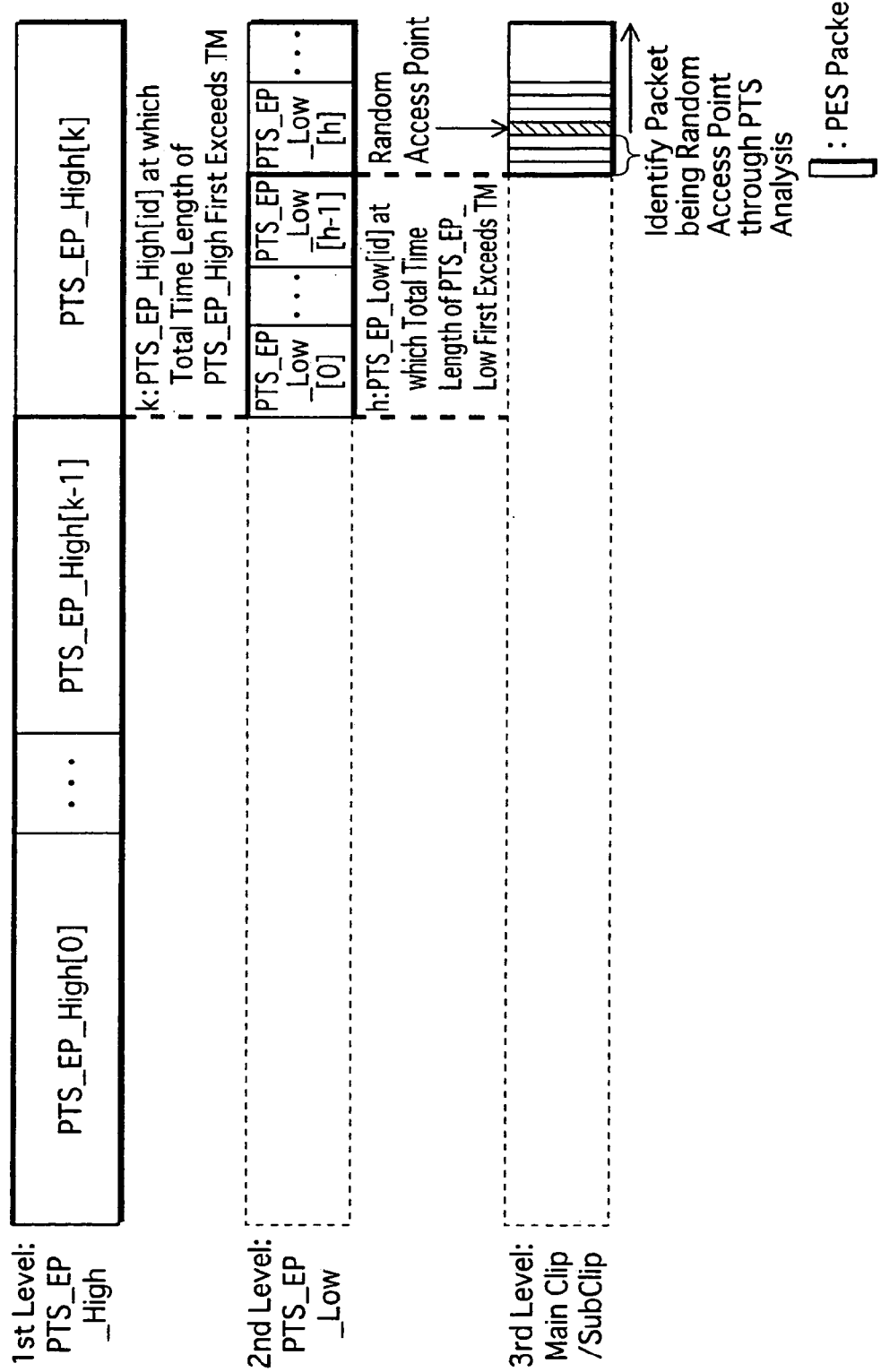
FIG. 33 illustrates the relationship among variables k and h and the random access point in the case where the SubClip is a primary or secondary audio stream.

FIG. 33 illustrates the relationship among the variables k and h and the random access point, in the case where the SubClip is a primary or secondary audio stream. In the figure, the first level illustrates the PTS_EP_High fields included in the EP_map. The second revel illustrates the PTS_EP_Low fields also included in the EP_map. The third level illustrates TS packets. In the figure, the k-th PTS_EP_High has the minimum value exceeding the random access point, and the h-th PTS_EP_Low has the minimum value exceeding the random access point.

Thus, the pair of PTS_EP_High[k−1] and the PTS_EP_Low[h−1] specifies the entry time near the random access point.

Since the above pair of the PTS_EP_High and the PTS_EP_Low specifies the entry point near the random access point, the PES packet corresponding to the random access point is specified through the stream analysis started from the thus specified entry point.

Figure 34:
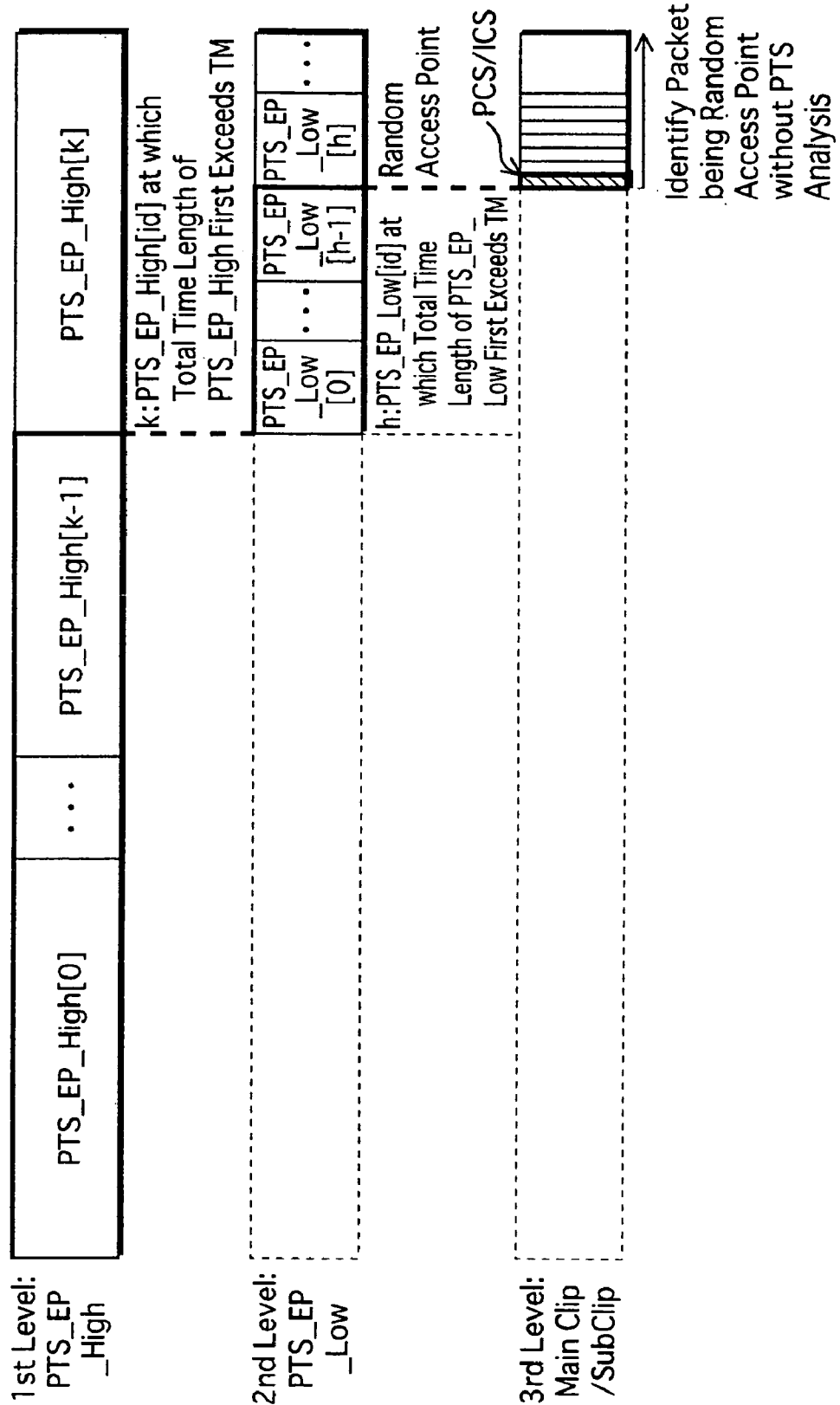
FIG. 34 illustrates the relationship among the variables k and h and the random access point in the case where the SubClip is a PG or IG stream.

FIG. 34 illustrates the relationship among the variables k and h and the random access point, in the case where the SubClip is a PG or IG stream. In the figure, the first level illustrates the PTS_EP_High fields included in the EP_map. The second revel illustrates the PTS_EP_Low fields also included in the EP_map. The third level illustrates TS packets. In the figure, the k-th PTS_EP_High has the minimum value exceeding the random access point, and the h-th PTS_EP_Low has the minimum value exceeding the random access point.

Thus, the pair of PTS_EP_High[k−1] and the PTS_EP_Low[h−1] specifies the entry time near the random access point.

As stated above, the above pair of the PTS_EP_High and the PTS_EP_Low specifies the entry point near the random access point. Thus, as long as the playback device starts reading from the thus specified entry point, it is always ensured that a DS composed of a complete set of functional segments is read.

As described above, according to the present embodiment, the EP_map for the SubClip includes the EP_stream_type. The provision of EP_stream_type allows the playback device to be informed of whether the EP_map for the Out-of-MUX stream shows entry points set at constant time intervals or addresses of independent playback sections. Being informed of the type of the EP_map, the playback device is enabled to instantly judge whether high-speed random access to the SubClip is possible. With this arrangement, synchronous playback of the Main Clip and SubClip is executed without sacrificing a response performance. Thus, even during PlayList playback defining the Main Path+SubPath, jump playback is executed at the same level of response speed as that of jump playback executed solely on the Main Path.

Second Embodiment

A second embodiment of the present invention relates to improvements in Picture in Picture (PiP). The PiP playback refers to playback of such PlayList information that includes MainPath information and SubPlayItem information. In addition, the MainPath information specifies a Main Clip that contains video, and the SubPath information specifies a SubClip that contains different video. When PiP playback of the PlayList information is executed, video playback of the SubClip (secondary video) is presented within video playback of the Main Clip (primary video) on the same screen.

FIG. 35 illustrates one example of PiP playback. In the figure, until the current playback point reaches a predetermined point tp, playback of the primary video is solely presented. After the point tp is reached, playback images of the secondary video are presented within playback images of the primary video. In this example, the primary video is presented with HD (high-definition) images, whereas the secondary video is presented with SD (standard-definition) images.

In this example, the secondary video presents video images in which the director or a performer of a movie points with his finger a specific object appearing in the primary video. When the secondary video is presented in combination with the primary video playback, the combined images present a scene in which the director or the performer points out with his finger the specific object appearing in playback images of the primary video and gives commentary about the object.

Figure 36A:
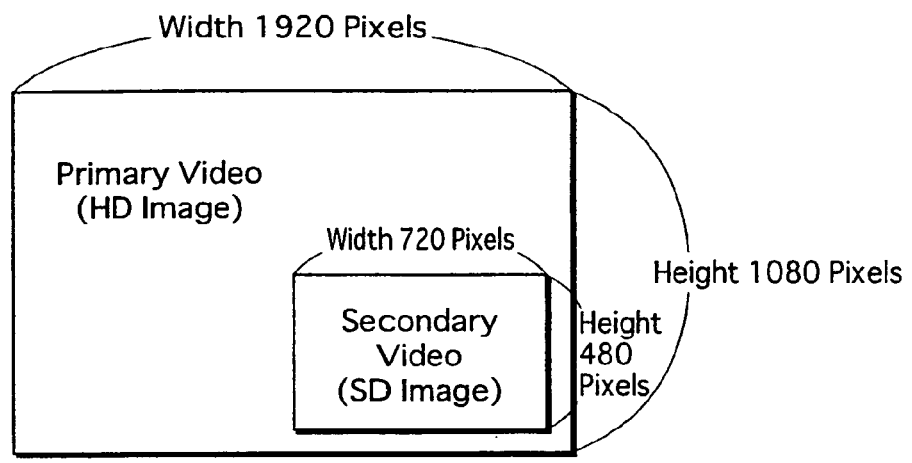
FIG. 36A illustrates an HD image and an SD image for comparison.

FIG. 36A illustrates an HD image and an SD image for comparison.

The HD image has the resolution of 1920×1080. The frame interval is a 3750 clock (alternatively, a 3753 or 3754 clock), which is equivalent to the frame interval of a theatrical movie film.

The SD image is has the resolution of 720×480. The frame interval is a 1501 clock, which is equivalent to the frame interval of NTSC. Alternatively, the frame interval may be an 1800 clock, which is equivalent to the frame interval of PAL.

Figure 36B:
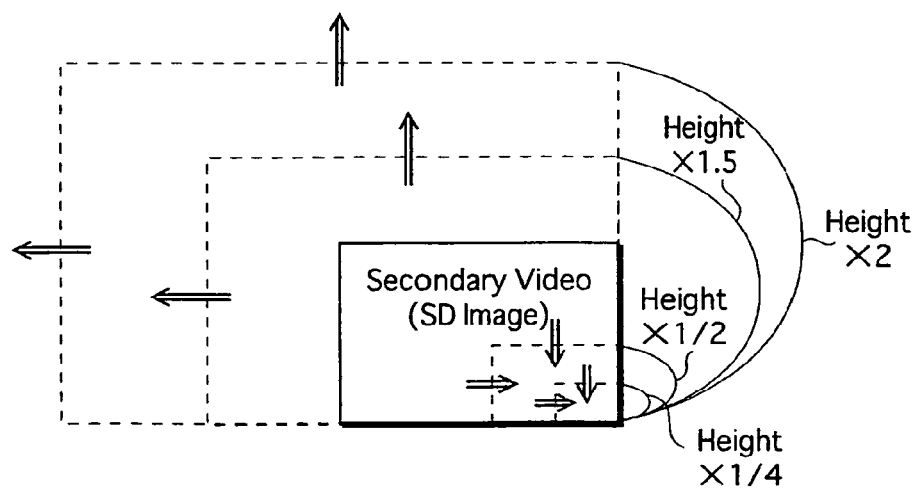
FIG. 36B illustrates how the secondary video is scaled up and down.

As illustrated in the figure, the SD image resolution is about ¼ of the HD image resolution. Thus, when the primary video (i.e. HD images) and the secondary video (i.e. the SD images) are presented on the same screen, the size of the secondary video on screen is about ¼ of the primary video. FIG. 36B illustrates how the secondary video is scaled up and down. The secondary video is scaled up and down in accordance with the scaling factor. The scaling factor defines ×¼ height, ×½ height, ×1.5 height, or ×2.0 height. The playback device reduces or enlarges the secondary video in height according to the scaling factor. At the same time, the playback device also reduces or enlarges the secondary video widthwise, so as to maintain the aspect ratio of the original SD image.

Through the scaling up and scaling down of the secondary video, the layout of the secondary video in PiP playback is freely changed.

Now, the following describes the structures of the recording medium and the playback device for creating a PiP playback application described above. In this embodiment, the AV clip stored on the BD-ROM constitutes primary video. It is simply because a large volume medium is suitable for distribution of the primary video having a large volume of data. On the other hand, the SubClip constituting secondary video is distributed to the playback device via a network and stored in the local storage, along with the PlayList information defining synchronous playback of the primary video and the secondary video.

<Structure of Local Storage 200: 1. File Structure>

FIG. 37 illustrates the contents stored on the local storage according to the second embodiment. The structure of the local storage is illustrated in FIG. 37 in the similar manner to FIG. 11. The difference with FIG. 11 is found in that the SubClip (00002.m2ts) is a secondary video stream and the clip information (00002.clip) contains the EP_map for the secondary video stream.

<Structure of Local Storage 200: 2. Clip Information>

Figure 38:
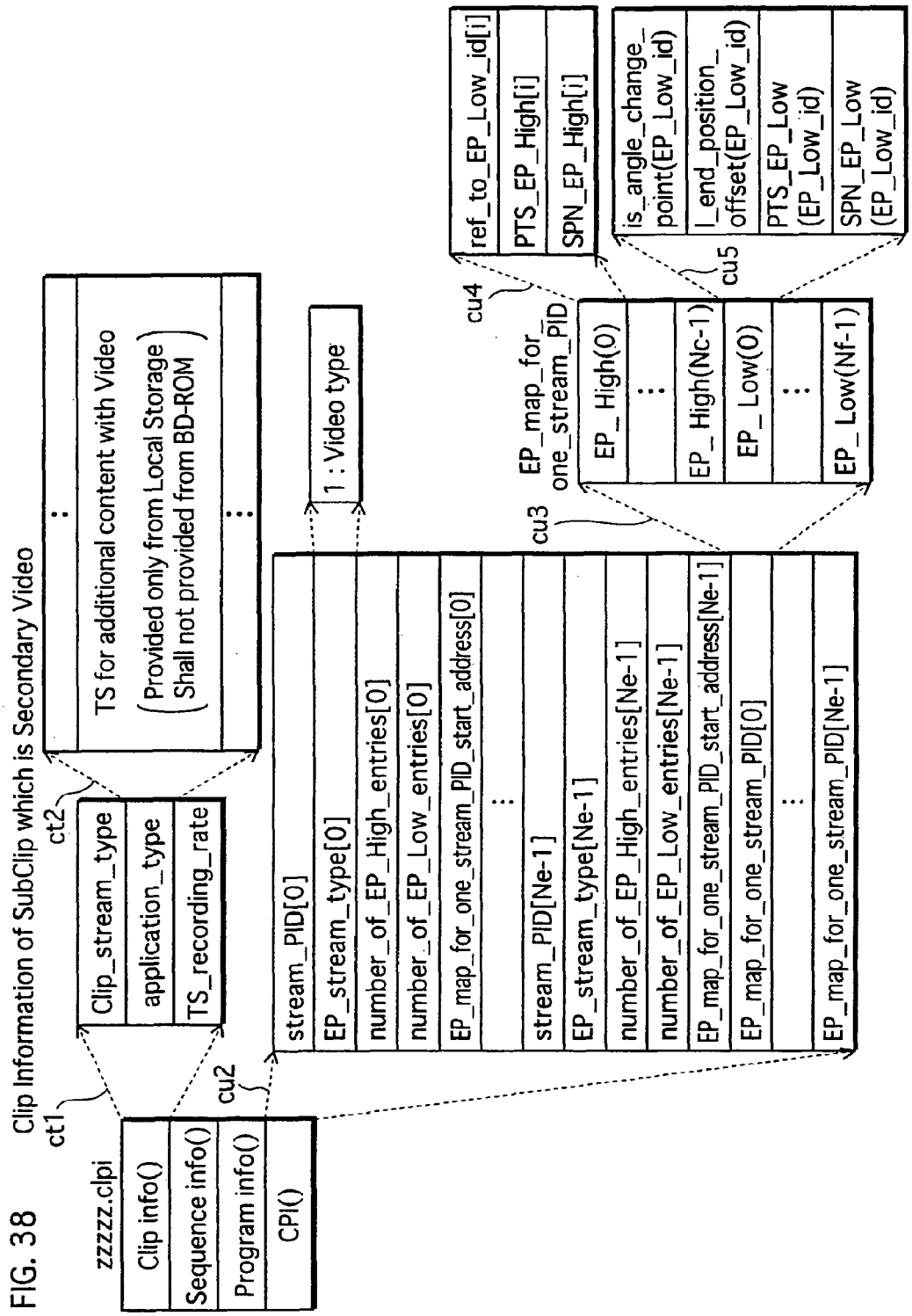
FIG. 38 illustrates the internal structure of clip information stored on the local storage according to the second embodiment.

FIG. 38 illustrates the internal structure of the clip information stored on the local storage. The clip information is associated with the secondary video stream. In the figure, leader lines cu2, cu3, cu4, and cu5 indicate that the internal structure of the EP_map included in the clip information is illustrated in more detail.

The EP_map pointed to by the leader lines is identical in structure to the EP_map illustrated in FIG. 8. The EP_map of the secondary video shows entry points set on the head of each access unit (GOP) constituting the secondary video stream, and also shows entry times corresponding to the entry points. Although for the secondary video, the EP_map is still set for video. Thus, the time interval between adjacent entry times is less than one second, and the EP_stream_type is set to the value "1: Video Type" similarly to the example shown in FIG. 8.

Figure 39:
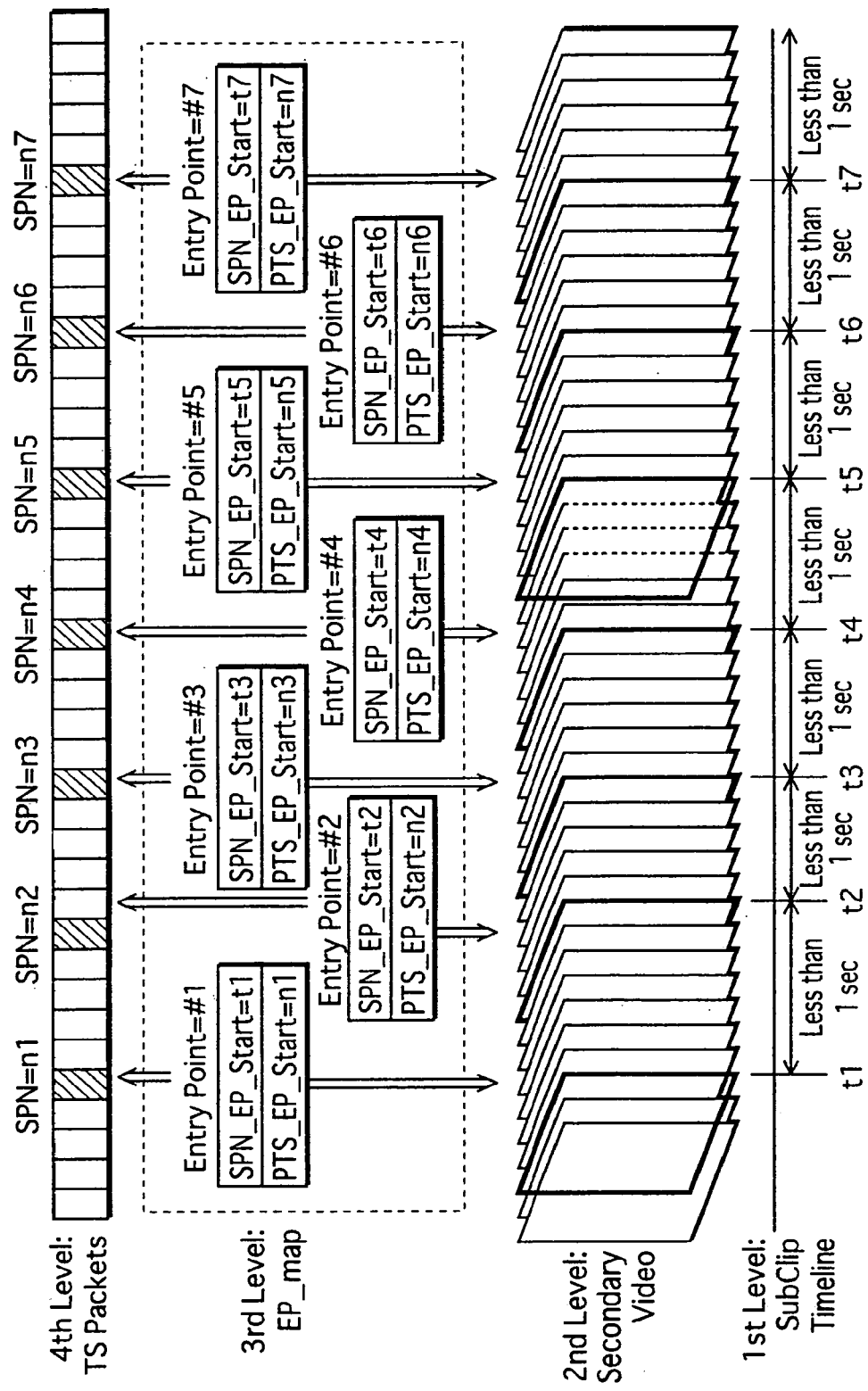
FIG. 39 illustrates an EP_map for the secondary video stream in the same manner to FIG. 9.

The leader lines ct1 and ct2 indicate that the internal structure of Clip Info is illustrated in more detail. In the Clip Info, the application_type is set to the value indicating that the SubClip associated with the clip information is "TS for additional content with video". FIG. 39 illustrates the EP_map set for the secondary video stream in the same manner as FIG. 9.

This concludes the description of the clip information according to the second embodiment.

<Structure of Local Storage 200: 3. PlayList Information>

Next, the following describes the PlayList information according to the second embodiment. There are two types of PiP playback; one is statically synchronized playback and the other is dynamically synchronized playback. The above-mentioned example is a statically synchronized PiP application for synchronously presenting the main feature movie with the commentary, which are the primary video and the secondary video, respectively.

<Details of PlayList Information: 1. Components for Implementing Static PiP Playback>

Figure 40:
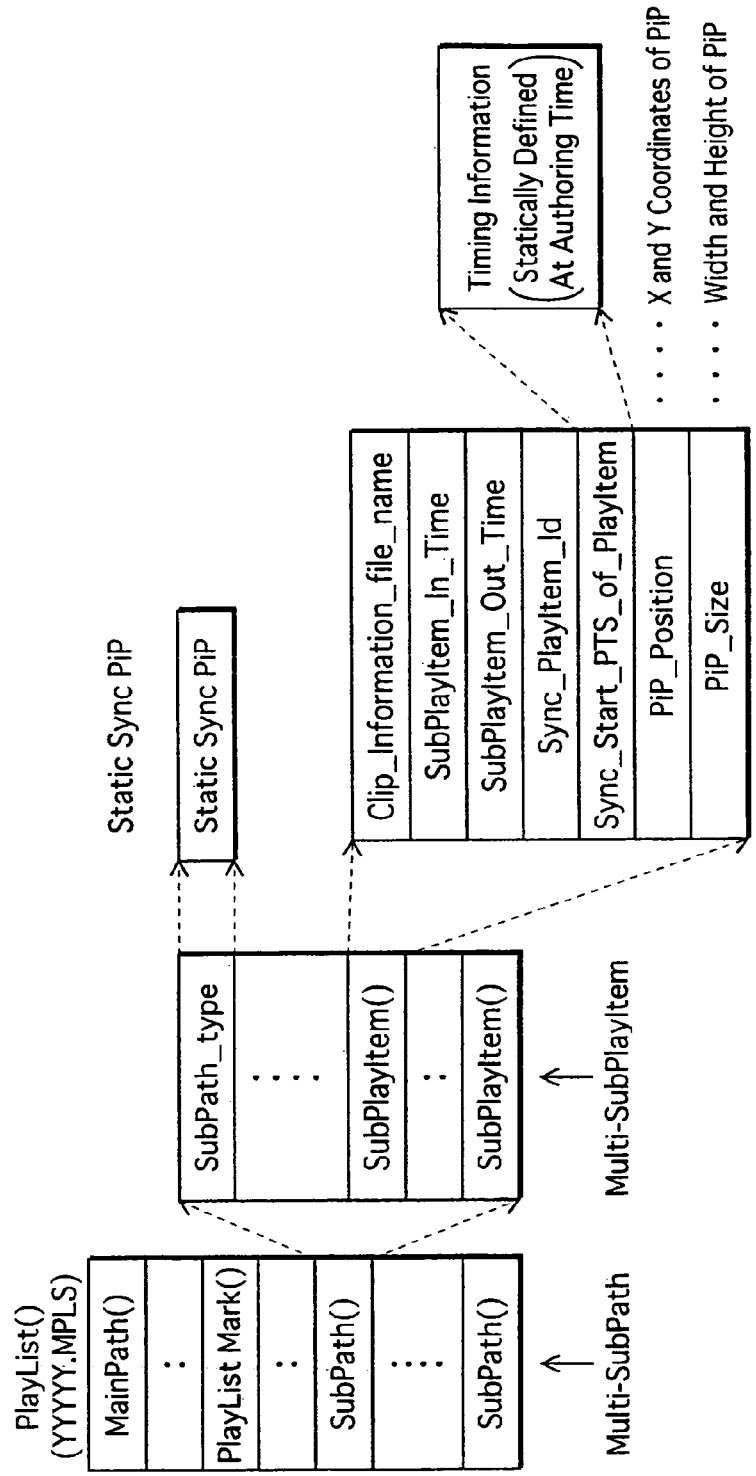
FIG. 40 illustrates PlayList information defining a synchronous application implementing statically synchronized PiP playback.

FIG. 40 illustrates PlayList information defining statically synchronized PiP playback. The PlayList information defining the statically synchronized PiP playback may include a plurality of pieces of SubPath information (Multi-SubPath) and each piece of SubPath information may include a plurality of pieces of SubPlayItem information (Multi-SubPlayItem).

The SubPlayItem information illustrated in the figure additionally includes a PiP_position field and a PiP_size field. Each field included in the SubPlayItem information is set as follows.

The "Clip_information_file_name" field is set to indicate the file name of the AV clip containing the primary video.

The "sub_PlayItem_In_time" field is set to the value indicating the start point of the SubPlayItem on the timeline of the SubClip containing the secondary video.

The "sub_PlayItem_Out_time" field is set to the value indicating the end time of the SubPlayItem on the timeline of the SubClip containing the secondary video.

The "sync_PlayItem_id" field is associated with the AV clip containing the primary video and set to the value indicating the PlayItem identifier.

The "sync_start_PTS_of_PlayItem" field is timing information indicating the timing at which playback of the playback section (SubPlayItem) defined by the SubPlayItem information is to be started. Here, the playback start time of SubPlayItem is expressed using the number of seconds to be lapsed from the playback start of the PlayItem defined by the sync_PlayItem_id.

The "PiP_position" indicates the X and Y coordinates of a position in the screen plane at which the secondary video playback is to be presented.

The "PiP_size" indicates the height and the width of the secondary video playback.

<Details of PlayList Information: 2. Synchronization in Statically Synchronized PiP Playback>

Figure 41:
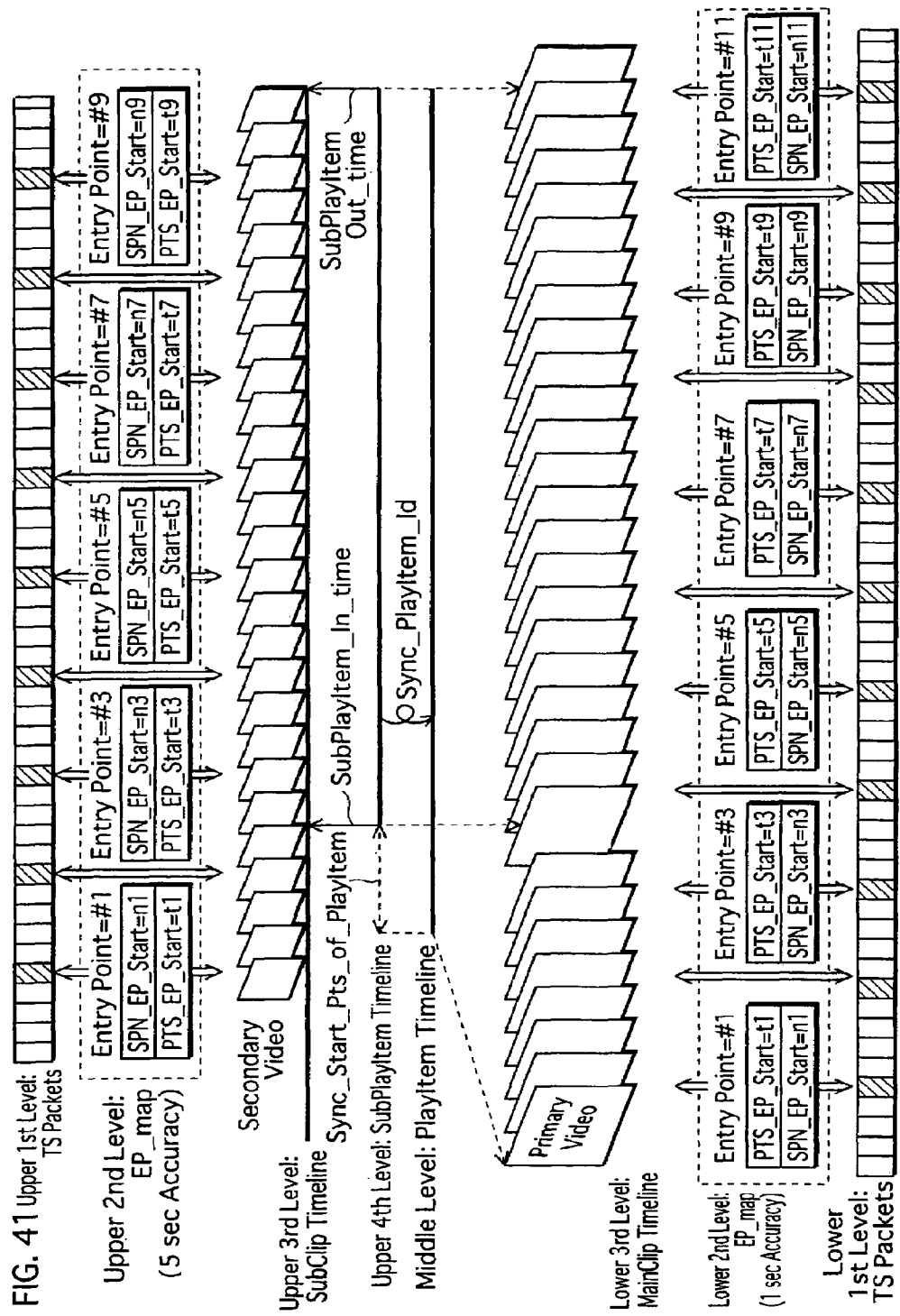
FIG. 41 illustrates, in the same manner as FIGS. 25 and 26, how the PlayList information defines the synchronization between the Main Clip containing primary video and the SubClip containing secondary video.

FIG. 41 illustrates how the PlayList information defines the synchronization between the Main Clip containing the primary video and the SubClip containing the secondary video. FIG. 41 is illustrated in the same manner as FIGS. 25 and 26.

The SubClip containing the secondary video is provided with an EP_map and thus the high-speed random access to the SubClip is ensured in time accuracy of less than one second. The PlayList information defines synchronous playback of the Main Clip and SubClip on precondition that high-speed random access to the SubClip is possible.

Here, the following describes the technical significance of the provision of EP_map for a SubClip containing secondary video. The SubClip containing secondary video is provided with an EP_map because trick play of the secondary video needs to be executed in response to trick play of the primary video. In the case where trick play of the primary video is executed during PiP playback, how to process the secondary video matters. During fast-forwarding or rewinding of the primary video, it is possible to continually play back the secondary video in the normal mode. Yet, in such a case, the playback device needs to have separate decoders for the primary video and the secondary video, and the decoders need to be operated on separate system time clocks (STCs). It is impractical to provide two STCs to a player model primarily intended for home use.

Practically, the secondary video is fast-forwarded and rewound in synchronism with fast-forwarding and rewinding of the primary video. In view of this, the EP_map is also provided for the SubClip so as to allow the secondary video to be fast-forwarded and rewound in synchronism with fast-forwarding and rewinding of the primary video.

This concludes the description of the PlayList information defining statically synchronized playback of the Main Clip and SubClip.

<Details of PlayList Information: 3. Synchronization in Dynamically Synchronized PiP Playback>

Next, a description is given of the PlayList information defining dynamically synchronized playback of the Main Clip and SubClip.

The dynamic synchronization refers to playback of the SubPlayItem associated with the secondary video stream (SubClip) synchronously with playback of the primary video stream (Main Clip), and the playback start point of the SubPlayItem is dynamically determined in response to a user operation. For example, the author of a PiP application intends to implement such dynamic synchronization as illustrated in FIGS. 42A through 42C.

Figure 42A:
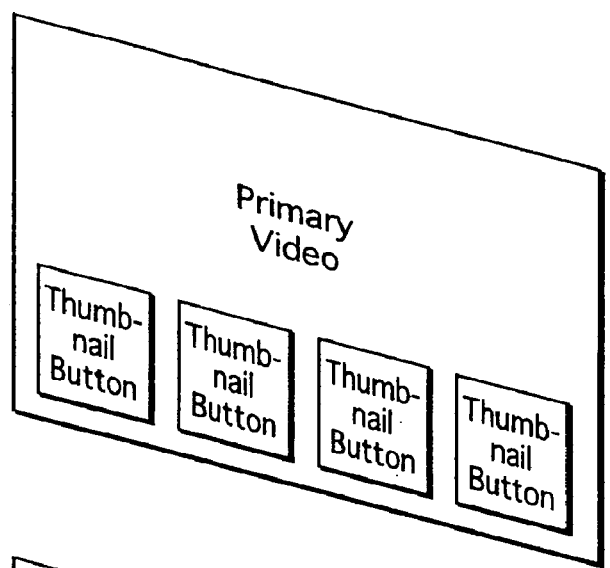
FIGS. 42A-42C illustrate a dynamically synchronized PiP application.
Figure 42B:
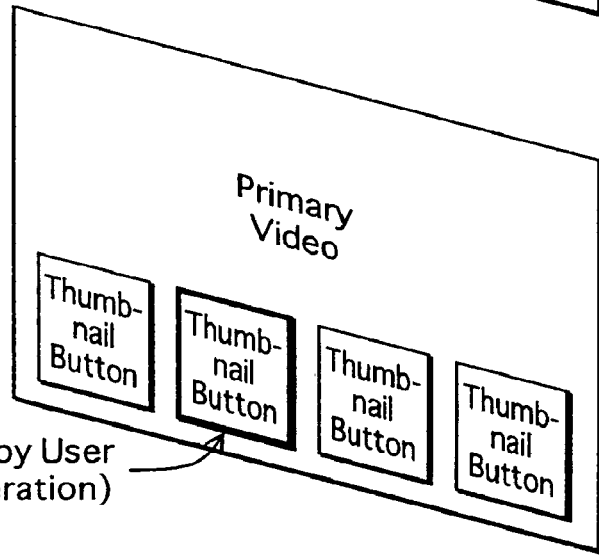
Figure 42C:
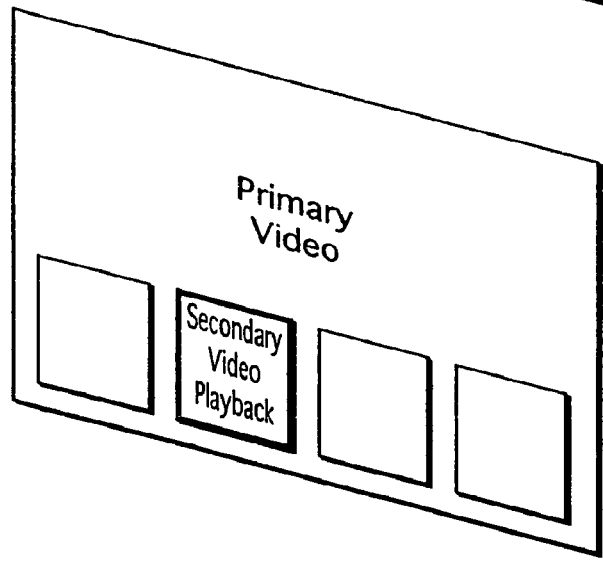

FIG. 42A illustrates the display screen presented during playback of the primary video of the PiP application. Each button on the screen illustrated in FIG. 42A is presented using a thumbnail image (thumbnail button). Each thumbnail button has three states that are a normal state, a selected state, and an activated stated. The PiP application is designed so as to present, when one of the thumbnail buttons receives the selected state (FIG. 42B), playback image of the secondary video in place of the thumbnail image used to present the selected button (FIG. 42C). As in this example, the playback start point of the secondary video is dynamically determined in response to a user operation made during playback of the primary video. This is what is referred to as "dynamic synchronization". A user operation for changing a thumbnail button to the selected state (in this case, a user operation for selecting the thumbnail button) is referred to as a rock operation.

In the case of dynamic synchronization, it is not known in advance which of the thumbnail images will be selected and thus which secondary video is to be played back. Thus, it is necessary to dynamically determine, during playback of the primary video, the start point of the synchronous playback of the secondary video.

<Details of PlayList Information: 4. Components for Implementing Dynamically Synchronized PiP Playback>

Figure 43:
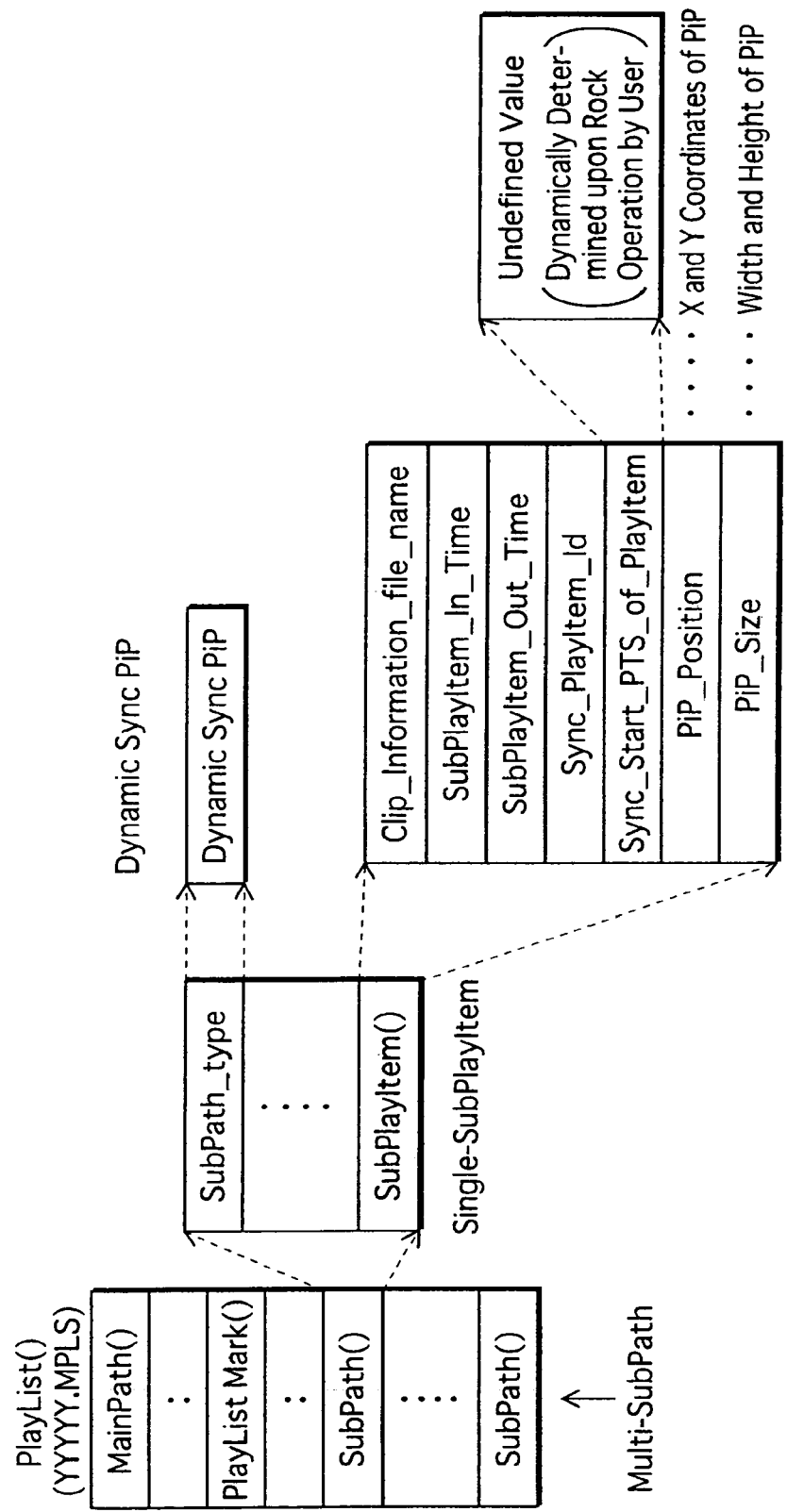
FIG. 43 illustrates the internal structure of the PlayList information defining dynamically synchronized PiP playback.

FIG. 43 illustrates the internal structure of the PlayList information defining dynamically synchronized PiP playback.

The PlayList information defining the dynamically synchronized PiP playback may include a plurality of pieces of SubPath information (Multi-SubPath). Yet, each piece of SubPath information can include a single piece of SubPlayItem information (Single-SubPlayItem).

Similarly to the example illustrated in FIG. 40, the SubPlayItem information illustrated in the figure includes a PiP_position field and a PiP_size field. The setting of "Clip_information_file_name", "SubPlayItem_In_time", "SubPlayItem_Out_time", "sync_PlayItem_id", "PiP_position", and "PiP_size" fields is identical to the setting of corresponding fields illustrated in FIG. 40. The difference lies in the setting of the "sync_start_PTS_of_PlayItem".

The "sync_start_PTS_of_PlayItem" indicating a point for establishing synchronous playback with the PlayItem specified by the sync_PlayItem_id is set to an undefined value. If set to an undefined value, the "sync_start_PTS_of_PlayItem" indicates that the synchronization point is dynamically determined, in response to a rock operation by a user, on the timeline of the PlayItem specified by the sync_PlayItem_id.

In accordance with the PlayList information illustrated in FIG. 43, the playback device operates to write the point of a rock operation to the sync_start_PTS_of_PlayItem. Here, if the point of rock operation is defined as a time at which a thumbnail button is first changed to the selected state and then automatically to the activated state, the playback device starts playback of the secondary video at the time when the thumbnail button is changed to the activated state. Since this press relates specifically to the selection and automatic activation of thumbnail buttons, it is desirable to define this process using a navi command, which is used to control the behavior of thumbnail buttons.

This concludes the description of the internal structure of the PlayList information implementing dynamically synchronized PiP playback. This concludes the description of the improvements made on the recording medium, according to the present embodiment.

Now, the following describes improvements made on the playback device, according to this embodiment.

<Structure of Playback Device: 1. Overall Structure>

Figure 44:
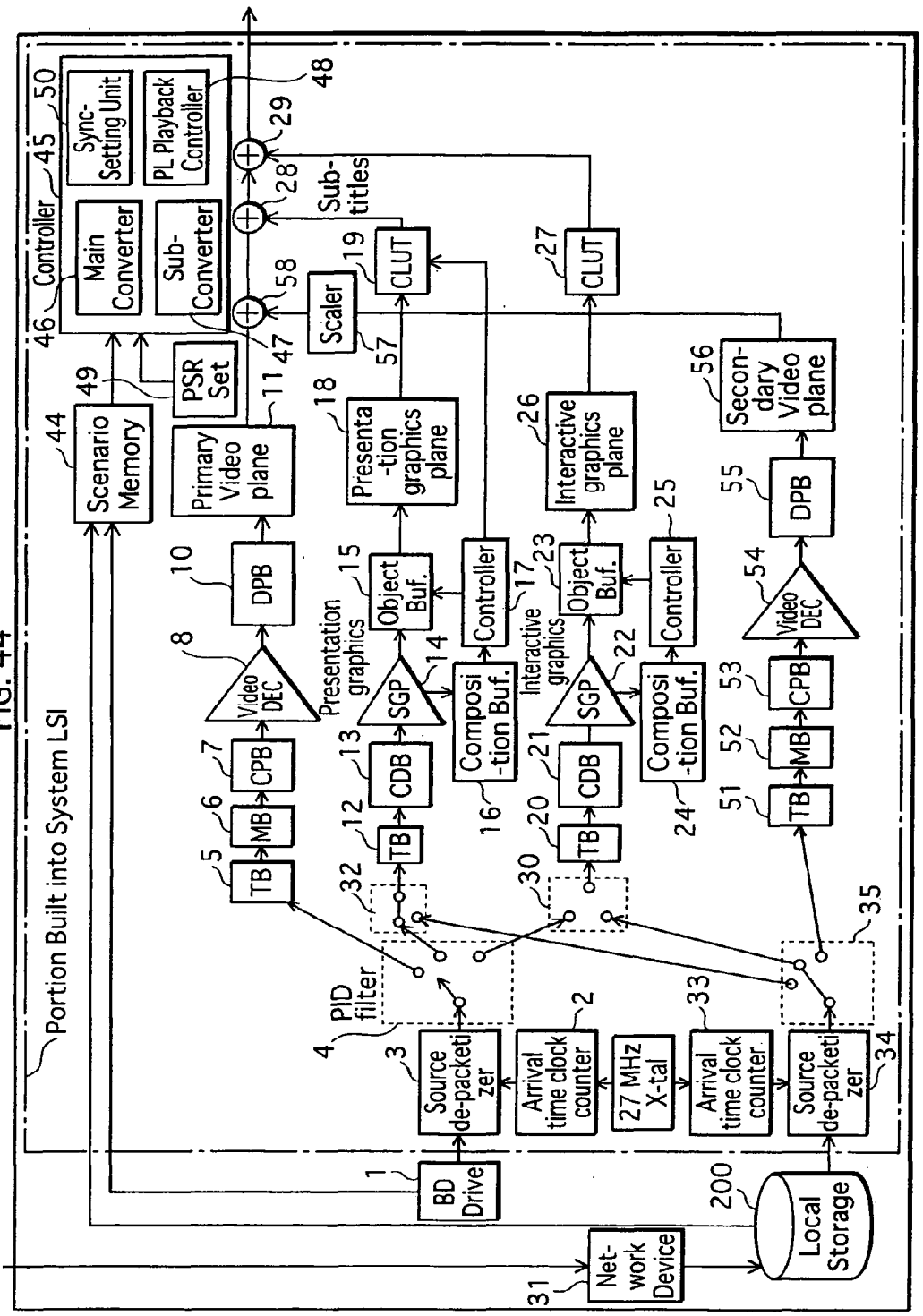
FIG. 44 illustrates the internal structure of a playback device according to the second embodiment.

FIG. 44 illustrates the internal structure of the playback device according to the second embodiment. For the sake of convenience in illustration, the components of the audio decoder are omitted.

FIG. 44 is based on the structure of the playback device illustrated in FIG. 29, and the same reference numerals are used to denote the same components. Among the components in common with the playback device illustrated in FIG. 29, the transport buffer 5, the multiplexed buffer 6, the coded picture buffer 7, the video decoder 8, the decoded picture buffer 10, and the primary video plane 11 in the second embodiment function to decode the primary video stream.

On the other hand, for decoding the secondary video stream, the playback device illustrated in FIG. 44 additionally includes a transport buffer 51, a multiplexed buffer 52, a coded picture buffer 53, a video decoder 54, a decoded picture buffer 55, a secondary video plane 56, a scaler 57, and a compositor 58. Hereinafter, a description of those additional components will be made.

<Structure of Playback Device 300: 2. Additional Hardware Components>

The transport buffer 51 is a buffer for temporarily storing TS packets carrying the secondary video stream (SubClip) output from the PID filter 35.

The multiplexed buffer (MB) 52 is a buffer for temporarily storing PES packets output from the transport buffer 51, in order to later output the secondary video stream to the coded picture buffer 53.

The coded picture buffer (CPB) 53 is a buffer for storing encoded pictures (I, B, and P pictures).

The video decoder 54 decodes individual frames contained in the secondary video stream at every decoding time shown by a decoding time stamp (DTS) to obtain a plurality of frames and renders the resulting picture data on the decoded picture buffer 55.

The decoded picture buffer 55 is a buffer on which decoded picture data is rendered.

The secondary video plane 56 is used for presenting unimpressed picture data obtained by decoding the secondary video.

The scaler 57 is for reducing or enlarging the size of playback image rendered on the secondary video plane 56, in accordance with the height and the width indicated by the PiP_size field included in the SubPlayItem information.

The compositor 58 is for implementing PiP playback by overlaying the playback image resized by the scaler 57, on the playback image obtained by the video decoder. The overlaying of the playback images of the primary video and the secondary video is carried out in accordance with the PiP_position defined in the SubPlayItem information. As a result, composite images of the primary and secondary video playback are presented. The compositor 58 is capable of chroma key composition, layer composition, and so on. Thus, it is possible to remove the background image from the secondary video to only leave a film character and then overlay the resulting image of the film character with the playback image of the primary video.

With the above additional components, the PID filter 35 according to the second embodiment supplies TS packets carrying the secondary video stream to the transport buffer 51, the multiplexed buffer 52, the coded picture buffer 53, the video decoder 54, the decoded picture buffer 55, and the secondary video plane 56.

<Structure of Playback Device 300: 2. Additional Hardware Component to Controller 45>

The controller 45 additionally includes a sync-setting unit 50.

The sync-setting unit 50 judges whether the sync_start_PTS_of_PlayItem included in the SubPlayItem information is set to an undefined value. If the sync_start_PTS_of_PlayItem is set to an undefined value, the playback device is brought into readiness to receive a rock operation made by a user during the time a playback section of the Main Clip specified by the PlayItem information is solely played back. The rock operation is received via a remote controller and determines the start point of synchronous playback. Upon receipt of the rock operation, the undefined value of the sync_start_PTS_of_PlayItem is overwritten with the value identifying the time at which the rock operation is received. In the case where the rock operation is defined as a selection of any of buttons presented on the playback image of the Main Clip, the time at which the operation of selecting the button is made is regarded as the time of the rock operation.

Once the value of the sync_start_PTS_of_PlayItem is set in the above manner, the PL playback controller 48 can control playback of the PlayItem specifying the primary video and the SubPlayItem specifying the secondary video. As a result, dynamically synchronized PiP playback is executed.

It should be naturally appreciated that if the value of the sync_start_PTS_of_PlayItem is statically set to a specific value, the PL playback controller 48 can control playback of the PlayItem and the SubPlayItem so as to execute statically synchronized PiP playback.

<Structure of Playback Device: 2. Software Implementation>

This concludes the description of the components additionally provided in the second embodiment. Next, a description is given of improvements made in the software implementation of the second embodiment.

Figure 45:
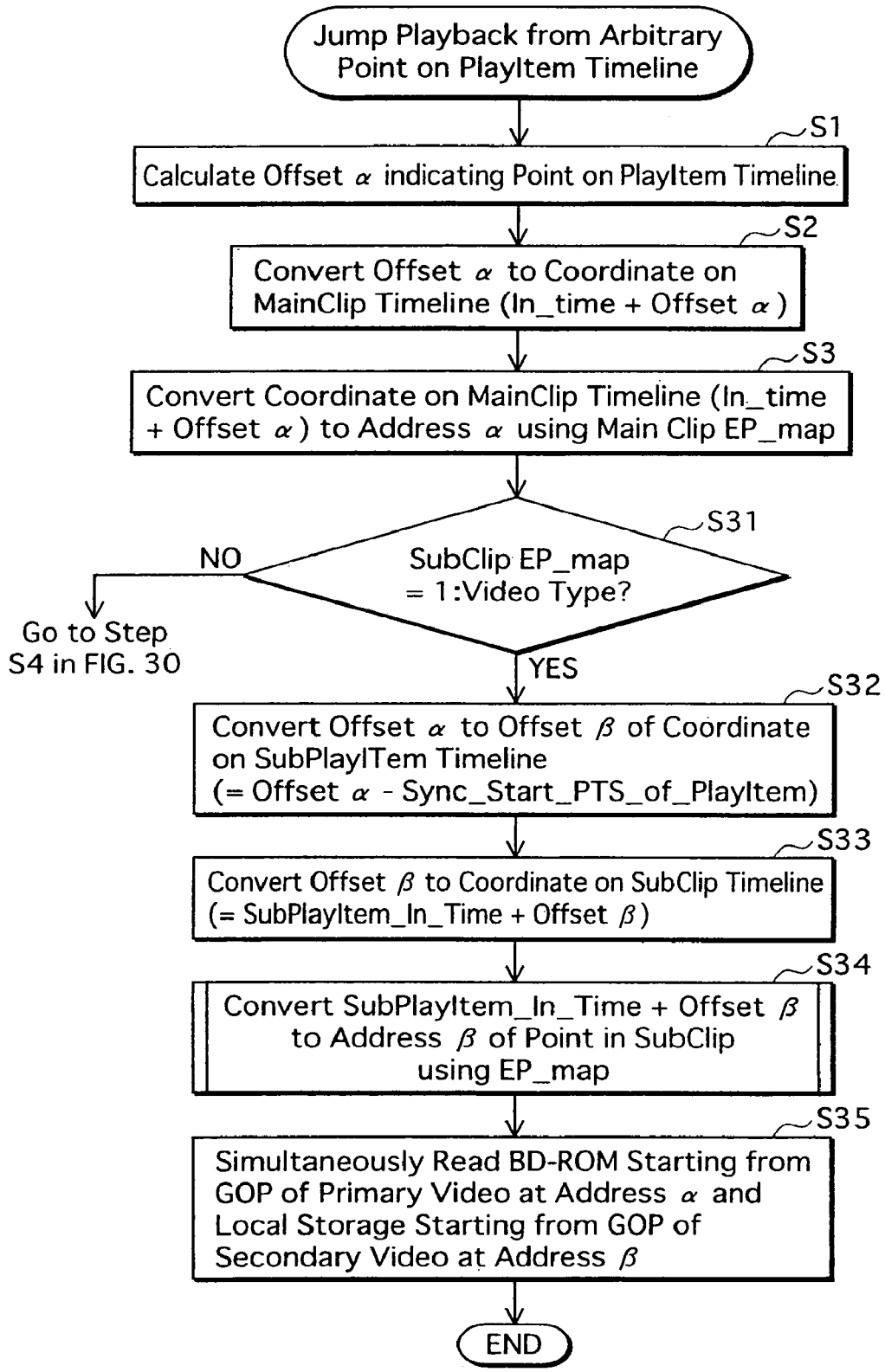
FIG. 45 is a flowchart illustrating the processing steps for executing PL playback.

FIG. 45 is a flowchart illustrating processing steps for executing jump playback starting from an arbitrary point on the PlayItem timeline. The flowchart in FIG. 45 is based on the flowchart illustrated in FIG. 30 and is identical thereto except that the steps S4-S8 are replaced with steps S31-S35. In the step S31, it is judged whether the EP_stream_type in the EP_map associated with the SubClip indicates the video type. If the video type: 1 is indicated (step S31: YES), an offset α indicating a point on the PlayItem timeline is converted into an offset β indicating a corresponding point on the SubPlayItem timeline (=offset α−sync_start_PTS_of_PlayItem) (step S32). Then, the offset β is converted into a coordinate of a corresponding point on the SubClip timeline (SubPlayItem_In_time+offset β) (step S33). Then, with reference to the EP_map, the SubPlayItem_In_time+offset β is further converted into an address β of a corresponding GOP in the SubClip, which contains the secondary video (step S34). Then, the playback device simultaneously accesses the BD-ROM at the address a and the local storage 200 at the address β to read GOPs of the primary video and GOPs of the secondary video, respectively (step S35).

In the step S31, if it is judged that the EP_stream_type does not indicate the video type: 1, the steps S4-S8 illustrated in FIG. 30 are performed.

Figure 46:
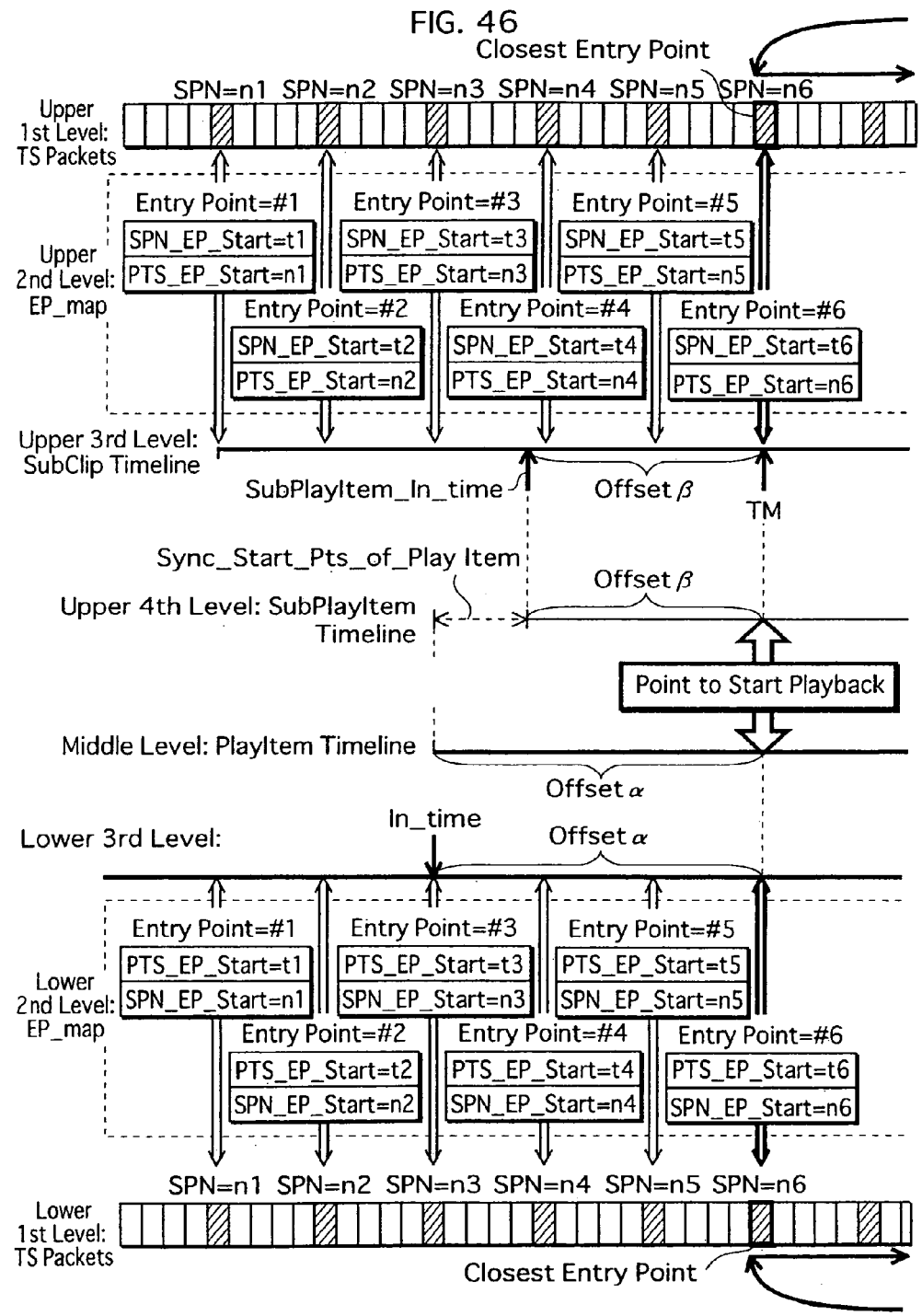
FIG. 46 schematically illustrates, in the same manner as FIG. 31, random to the Main Clip and to the SubClip.

FIG. 46 schematically illustrates, in the same manner as FIG. 31, random access to the Main Clip and to the SubClip. The SubClip containing the secondary video has entry points at time intervals of less than 1 sec. Random access to the SubClip is made using those entry points. Since random access to the SubClip can be made at about the same speed as random access to the Main Clip, jump playback of the SubClip is executed in synchronism with jump playback of the Main Clip.

As described above, during PiP playback in which is HD images of the primary video are presented in combination with SD images of the secondary video, a random access is made at a relatively high speed. By virtue of this high-speed random access capability, trick play can be executed even during PiP playback.

(Supplemental Notes)

Needless to say, the foregoing descriptions do not cover all the modes of practicing the present invention. The present invention can be practiced also by any of the following modifications (A), (B), (C), (D), etc. It should be noted that the inventions recited in the claims of the present application are broadened or generalized descriptions of the above-described embodiments and their modifications. The extent of the broadening and generalization reflects the state of the art at the time of filing the present application.

(A) Information processing performed by the functional components or shown in the flowcharts described in the above embodiments is actually realized using hardware resources. Accordingly, the information processing is said to be a highly advanced creation of technical ideas by which a low of nature is utilized, and thus satisfies the requirements of "program invention".

Program Production According to the Present Invention

A program according to the present invention may be produced in the following manner. First, a software developer writes, in a programming language, a source program for implementing the flowcharts or the functional components described above. When writing the source program for implementing the flowcharts or the functional components, the software developer may use class structures, variables, array variables, and calls for external functions, in accordance with the syntax of that programming language.

More specifically, for example, each loop shown in the flowchart may be described using a FOR statement and each judgment may be described using an IF statement or a SWITH statement, in accordance with the syntax. The hardware control including the playback control of the decoder and the access control of the drive device can be described using CALL statements for external functions provided by the hardware manufacturer.

The resulting source program is supplied as a file to a compiler. The compiler translates the source program into an object program.

The compilation involves processes of parsing, optimization, resource allocation, and code generation. The parsing involves lexical analysis, syntactic analysis, and semantic analysis of the source program, and conversion of the source program into an intermediate program. The optimization involves processes of dividing the intermediate program into basic blocks, and control flow analysis and data flow analysis of the intermediate program. The resource allocation involves a process of allocating registers or memory of a target processor to variables appearing in the intermediate program, whereby the intermediate program is adapted to the instructions sets of the processor. The code generation involves a process of converting intermediate statements of the intermediate program into program code, whereby an object program is generated.

The thus generated object program is composed of one or more lines of code for causing a computer to perform processing steps shown in the flowcharts referenced in the above embodiments or the processing steps performed by the functional components. The program code mentioned herein may be of any of a various types of codes including a native code of the processor and Java (registered trademark) byte code. The processing steps may be implemented by the program code in various ways. For example, when a step is implemented using an external function, a CALL statement for the external function comprises a line of the program code. In addition, there may be a case where program code for implementing one step is contained in two or more separate object programs. When a RISC processor, which is designed for handling reduced instruction sets, is employed, each processing step of the flowcharts may be implemented using a combination of an arithmetic instruction, a logical instruction, and a branch instruction, for example.

Once the object program is generated, the programmer activates a linker. The linker allocates memory areas for the object program and related library programs, and binds them together to generate a load module. The thus generated load module is to be read by a computer thereby to cause the computer to perform the processing steps shown in the above flowcharts or the processing steps performed by the functional components. Through the above processes, a program embodying the present invention is created.

(B) The program according to the present invention may be used in the following manners.

(i) As Embedded Program

When the program according to the present invention is used as an embedded program, a load module that is equivalent to the program is recorded into an instruction ROM, along with a basic input output program (BIOS) and various pieces of middleware (operation systems). The instruction ROM is then built into the control unit and executed by the CPU. As a result, the program according to the present invention is used as the control program of the playback device.

(ii) As Application Program

In the case where a playback device is provided with an internal hard disk, a Basic Input/Output System (BIOS) is already embedded within the instruction ROM and middleware (operation system) is preinstalled onto the hard disk. In addition, the playback device is provided with a boot ROM for activating the system from the hard disk.

Thus, in this case, the load module is supplied to the playback device via a portable recording medium or a network, and the load module is installed as a single application program onto the hard disk. Then, the playback device bootstraps to activate the operation system and instructs the CPU to execute the application. In this way, the program according to the present invention is used as a single application program.

As described above, with a playback device having an internal hard disk, the program according to the present invention can be used as a single application program. Thus, the program according to the present invention may be singly transferred, leased, or supplied over a network.

(C) Production and Usage of System LSI According to the Present Invention

Generally, a system LSI is composed of a bare chip packaged on a high-density substrate. Alternatively, a system LSI may be composed of a plurality of bare chips that is packaged on a high-density substrate and has an external structure just as a single LSI (this type system LSI is referred to as a multichip module).

Focusing on the types of packaging, there are different types of system LSIs called QFP (quad flat package) and PGA (Pin Grid Array). QFP is a type of system LSI with pins extending from all four sides of the package. PGA is a type of system LSI package with an array of pins that are arranged on entire surface of the base of the package.

The pins act as an I/O interface with a drive device, a remote controller, and a television. The pins also act as an IEEE1394 interface and a PCI bus interface. Since the pins of the system LSI act as interface, by connecting circuitry of a drive device or a playback device, the system LSI plays a roll as the core of the playback device.

A bare chip packaged into a system LSI may be an instruction ROM, CPU, a decoder LSI implementing the functions of the components shown in the figures of the internal structures according to the above embodiments.

As mentioned in the description given in relation to the use "As Embedded Program", the instruction ROM stores a load module equivalent to the program of the present invention, a BIOS, and various pieces of middleware (operation systems). The part to which the above embodiments are particularly relevant is the load module equivalent to the program. Thus, by packaging, as a bare chip, the instruction ROM storing the load module equivalent to the program, a system LSI according to the present invention is produced.

The details of the procedure for producing such system LSIs are as follows. The first step is to make a circuit diagram of a part to be incorporated into a system LSI, based on the figures showing the internal structures according to the above embodiments. The next step is to embody each component shown in the figures using circuit components, ICs, and LSIs.

The next step following the embodying each component is to design a bus connecting circuit elements, ICs, and LSIs, the peripheral circuitry, and interface with external devices. In addition, connecting lines, power lines, ground lines, and clock signal lines are designed. In this process, operation timing of each component is adjusted in consideration of the LSI spec. In addition, some adjustment is made to ensure the bandwidth of each component. In this way, the circuit diagram is completed.

Once the circuit diagram is ready, the packaging design needs to be made next. The packaging design is a process of designing a layout on a substrate. To this end, the physical arrangement of the elements (circuit elements, IC, and LSI) shown in the circuit diagram is determined and the wiring on the substrate is also determined.

The packaging design mentioned herein may be done through the processes called auto layout and auto wiring.

When a CAD apparatus is employed, the auto layout is carried out using a dedicated algorithm called "centroid method". In the process of auto wiring, the connecting lines between the elements and pins shown on the circuit diagram are implemented using metal foil and vias. With a CAD apparatus, the wiring is completed using any of dedicated algorithms called "maze routing algorithm" and "line-search algorithm".

After the packaging design is completed and the layout on the substrate is determined, the related data is converted into CAM data and supplied to appropriate devices such as an NC machine tool. The NC machine tool incorporates the elements using System on Chip (SoC) or System in Package (SiP) implementations. According to the SoC implementation, multiple circuits are baked on a single chip. According to the SiP implementation, multiple chips are joined into a single package with, for example, resin. Through the above processes, a system LSI according to the present invention can be produced based on the figures showing the internal structure of the playback device referenced in the above embodiments.

Note that integrated circuits produced in the above manner may be referred to as IC, LSI, super LSI, or ultra LSI, depending on the packaging density.

In addition, all or some of the components of each playback device of the present invention may be incorporated into a single chip. In addition, instead of the SoC and SiP implementations, the elements may be integrated using a dedicated circuit or a general-purpose processor. For example, it is applicable to use an FPGA (Field Programmable Gate Array) that can be programmed after an LSI is produced. It is also applicable to use a reconfigurable processor that allows reconstruction of connection between circuit cells within the LSI and their settings. When any new circuit integration technology becomes available or derived as the semiconductor technology advances, such new technology may be employed to integrate the functional blocks of the present invention. One possible candidate of such new technology may be achieved by adapting biotechnology.

(D) According to the above embodiments, the recording medium according to the present invention is described as a hard disk. Yet, it should be noted that the features of the recording medium according to the present invention lie in the EP_map and the EP_stream map recorded thereon and these features do not depend on the physical property of the hard disk. Any other recording medium is applicable as long as the recording medium can store the EP_map and the EP_stream_type and can be used in combination with a BD-ROM. Specific examples of such recording media include: semiconductor memory cards, such as a CompactFlash card (registered trademark), a SmartMedia card, a Memory Stick card, a MultiMediaCard, and a PCM-CIA card. Alternatively, the recording medium according to the present invention may be (i) a magnetic disk, such as a flexible disk, SuperDisk, Zip, or Clik! or (ii) a removable hard disk drive, such as ORB, Jaz, SparQ, SyJet, EZFley, or Microdrive.

(E) According to the above embodiments, each digital stream is an AV clip compliant with the BD-ROM standard. However, the digital stream may be a VOB (Video Object) compliant with the DVD-Video standard or the DVD-Video Recording standard. A VOB is a program stream compliant with the ISO/IEC 13818-1 standard, and is obtained by multiplexing a video stream and an audio stream. Alternatively, the video stream in an AV clip may be compliant with MPEG4 or WMV. Furthermore, the audio stream in an AV clip may be compliant with Dolby-AC3, MP3, MPEG-AAC, or dts.

(F) According to the above embodiments, the video stream is an MPEG4-AVC stream (which may also be referred to as "H.264" or "JVT"). Yet, the video stream may be of MPEG2 format or any other format such as the VC-1 format as long as the video stream is solely decodable.

Figure 47A:
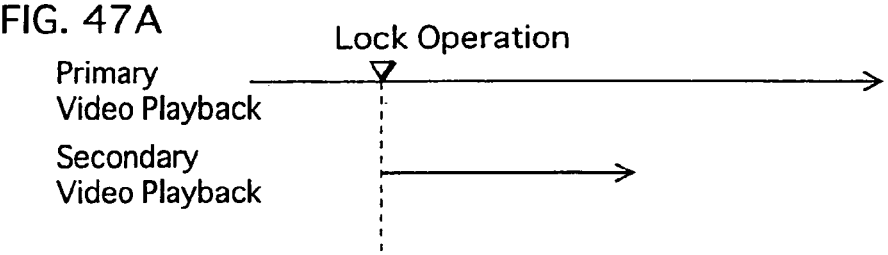
FIG. 47A illustrates the playback control for executing dynamically synchronized PiP playback.
Figure 47B:
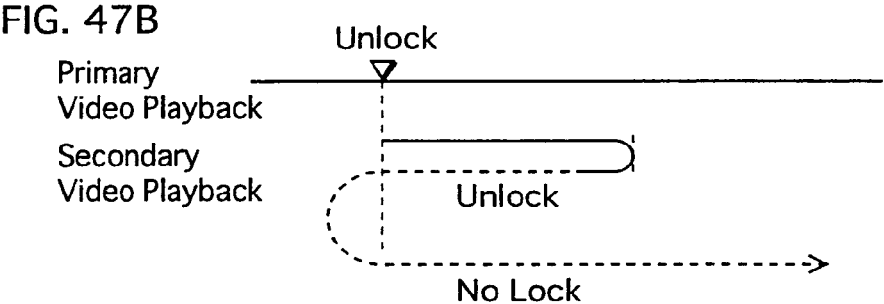
FIG. 47B illustrates dynamically synchronized PiP playback executed in the case where a rock point once passed is reached again in a normal playback mode as a result of rewinding.
Figure 47B:
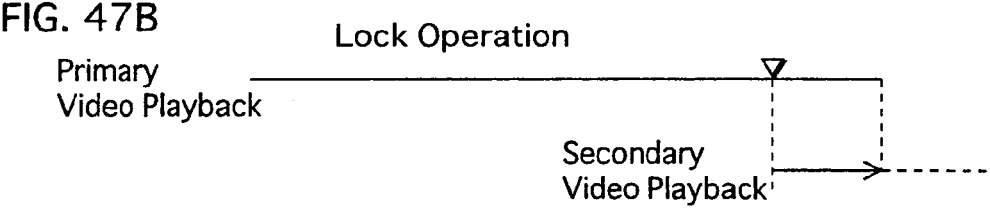

(G) In the case where the value of sync_start_PTS_of_PlayItem is set by the sync-setting unit 50, it is desirable that the sync-setting unit 50 perform the playback control as illustrated in FIGS. 47A-47C.

FIG. 47A illustrates the playback control for executing dynamically synchronized PiP playback. An arbitrary point on the PlayItem timeline is determined as the start point for synchronization with the SubPlayItem. When the current playback point reaches the time indicated by the sync_start_PTS_of_PlayItem, the playback device starts decoding the secondary video and overlays playback of the secondary video with playback of the primary video.

FIG. 47B illustrates dynamically synchronized PiP playback executed in the case where the lock point is once passed and reached again in the normal playback mode as a result of rewinding. In other words, the figure illustrates how dynamic synchronization in PiP playback is established in the case where the current playback point once passes the lock point in the normal playback mode and then is rewound by the user beyond the lock point, and reaches the lock point for the second time in the normal playback mode.

When the lock point is reached for the first time, PiP playback is started. PiP playback is stopped at the moment when the rewinding operation is made. Then, playback is resumed in the normal playback mode and PiP playback is not executed even when the lock point is reached for the second time.

FIG. 47C illustrates PiP playback executed in the case where the playback section of the secondary video is located at some point subsequent to the end point of the playback section of the primary video. In this case, the last picture of the primary video is continually presented until playback of the secondary video ends. Alternatively, it is applicable to end playback of the secondary video at the time when playback of the primary video ends.

(H) In the case where the current playback point of the secondary video is not changed at relatively short time intervals, the PlayList information needs to define many pieces of timing information and position information. In this case, it is preferable that the PlayList information additionally includes User Private information and PLMark information compliant with the BD-RE specifications and defines the PiP_position and PiP_size in the additionally provided information. Then, the scaler 57 and the compositor 58 can perform the resizing process and the composition process according to the user private information and the PLMark information.

(I) It is applicable to present the primary video and the secondary video on two separate screens rather than one and the same screen. As described above, the main video is a portion of the Main Clip specified by the MainPath information in the PlayList information, whereas the secondary video is a portion of the SubClip specified by the SubPlayItem also in the PlayList information. In addition, it is applicable to present the primary video with SD images and the secondary video with the HD images.

(J) According to the second embodiment, the Main Clip containing the primary video is supplied in from of BD-ROM, and the SubClip containing the secondary video is supplied to be stored on the local storage 200. Yet, it is applicable that the SubClip is sorted on the BD-ROM and supplied to the playback device together with the Main Clip.

In addition, it is applicable that the secondary video stream is multiplexed with the primary video stream to constitute one AV clip.

INDUSTRIAL APPLICABILITY

The recording medium and the playback device according to the present invention may be employed for personal use in a home theater system, for example. Yet, the present invention may be manufactured in volume in accordance with the internal structures disclosed in the above embodiments. Thus, the recording medium and the playback device of the present invention can by industrially manufactured or used on an industrial scale. In view of the above, the recording media and the playback devices of the present invention have industrial applicability.

What is claimed is:

1. A playback device for executing trick play of a main stream and a substream, a portion of the main stream being defined as a primary playback section, and a portion of the substream being defined as a secondary playback section,
   the primary and secondary playback sections being defined in playlist information,
   the playlist information including synchronous information,
   the synchronous information including timing information that indicates a synchronization point on a timeline of the primary playback section, the synchronization point being a point for starting synchronous playback of the primary playback section with the secondary playback section,
   the substream being associated with an entry map, and
   a start point of the trick play being defined on the timeline of the primary stream,
   the playback device comprising:
   a first conversion unit operable to convert a playback point into a corresponding address on the main stream;
   a second conversion unit operable to convert the start point into a corresponding point defined on a timeline of the secondary playback section and to further convert the corresponding point into a corresponding address on the sub stream, the conversion into the corresponding point being performed by using the synchronous information included in the playlist information, and the conversion into the corresponding address being performed by using the entry map associated with the sub stream;
   a reading unit operable to read the main stream and sub stream starting from the respective addresses obtained by the first and second conversion units; and
   a playback unit operable to play back the main stream and the substream read by the reading unit, wherein
   the main stream is a digital stream carrying a first video and is recorded on a first recording medium,
   the substream is a digital stream carrying a second video and is recorded on either the first recording medium or a second recording medium which is different from the first recording medium,
   the playback unit includes:
   a first decoder operable to decode the main stream to obtain the first video; and
   a second decoder operable to decode the substream to obtain the second video; and
   the playback device further comprises:
   a composite unit operable to execute Picture in Picture playback by overlaying, on a same screen, playback of the first video obtained by the first decoder with playback of the second video obtained by the second decoder.

2. A program stored on a non-transitory computer-readable medium for causing a computer to execute trick play of a main stream and a substream, a portion of the main stream being defined as a primary playback section, and a portion of the substream being defined as a secondary playback section, the primary and secondary playback sections being defined in playlist information, the playlist information including synchronous information, the synchronous information including timing information that indicates a synchronization point on a timeline of the primary playback section, the synchronization point being a point for starting synchronous playback of the primary playback section with the secondary playback section, the substream being associated with an entry map, and a start point of the trick play being defined on the timeline of the primary stream, the program comprising code operable to cause the computer to perform:

firstly converting a playback point into a corresponding address on the main stream;

secondly converting the start point into a corresponding point defined on a timeline of the secondary playback section and further converting the corresponding point into a corresponding address on the sub stream, the conversion into the corresponding point being performed by using the synchronous information included in the playlist information, and the conversion into the corresponding address being performed by using the entry map associated with the sub stream;

reading the main stream and substream starting from the respective addresses obtained in said first and second conversions; and playing back the main stream and the substream read in said reading, wherein the main stream is a digital stream carrying a first video and is recorded on a first recording medium, the substream is a digital stream carrying a second video and is recorded on either the first recording medium or a second recording medium which is different from the first recording medium, and said playback includes:

firstly decoding the main stream to obtain the first video; and secondly decoding the substream to obtain the second video, and the program further comprises code operable to cause the computer to perform:

executing Picture in Picture playback by overlaying, on a same screen, playback of the first video obtained in said first decoding with playback of the second video obtained in said second decoding.

3. A playback method for executing trick play of a main stream and a substream, a portion of the main stream being defined as a primary playback section, and a portion of the substream being defined as a secondary playback section, the primary and secondary playback sections being defined in playlist information, the playlist information including synchronous information, the synchronous information including timing information that indicates a synchronization point on a timeline of the primary playback section, the synchronization point being a point for starting synchronous playback of the primary playback section with the secondary playback section, the substream being associated with an entry map, and a start point of the trick play being defined on the timeline of the primary stream, the playback method comprising:

firstly converting a playback point into a corresponding address on the main stream;

secondly converting the start point into a corresponding point defined on a timeline of the secondary playback section and further converting the corresponding point into a corresponding address on the sub stream, the conversion into the corresponding point being performed by using the synchronous information included in the playlist information, and the conversion into the corresponding address being performed by using the entry map associated with the sub stream;

reading the main stream and substream starting from the respective addresses obtained in said first and second conversions; and playing back the main stream and the substream read in said reading, wherein the main stream is a digital stream carrying a first video and is recorded on a first recording medium, the substream is a digital stream carrying a second video and is recorded on either the first recording medium or a second recording medium which is different from the first recording medium, and said playback includes:

firstly decoding the main stream to obtain the first video; and secondly decoding the substream to obtain the second video, and said playback method further comprises:

executing Picture in Picture playback by overlaying, on a same screen, playback of the first video obtained in said first decoding with playback of the second video obtained in said second decoding.

4. A method for recording to a recording medium, comprising:

generating application data; and recording the application data onto a recording medium, wherein the application data includes playlist information, a plurality of digital streams, and an entry map, the playlist information defines a playback section of each of a plurality of digital streams and includes main-path information and sub-path information, the main-path information designates one of the digital streams as a main stream and defines a portion of the main stream as a primary playback section, the sub-path information designates another one of the digital streams as a substream and defines a portion of the substream as a secondary playback section that is to be synchronously played back with the primary playback section, on the recording medium, the entry map is associated with the one of the plurality of digital streams designated as the substream, the entry map indicates a plurality of entry times on a timeline of the substream in one-to-one correspondence with a plurality of entry points on the substream, the sub-path information includes synchronous information, the synchronous information includes timing information that indicates a synchronization point on a timeline of the primary playback section, the synchronization point being a point for starting synchronous playback of the primary playback section with the secondary playback section, the main stream is a digital stream carrying a first video, the substream is a digital stream carrying a second video, and when reading the recording medium, the playback device executes Picture in Picture playback starting from the synchronization point in accordance with the playlist information, by overlaying playback of the first video with playback of the second video on a same screen.

* * * * *